US010752099B2

(12) United States Patent
Arens et al.

(10) Patent No.: US 10,752,099 B2
(45) Date of Patent: Aug. 25, 2020

(54) TARPAULIN STRUCTURE

(71) Applicant: EUROPEAN TRAILER SYSTEMS GMBH, Moers (DE)

(72) Inventors: Robert Arens, Gelsenkirchen (DE); Volker Biesenbruck, Rees (DE); Roger Remmel, Remscheid (DE); Markus Leukers, Kalkar (DE)

(73) Assignee: EUROPEAN TRAILER SYSTEMS GMBH, Moers (DE)

( * ) Notice: Subject to any disclaimer, the term of this patent is extended or adjusted under 35 U.S.C. 154(b) by 0 days.

(21) Appl. No.: 16/091,362

(22) PCT Filed: Apr. 6, 2017

(86) PCT No.: PCT/DE2017/100276
§ 371 (c)(1),
(2) Date: Oct. 4, 2018

(87) PCT Pub. No.: WO2017/174078
PCT Pub. Date: Oct. 12, 2017

(65) Prior Publication Data
US 2019/0118627 A1    Apr. 25, 2019

(30) Foreign Application Priority Data

Apr. 6, 2016   (DE) .................... 20 2016 101 823 U
Sep. 6, 2016   (DE) .................... 20 2016 104 919 U

(51) Int. Cl.
*B60J 7/06* (2006.01)
*B60J 7/185* (2006.01)
*B61D 39/00* (2006.01)

(52) U.S. Cl.
CPC .............. *B60J 7/062* (2013.01); *B60J 7/065* (2013.01); *B60J 7/1856* (2013.01);
(Continued)

(58) Field of Classification Search
CPC . B60J 7/061; B60J 7/065; B60J 7/1856; B60J 7/062; B60J 7/066; B60J 7/1858
(Continued)

(56) References Cited

U.S. PATENT DOCUMENTS 905,571 A * 12/1908 Pangborn ................. B60J 7/062
                                                            296/105
1,827,059 A   10/1931 Woolcott
(Continued)

FOREIGN PATENT DOCUMENTS

DE          4136257 A1    5/1993
DE      102012006385 A1   10/2013
(Continued)

*Primary Examiner* — Dennis H Pedder
(74) *Attorney, Agent, or Firm* — Nath, Goldberg & Meyer; Joshua B. Goldberg

(57) ABSTRACT

The invention relates to a tarpaulin structure for an understructure, such as a truck, trailer, semi-trailer, railway car, dump truck or container, comprising a folding-top frame (16) and a tarpaulin (12) made of weather-resistant material, the folding-top frame (16) includes a plurality of struts (34); at the end, each of the struts has a carriage (32) that is movable along a guide (20), at least one bracket (36) is selectively pivotally connected to a pair of opposite carriages (32; 32') of the strut or to the strut (34); said bracket (36) forming a tarpaulin folding aid along with a bracket (26; 36) of an adjacent strut (34), of a pair of opposite carriages (32; 32') or of a stationary part (24) of the folding-top frame (16). In order to create a light-weight tarpaulin structure that allows an understructure to be reliably covered, according to the invention, the adjacent brackets (26, 36) are coupled to each other by means of a kinematic connecting rod assembly (38) that folds when the folding-top frame (16) is collapsed.

18 Claims, 22 Drawing Sheets

(52) U.S. Cl.
CPC ........ *B61D 39/002* (2013.01); *B60Y 2200/14* (2013.01); *B60Y 2200/147* (2013.01); *B60Y 2200/148* (2013.01); *B60Y 2200/33* (2013.01)

(58) Field of Classification Search
USPC ............... 296/104, 105, 100.12, 100.14, 296/100.16–100.18
See application file for complete search history.

(56) References Cited

U.S. PATENT DOCUMENTS

| | | |
|---|---|---|
| 2,325,855 A | 8/1943 | Hornish |
| 5,524,953 A | 6/1996 | Shaer |
| 7,325,855 B2 | 2/2008 | Henning et al. |
| 2007/0063530 A1 | 3/2007 | Petelka |
| 2009/0121514 A1 | 5/2009 | Remmel et al. |
| 2009/0322116 A1* | 12/2009 | Pivetta ............... B60J 7/062 |
| | | 296/100.12 |
| 2011/0222997 A1 | 9/2011 | Stroup et al. |

FOREIGN PATENT DOCUMENTS

| | | |
|---|---|---|
| DE | 102015007951 A1 | 12/2015 |
| EP | 0955196 A1 | 11/1999 |
| EP | 0778169 B1 | 2/2000 |
| EP | 2759433 A2 | 7/2014 |
| EP | 2708397 B1 | 11/2015 |
| FR | 2653478 A1 | 4/1991 |
| GB | 339440 A | 12/1930 |
| WO | 2015197046 A3 | 5/2016 |

\* cited by examiner

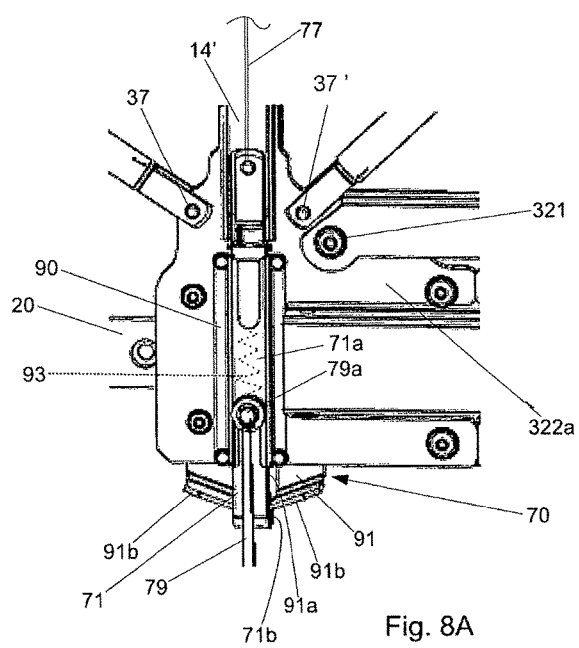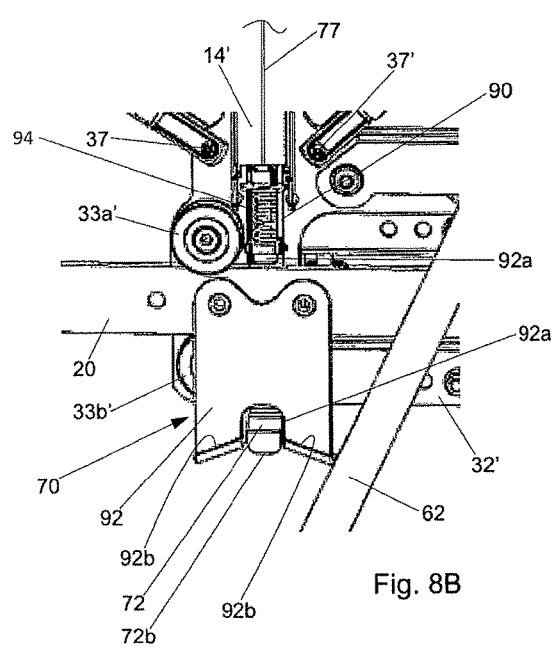

TARPAULIN STRUCTURE

This is a National Phase Application filed under 35 U.S.C. 371 as a national stage of PCT/DE2017/100276, filed Apr. 6, 2017, an application claiming the benefit of German Application No. 202016101823.4, filed Apr. 6, 2016, and German Application No. 202016104919.9, filed Sep. 6, 2016, the content of each of which is hereby incorporated by reference in its entirety.

The invention relates to a tarpaulin structure for an understructure, such as a truck, trailer, semi-trailer, railway car, dump truck or container, comprising a folding-top frame and a tarpaulin made of weather-resistant material, wherein the folding-top frame has a plurality of struts which have, on the ends, in each case a carriage which is displaceable along a guide.

Such tarpaulin structures are known from practice for the purpose of opening up openable roofs, wherein, in general, the bows are made of a pair of rods articulated to the oppositely situated carriages, which rods, at their ends situated opposite the carriages, in turn have an articulation in which a further rod is pivotably mounted. The plate that includes the joint spaced apart from the carriages then has a further joint for the connected bow, which is of similar construction. A disadvantage of the known tarpaulin structures is that the bows have a relatively large angle relative to the horizontal, which indeed facilitates the movement in a vertical direction for the raising of the tarpaulin, but which practically does not promote the transmission of forces in a movement direction. In this way, tilting of the carriages that are connected to one another by way of struts easily occurs, leading to blockage of the folding-top frame. As a countermeasure, the strut that rigidly connects the oppositely situated carriages to one another is often of very massive form, which in turn has the disadvantage that the tolerances of the guide must be reduced practically to zero so that the folding-top frame can be moved. A further disadvantage consists in that the interconnected bows, in the area of their connection, permit a relative movement with respect to one another in the direction of the guide, in the vertical direction and in the transverse direction perpendicular thereto, whereby forces and torques that are introduced into a carriage on one side practically cannot be transmitted via the bows into the adjacent carriage. This has the result that the folding-top frames of the known tarpaulin structures always require a symmetrical introduction of the movement force, that is to say, for example, the movement force must be introduced centrally, but generally must be introduced equally on both sides. A further disadvantage of the known arrangement consists in that it can be pushed together, with folding of the tarpaulin, only in an area of the understructure which still covers the loading opening of the understructure, whereby the loading opening is not fully opened up. This is a disadvantage in particular in the case of railway cars, because, as a result, a part of the loading space is lost.

DE 20 2014 005 077 U1 describes a tarpaulin structure for an understructure, comprising a folding-top frame and a tarpaulin made of weather-resistant material, wherein the folding-top frame includes a plurality of struts; at the end, each of the struts has a carriage that is movable along a guide. To each pair of opposite carriages, at least one bow is selectively pivotally connected, forming a tarpaulin folding aid along with a bow of an adjacent pair of carriages, wherein the bows of the tarpaulin folding aid are connected to one another. Here, the connected bows include a pivot angle limiter which allows only limited pivoting of the bows, so that, when the carriages are moved, the bows cannot turn over in the direction of an open position. A disadvantage here is that, in the open state, the tarpaulin structure has a large installation height resulting from the length of the bow. Furthermore, a length compensation for adaptation to an understructure can be implemented only by selecting a clear distance of the movable portion of the folding-top frame from a rear abutment and the bow connected thereto. A covering bow must be pivoted up in several steps, wherein the covering bow rests less reliably on the understructure and cannot be locked thereto in a user-friendly manner.

US 2007 006 35 30 A1 describes a tarpaulin structure for an understructure, with a folding-top frame and with a tarpaulin made of weather-resistant material, wherein the folding-top frame includes a plurality of struts; at the end, each of the struts has a carriage that is movable along a guide. Here, on both sides of the strut, a bow is pivotally connected in each case to the strut close to the carriage, wherein the bow forms a tarpaulin folding aid along with a bow of an adjacent strut. Here, the adjacent bows are in each case connected non-rotatably to a cantilever in the area of the bow sections facing away from the carriage, in such a manner that the mutually facing cantilevers of the mutually facing bows are connected in a single joint formed by a cylindrical pin extending substantially over the width of the folding-top frame, in such a manner that, when the folding-top frame is closed, the pin protrudes above the upper area of the struts and thus lifts the tarpaulin and prevents it from sinking down into the areas between the mutually facing bows. One disadvantage here is that the tarpaulin can then not be arranged without play in the area of the carriage, since the tarpaulin must also reproduce the lifting movement of the lifting hoops. Another disadvantage is that the rigid cantilevers are not capable of compensating for length differences of the folding-top frame, but instead can only be used in precisely defined sizes due their angular position with respect to the bow supporting them.

U.S. Pat. No. 7,325,855 B2 describes a tarpaulin structure for a semi-trailer, wherein a folding-top frame carries a tarpaulin made of weather-resistant material, wherein the folding-top frame includes a plurality of U-shaped struts; at the end, each of the struts has a carriage that is movable along a guide. Here, in each case, bows are articulated on both sides of the struts, on the one hand, in the area of the carriage, and, on the other hand at about half-height of the strut, wherein the upper bows can be pretensioned by a spring arrangement in an actuation direction, while the lower bows in the area of the side wall are connected to one another by a coupling rod which supports a U-shaped lifting strut extending over the width of the folding-top frame. This tarpaulin structure too allows only certain sizes, implemented as a multiple of the distance separating the struts, since the interconnected struts cannot be dimensioned flexibly.

EP 0 955 196 A1 describes a tarpaulin structure for a railway car, in which a tarpaulin made of weather-resistant material is supported by a folding-top frame, wherein the folding-top frame includes a plurality of U-shaped struts; at the end, each of the struts has a carriage that is movable along a guide provided in the area of the loading surface. To the struts, on both sides, a connecting rod is connected in each case, wherein the mutually facing connecting rods of the adjacent struts are connected to one another and to a cylindrical, vertically oriented guide sleeve, in which a U-shaped lifting strut is vertically movably accommodated, which, when the adjacent struts are moved together, are lifted upward by the pivoting of the connection rods. A disadvantage of the tarpaulin structure is that the struts have to be arranged very close to one another, so that an overall very large-size folding-top frame of relatively heavy weight and with very small clear opening results therefrom.

DE 10 2013 201 006 A1 describes a tarpaulin structure designed in the form of a sliding roof for a truck, in which a substantially flat tarpaulin made of weather-resistant material is connected to a folding-top frame, in order to enable the opening and closing of the roof. The folding-top frame includes a plurality of struts designed as elongate hoops, which in each case can lift lifting elements arranged in each case between the adjacent carriages and are designed in the form of a connecting rod. The carriages are movable along a roof rail which forms a guide, wherein a portal beam is pivotally connected to the frontmost pair of carriages, wherein the tarpaulin is also connected to the portal beam. The portal beam extending transversely to the opening direction is connected on both sides via a kinematic linkage designed as a four-joint kinematics to the frontmost carriage, wherein the frontmost carriage in addition includes two struts spanning over the roof opening and designed as hoops, wherein the connecting rods of the four-pivot joint rest at least partially in a recess of the frontmost carriage arranged substantially beneath, but at least at the height of the guide, when the portal beam is lowered. The tarpaulin structure includes a locking arrangement with a first locking member guided in a frontmost carriage and with a second locking member guided in the opposite frontmost carriage, locking members which are in each case tensioned by a spring in locking direction and as a result of actuation are simultaneously axially movable in their respective unlocking direction. For this purpose, each bolt is connected to a rope associated with it with an actuation device on the opposite side, wherein the two ropes lie next to one another in the area between two struts, without being guided on the struts. The two ropes are coupled to one another in the center of the tarpaulin structure, and thereby a one-sided actuation of the two locking members is actuated. However, a disadvantage here is that the transported goods can catch on the ropes, and an unintended opening of the roof can occur.

FR 2 653 478 A1 describes a tarpaulin structure for a semi-trailer, wherein a folding-top frame is arranged in the roof area, to which folding-top frame a tarpaulin made of weather-resistant material is connected, enabling an opening and closing of the roof. The folding-top frame includes a plurality of struts designed as elongate hoops; at the end, each of the struts has a carriage that is movable along a guide formed by a pair of longitudinal supports. Between the adjacent struts, a lifting hoop is arranged in each case, which is non-rotatably coupled to an elongate connecting rod articulated to a carriage, resulting in a tarpaulin folding aid which results due to the pivoting movement of the elongate connecting rod forming a bow which can be pivoted around the carriage along with the lifting hoop, wherein the bow is connected by means of a toggle link made of two connecting rod parts to the adjacent carriage. The known sliding roof moreover includes an end-side covering bow which is designed similarly to the lifting hoop and is pivotally connected to the frontmost pair of carriages. In the side area of the covering bow, a plate-shaped locking catch is arranged, which, during the downward pivoting, in the area of the openable end of the longitudinal support, works together with a pin connected to the longitudinal support, so as to lock the folding-top frame. Here, in the closed state of the plate of the tarpaulin structure, the plate body rests partially on a horizontal portion of the carriage, while a pretensioning means pretensions the covering bow in the opening direction. In the completely closed state, the direction of action of the spring with respect to its articulation on the covering bow is such that a top dead center locking occurs, which has to be overcome by pushing the covering bow vertically upward. The folding-top frame can be actuated by a crank. A disadvantage is in particular the set-up kinematic by the pivotable lifting hoop.

DE 10 2012 006 385 A1 describes a tarpaulin structure for a commercial vehicle, in which the tarpaulin made of weather-resistant material is connected to a folding-top frame forming a sliding roof, wherein the folding-top frame includes a plurality of struts extending in the roof plane and designed as elongate hoops; at the end, each of the struts has a carriage that is movable along a guide formed by a longitudinal support. On the frontmost (in driving direction rearmost) strut, a portal beam which is also movable along the guide is connected, wherein, in the area of one of the two carriages of the frontmost strut, a locking arrangement is provided, which locks the carriage with respect to the guide formed by the longitudinal support, wherein the locking arrangement can be unlocked by unilateral pulling on a loop. The locking arrangement is provided on only one side of the frontmost strut and cannot readily lock the folding-top frame to the two elongate supports. The locking arrangement includes a first locking member and a second locking member, which are arranged on the same longitudinal side of the tarpaulin structure and which are simultaneously movable in an unlocking direction by actuation of the pulling loop. A disadvantage of the tarpaulin structure is in particular the fact that a common unlocking of in each case one locking arrangement on both sides of the tarpaulin structure by actuation from outside cannot be done by an operating person.

WO 2007 056 989 A2 describes a tarpaulin structure with a folding-top frame which is provided for supporting a tarpaulin, in which the folding-top frame includes a plurality of struts designed as elongate hoops, which are movable via carriages along a guide designed as longitudinal support in the roof area, wherein, to the frontmost carriage, a locking member with a sliding guide is pivotally connected, which works together with a second locking member connected to the longitudinal support in such a manner that the locking is released when the tarpaulin is pulled in closing direction.

EP 0 778 169 B1 describes a tarpaulin structure for the roof area of a truck, in which a folding-top frame supports a tarpaulin made of weather-resistant material, wherein the folding-top frame includes a plurality of struts designed as elongate hoops; at the end each of the struts has a carriage that is movable along a guide formed by two longitudinal supports. The adjacent hoops are coupled by articulation to said connected pairs of folding plates, wherein each of the two folding plates is connected by articulation by means of a continuous hoop. On the frontmost strut, a covering bow implemented as a portal beam is connected, which is subjected to the action of a cylinder in a movement direction, wherein, in the area of the arm of the covering bow, a hook is provided on both sides, which is pivoted by a pin with an end facing away from the hook, the hook portion of which engages with an additional pin for a positive-connecting engagement. On the portal beam of the covering bow, an additional pin is provided, which is gripped by a pivotable hook pivotally connected to the longitudinal support, in order to secure the portal beam from being lifted. If the folding-top frame is to be opened, it is necessary to first enter the inner space, and the pivotable hook has to be pivoted free, before the covering bow can be lifted. An unlocking from outside of the folding-top frame, which would avoid entry into the tarpaulin structure, is not possible. Furthermore, the connection of the covering bow to the guide occurs directly in each case, so that a setting up of the covering bow by moving the frontmost carriage along the guide is not possible.

DE 10 2012 216 151 A1 describes a tarpaulin structure for a dump truck, in which a tarpaulin made of weather-resistant material over a folding-top frame of the tipping trough can be opened for clearing an opening and closed again. The folding-top frame includes a plurality of U-shaped struts, each of the struts being connected at the end to a guide element, wherein the guide elements are coupled to a drivable actuation rope. A covering bow which in the closed state of the tarpaulin structure rests substantially flat on the tipping trough is rotatable around a folding axis, wherein a pin arranged on the understructure pivots an extension of the covering bow from a set-up position into a lowered position and vice versa. During the lowering of the covering bow, a spring which loads the covering bow in opening direction is tensioned, so that the extension rests on the pin. If the folding-top frame is moved in opening direction, the spring causes the covering bow to pivot upward without the assistance of an operating person.

It is the object of the invention is to indicate a tarpaulin structure having a low own weight that enables a reliable covering of an understructure.

This object is achieved according to the invention with the features of an independent claim.

According to an aspect of the invention, a tarpaulin structure for an understructure, such as a truck, trailer, semi-trailer, railway car, dump truck or container, is created, comprising a folding-top frame and a tarpaulin made of weather-resistant material, wherein the folding-top frame has a plurality of struts which have, on the ends, in each case a carriage which is diplaceable along a guide. Here, at least one bow is pivotally connected either to a pair of opposite carriages of the strut or to the strut, wherein the bow forms a tarpaulin folding aid along with a bow of an adjacent strut or of a pair of opposite carriages or of a stationary part of the folding-top frame, by means of which the tarpaulin can be folded when the folding-top frame is shifted together. The tarpaulin structure is distinguishes in that the adjacent bows are coupled to one another by means of a kinematic connecting rod assembly that can be folded up when the folding-top frame is moved together.

Advantageously, it is achieved thereby that, when the folding-top frame is open and the understructure is thus uncovered, the tarpaulin structure has a short total installation height, since the bows can be arranged at a relatively small angle with respect to the struts. In order to be able to move together the adjacent bows in a controlled manner, that is to say the bows turned toward one another, the kinematic connecting rod assembly assists, in that a force introduced into the folding-top frame leads to the folding up of the kinematic connecting rod assembly. The resulting lengthening of the active bows does not occur to the detriment of the installation height of the tarpaulin structure, instead it achieves a particularly advantageous packing density due to the folding up of the kinematic connecting rod assembly. As a result, it is not necessary for the adjacent connecting rods to be in contact with one another in order to move together the folding-top frame, instead, by the targeted folding up of the kinematic connecting rod assembly, a determined behavior of the folding-top frame during the moving together is achieved, so that in particular a tilting of the struts with respect to the guide is also prevented, and a pulling force introduced into the tarpaulin structure on one side is reliably transmitted from the pair of carriages into which the pulling force is introduced to the additional pairs of carriages which are connected each by a strut.

A particular advantage of the tarpaulin structure according to the invention can be seen in that the tarpaulin structure can be adapted substantially more flexibly to length requirements of the understructure. Thus, for the adaptation to the distance between adjacent carriages, the provision of a kinematic connecting rod assembly makes it possible to select the length of the connecting rod or of at least one connecting rod to be shorter or longer. Alternatively, in the case of a fixed length of the connecting rod of the kinematic connecting rod assembly, the setting angle of the connecting rods can be set differently, in order to achieve a corresponding length compensation.

Preferably, the kinematic connecting rod assembly can be folded downward, when the folding-top frame is moved together, so that the shifting movement of the parts of the kinematic connecting rod assembly substantially has a vertically downward directed component. Said movement is superposed by additional movements due to the pivot articulation connection of the parts of the kinematic connecting rod assembly. Overall, by the provision of a downward directed folding, the kinematic connecting rod assembly can be connected very high up to the mutually facing bows, where said bows already are very close to one another, so that the kinematic connecting rod assembly overall takes up only little space. Furthermore, thereby, a very large area under the connection to the bows is provided, into which the kinematic connecting rod assembly can give way. The downward movement should not be understood in an absolute sense, since, by the pivoting of the bows, the articulation of the kinematic connecting rod assembly on the bows is moved upward during the opening of the tarpaulin structure.

Here, the folding up movement of the kinematic connecting rod assembly does not necessarily have to occur exclusively downward, instead it is sufficient if a downward directed component is included or predominates. Thus, the kinematic connecting rod assembly can also lead to a three-dimensional movement, for example, to a movement in which the tarpaulin is pressed to some extent outward, in order to avoid a jamming of the tarpaulin between the parts of the folding-top frame, in particular between adjacent bows or between bow and strut.

Advantageously, the kinematic connecting rod assembly includes a toggle link, wherein the bend of the toggle link is provided preferably approximately and particularly preferably absolutely centrally, wherein, when the folding-top frame is moved together and the kinematic connecting rod assembly is thus folded up, the bend is advantageously moved downward. The toggle link is a particularly simple kinematic connecting rod assembly which requires only three articulation points and by which a connection of the mutually facing bows can be achieved. A particular advantage of the toggle link consists in that, due to the small play of the articulation pin in the articulation eye, the folding-top frame has little tendency to move as a result of influences of the surroundings during transport. Furthermore, thrust forces can be transmitted to some extent. However, it is also possible that, in addition to the articulation pin which can be pivoted in an articulation eye, the toggle link also includes an oblong hole-type articulation eye, resulting in a certain axial guidability of the articulation pin in the oblong hole-type articulation eye in the manner of a sliding track. The force acting in the movement direction of the folding-top frame then leads to a movement of the articulation point in the area of the bend, whereby the movement of the bend is achieved with higher reliability. Alternatively, a kinematic connecting rod assembly can also be considered, which is designed as a scissor articulation, or a kinematic connecting rod assembly which is designed as having multiple articulations, in particular four articulations. The multiple-articulation kinematic connecting rod assembly, which is likely to be of asymmetric design, has indeed a higher number of parts, but, on the other hand, the course of its movement is more predetermined. A kinematic connecting rod assembly containing multiple bends is also considered.

The connecting rods of the kinematic connecting rod assembly can be designed either as rigid lever-like connecting rods or as plastic parts or as wire components, as long as a defined pivoting of the connecting rods with respect to one another and preferably also with respect to the bows to which they are fastened is obtained. Advantageously, one of the connecting rods is implemented with a step, so that it can pivot past the other connecting rod. The step then also forms an abutment for the other connecting rod, which limits the minimum angle between the two connecting rods. It is also possible to limit the maximum pivot angle by an abutment, for example on the connecting rods in the area of the common articulation.

According to a preferred design, the kinematic connecting rod assembly includes a first connecting rod and a second connecting rod, wherein each of the first connecting rod and second connecting rod in each case is connected to one of the two adjacent bows, wherein the first connecting rod and the second connecting rod are connected to one another via an articulation. The articulation then forms the bend of a toggle link consisting of the first connecting rod and the second connecting rod, wherein the first connecting rod and the second connecting rod can be folded up via the common articulation and also enable a pivoting with respect to the bows via the articulations by means of which they are in each case connected to the bows.

To reduce the risk of overturning of the kinematic connecting rod assembly, it is possible, for example, to limit the pivot angle of the connecting rods on the bow, for example, by an abutment and/or to limit the pivot angle of the common articulation of first connecting rod and second connecting rod, so that an unintentional pivoting outside of the intended pivot area of the toggle link is avoided. If the kinematic connecting rod assembly is folded up, the weight of the first connecting rod and second connecting rod leads to the common articulation moving substantially downward.

The pivot angle of the common articulation can be implemented, for example, by an elongatable connecting brace, which is connected to the first connecting rod and the second connecting rod at a distance from the common articulation, and which limits the maximum opening angle of the first connecting rod with respect to the second connecting rod. The connecting brace is particularly advantageous when the movable part of the folding-top frame is moved from the open position into the closed position, since this prevents the first connecting rod and the second connecting rod from extending in a straight line, that is to say from forming an angle of 180°, which would represent a dead point position in which there would be a risk of the bend giving way in the wrong direction.

When the folding-top frame is closed, the first connecting rod and the second connecting rod advantageously enclose an angle between 90° and 180°, wherein preferably the enclosed angle is between 120° and 170°, and particularly preferably between 150° and 165°. Since the angle is smaller than 180° and faces downward, the folding up of the kinematic connecting rod assembly downward is promoted.

The bows are advantageously designed to be U-shaped with a base and two arms, wherein each of the arms is connected to a carriage or to an arm of the strut, wherein the first connecting rod and/or the second connecting rod in each case is/are articulated to one of the arms. Thereby, the kinematic connecting rod assembly is prevented from having to be connected in the area of the base of the bows, which is turned away from the articulations of the bows, where, when the understructure is loaded, the kinematic connecting rod assembly could possibly come in conflict with the load. The bows which pivot in the direction of the strut when the folding-top frame is opened then make room for the folded kinematic connecting rod assembly or the connecting rods thereof.

Advantageously, the two adjacent bows are arranged spaced apart from one another, so that the tarpaulin folding aid formed by the two bows comprises in addition the at least one kinematic connecting rod assembly. As a rule, on both sides, a kinematic connecting rod assembly, preferably in the form of a toggle link, will be provided, so that a force acting in opening or closing direction is transmitted evenly from a pair of carriages connected by a strut via the bows and the kinematic connecting rod assembly to the adjacent pair of carriages connected by a strut, and no tilting occurs. However, it is also possible to arrange more than two kinematic connecting rod assemblies between two adjacent bows, for example, if the corresponding area of the folding-top frame should be reinforced thereby.

According to a preferred feature, it is provided that the kinematic connecting rod assembly is arranged in an area of the bow which lies outside of a space of the understructure that receives a load. Thus, as a result of the folding up, in particular downward, a collision with the load is avoided.

Alternatively or additionally, it is possible to provide in the area of the base of the bows a kinematic connecting rod assembly which connects the bases of the two bows to one another. Then, the common articulation gives way outward or inward in a horizontal plane, wherein, in the case of the provision of two kinematic connecting rod assemblies, only half the width of the folding-top frame is available for giving way in the area of the base. In addition, the space for giving way for forming a fold of the tarpaulin between the two adjacent bows is then eliminated, since a kinematic connecting rod assembly is then arranged there. It is possible to provide different kinematic connecting rod assemblies on a bow and on a base.

Particularly preferable is a tarpaulin structure in which all the pairs of adjacent bows are connected to one another by at least one kinematic connecting rod assembly and preferably by two kinematic connecting rod assemblies which are preferably in a mirror image arrangement with respect to one another, so that, between adjacent struts and/or bows, no spaces are formed, whereby the connection of the parts of the folding-top frame occurs exclusively via the tarpaulin. Thereby, a particularly advantageous and reliable behavior of the folding-top frame during opening and closing is achieved, and the tarpaulin is moreover stabilized by the folding-top frame over the entire length of the tarpaulin structure. Alternatively, it is also possible that only one pair of bows or only selected pairs of bows are connected to one another via the kinematic connecting rod assembly, while other pairs of bows are either not connected at all or optionally in direct contact with one another, or connected together by a strap, a belt or the like.

According to a preferred development, it is provided that the inclination, that is to say the tendency, of the kinematic connecting rod assembly to fold up can be adjusted by a mechanical holding arrangement. Such a mechanical holding arrangement can be, for example, an articulation brake of the common articulation, a spring member or damping element provided between the connecting rods of the kinematic connecting rod assembly, a tensioning belt or the like engaging with the bows or the connecting rods or the struts, and it makes it possible in particular that the order in which the adjacent struts move together can be controlled. Hereby, a similar mechanical holding arrangement can also be provided between bows and carriages and/or strut. According to a first preferred design, it is achieved thereby that the areas of the folding-top frame lying in the rear in opening direction fold up first, and the front segments fold only toward the end of the opening process. According to an alternative design, the front segments move together first, and at the end the rear segments together. In particular, thereby the moving together of segments of the tarpaulin structure is prevented from occurring substantially randomly, whereby the weights moved and the forces required can therefore vary considerably. Furthermore, the mechanical holding arrangement, if it contains an energy storage, can also provide assistance during the opening or during the closing of the folding-top frame.

Advantageously, the struts are of U-shaped design, wherein in the closed state of the tarpaulin structure a base of the U-shaped struts, which is turned away from the carriage, is arranged at approximately the same height as the areas of the bows, in particular the base of the bows, which is turned away from the carriage. Thereby, it is achieved that the tarpaulin which is advantageously connected to struts and bows, provides a closure of the closed tarpaulin structure in a substantially horizontal plane. Since the tarpaulin also laterally covers the arms of the struts and/or of the bows, the tarpaulin will span over the understructure substantially in a rectangular shape. Advantageously, the kinematic connecting rod assembly is arranged slightly under the plane of the base of the bow, so that the kinematic connecting rod assembly cannot interact with the roof area of the tarpaulin. At the same time, the kinematic connecting rod assembly is preferably connected very high up to the bows, in order to provide the largest possible area for descending downward, in which the parts of the kinematic connecting rod assembly do not come in contact with the guide and/or the carriage, which can lead to unpleasant noises but also to wear.

According to an aspect of the invention a tarpaulin structure for an understructure, such as a truck, trailer, semi-trailer, railway car, dump truck or container, is created, comprising a folding-top frame and a tarpaulin made of weather-resistant material, wherein the folding-top frame has a plurality of struts which have, on the ends, in each case a carriage, wherein the carriage is movable along a guide. At least one bow is pivotally connected to either a pair of opposite carriages of the strut or to the strut, wherein the bow forms a tarpaulin folding aid along with a bow of an adjacent strut or of a pair of opposite carriages or of a stationary part of the folding-top frame. It has to be understood that the tarpaulin folding aid moreover can contain a kinematic connecting rod assembly connecting the adjacent bows as described above. Here, on the frontmost pair of carriages, a covering bow is pivotally connected, which can cover the front portion of the understructure. Here, the frontmost carriage includes a frame section which is arranged above the guide in a horizontal plane, wherein the frame section forms a support for the covering bow in its pivoted-down state.

Thereby, it is advantageously achieved that the support for the covering bow can be moved along the guide without the covering bow lying on the understructure and without the covering bow having to form a closure with said understructure. Thereby, it is avoided in particular that, in the case of unintended damage to the understructure, the covering bow and understructure can no longer be brought together. The mutually coordinated supports and covering bows enable a substantially more sealing closure, so that transported goods are less likely to escape. At the same time, it is possible that the covering bow is articulated to the frame section, which in turn can form a component with the frontmost pair of carriages, so that the covering bow overall can be designed to be very short. A particular advantage consists in that, even if the covering bow is pivoted down, the movable part of the tarpaulin structure can be moved along the guide, or else the covering bow can be pivoted down again even if the folding-top frame is not completely closed, so that, when the covering bow is already pivoted down before the end position is reached, the movement can be continued.

Advantageously, the covering bow includes a support area arranged outside of its articulation to the carriage and which lies horizontally on the frame section. Thereby it is advantageously possible that the covering bow is adapted to the course of the tarpaulin to be reinforced by it, while the support area rests on the support when the covering bow is pivoted down. The support area can be designed to form a single piece with the covering bow, but preferably it is a brace which is connected to the covering bow.

The covering bow preferably includes an angular arm, so that the covering bow has a three-dimensional extent. Thereby, advantageously, the angular arm has a short arm section which is articulated on the frontmost carriage, and, furthermore, the angular arm includes a long arm section which is angled with respect to the short arm section by an arm angle of more than 90° and less than 145°, and preferably of approximately 120°. The support area then connects the short arm section and the long arm section in an area turned away from the arm angle, so that the support area lies approximately in a horizontal plane with the base of the covering bow. Thereby, the covering bow is designed in a particularly robust manner and with arms of triangle-like design and it can pivot around its articulation without twisting and at the same time maintain the shape of the tarpaulin by means of its angular arms.

According to a particularly preferred embodiment, it is provided that the covering bow in its open state lies horizontally with the short arm section on the frame section. Thereby, the covering bow has two stable states maintained in position by the weight of the covering bow, which are both supported on the frame section, wherein in the pivoted-down state, the support area, and in the pivoted-up state, the short arm section are each supported on the frame section. Thereby, the frontmost carriage can be moved along the guide both with covering bow opened and also with covering bow pivoted down, without the covering bow introducing a resistance against the movement into the system.

According to an advantageous development, it is provided that the articulation of the covering bow is arranged in a horizontal plane above a plane of the articulation of the bows. However, alternatively it is also possible to provide the articulation of the covering bow in the same plane or in a lower plane, or, in the design of the articulation connection of the covering bow to the carriage and/or to the frame section, to provide a connection having multiple articulations, for example four articulations, by means of which a stable position can be achieved, which does not make it necessary for the covering bow to be supported on the frame section.

Preferably, it is provided that the covering bow is articulated on the frame section, and, furthermore, that in each case at least one support roller and at least one counter-roller are connected to the frame section. Thereby, it is advantageously achieved that the covering bow can also be pivoted without connecting rod transmission around its articulation.

According to a preferred design, the covering bow protrudes at least to some extent over the frame section in the opening direction, whereby the guide, along which the frontmost carriage and the frame sections can be moved, can be designed to be slightly shorter. Thereby, a locking between the covering bow and the frame section closer to the articulation of the covering bow on the frame section can be provided.

According to a preferred development, it is provided that the covering bow in the area of its lateral arm is designed in the manner of a truss which ensures high rigidity and thereby also additionally reinforces the two frontmost carriages with respect to one another. Furthermore, it is advantageously provided that a lower horizontal brace of the truss or of the lateral arm lies at least partially on the frame section, so that in the case of a movement of the frontmost carriage the covering bow is accordingly also moved with the frame section.

Advantageously, an actuation rod protrudes from the lateral arm of the covering bow and includes a bent end section which, together with a deflection element, in a manner of a roller, brings about at least one of the pivoting up movement and the pivoting down movement of the covering bow. The actuation rod is designed as an extension of the lateral arm of the covering bow and thus enables a play-free pivoting up of the covering bow without interconnected connecting rod transmission and without the bearing play associated therewith in the associated articulations.

According to an aspect of the invention, a tarpaulin for an understructure, such as a truck, trailer, semi-trailer, railway car, dump truck or container, is created, comprising a folding-top frame and a tarpaulin made of weather-resistant material, wherein the folding-top frame has a plurality of struts which have, on the ends, in each case a carriage which is displaceable along a guide. Here, at least one bow is pivotally connected either to a pair of opposite carriages of the strut or to the strut, wherein the bow forms a tarpaulin folding aid along with a bow of an adjacent strut or of a pair of opposite carriages or of a stationary part of the folding-top frame, which can contain a kinematic connecting rod assembly as described above but does not have to, for example, if the tarpaulin folding aid is achieved by bows connected to one another. Here, a covering bow is pivotally connected to the frontmost pair of carriages, wherein an auxiliary bow is articulated on the frontmost carriage between the covering bow and the strut connected to the frontmost carriage. Like the strut, the auxiliary bow extends from one frontmost carriage of the pair of frontmost carriages to the other opposite frontmost carriage. In terms of its angular position and in its extension, that is to say substantially its height, the auxiliary bow is selected so that it supports the tarpaulin in an area between the covering bow and the strut. Here, the auxiliary bow is advantageously arranged so that it does not prevent the pivoting up of the covering bow.

According to a particularly preferred design, it is provided that, between the preferably U-shaped auxiliary bow and the covering bow, a pretensioning member is arranged, which pretensions the covering bow against its closing direction. In particular, the pretensioning member can have the effect that, when the covering bow is unlocked, said covering bow is raised against its closing direction. At the same time, the pretensioning member can have the effect that the auxiliary bow is also pivoted from its orientation with closed tarpaulin structure into a changed position. The pretensioning member thus assists a pivoting up movement of the covering bow and at the same time dampens the pivoting down covering bow to some extent. Alternatively, it is also possible to provide the pretensioning member between the covering bow and the strut arranged on the frontmost pair of carriages or to incorporate the pretensioning member in the tarpaulin.

It is also possible that, instead of a pretensioning member, a connection member in the manner of a coupling rod is in each case articulated between covering bow and auxiliary bow, whereby a kinematic connecting rod assembly with four articulations would be implemented, which advantageously couples the relative movement of the two parts. Instead of the coupling rod, another kinematic connecting rod assembly can also be provided.

Advantageously, the pretensioning member is selected from the group comprising a tension spring, a pulling strap, an elastic belt, an elastic web or tarpaulin or a combination thereof. It is possible to combine several of the mentioned possibilities with one another, in particular the inclination of the tarpaulin to pull together to some extent can be used for this purpose.

According to a preferred development, there is a distance provided between an articulation of the auxiliary bow and the strut, such that, when the folding-top frame is partially or completely open, the auxiliary bow can be transferred into a turned over position toward the strut of the frontmost pair of carriages. Thereby, in the open position of the auxiliary bow, said auxiliary bow is not held in a metastable position which has a tendency to drop, but instead the auxiliary bow can be pivoted past its dead point and thus lean against the strut or against an abutment provided for this purpose. At the same time, the pretensioning member between auxiliary bow and covering bow then works particularly effectively. The pretensioning member is designed here so that when the covering bow is pivoted up, the auxiliary bow cannot be pivoted from its turned over position back into its position turned toward the covering bow.

Preferably, the articulation of the auxiliary bow is provided on a frame section connected to the front carriage, so that the distance to the strut of the frontmost pair of carriages is increased and an overturning of the auxiliary bow is facilitated.

According to a preferred design, it is provided that, between the strut and the auxiliary bow, a second pretensioning member is arranged, which pretensions the auxiliary bow against its closing direction. The second pretensioning member ensures that the auxiliary bow is pulled in the direction of its turned over position, wherein the weight of the auxiliary bow and the weight of the covering bow connected by the auxiliary bow connected via the first pretensioning member tension the second pretensioning member. Due to this configuration, together with the friction which prevents a pivoting movement in the articulations of the auxiliary bow and of the covering bow and which is preferably adjustable, for example, by adjustable screwing or inserted plates, it is achieved that the system consisting of auxiliary bow and covering bow always remains in the position in which it was moved by the axial movement of the movable parts of the folding-top frame along the guide. Hereby, the covering bow is advantageously prevented from falling by its own weight onto the understructure or the frame section when shaking occurs.

Preferably, the second pretensioning member is selected from the group comprising a tension spring, a pulling strap, an elastic belt, an elastic web or tarpaulin or a combination thereof. The group also comprises additional elastic means which can assume the function of a pretensioning member.

According to a preferred design, it is provided that the second pretensioning member is connected at both ends to the frontmost strut and that a central area of the second pretensioning member is placed around the auxiliary bow. Thereby, it is ensured that the second pretensioning member is not fully untensioned even when the auxiliary bow leans against the frontmost strut, so that a residual tension remains. In this case, the pretensioning member is designed, for example, as an elastic belt which already has sufficient tension between its two ends to prevent relaxing when the auxiliary bow is pulled up.

In contrast thereto, when the covering bow is also in a turned over position leaning against the auxiliary bow and against the strut, the first pretensioning member is largely untensioned, so that, when the auxiliary bow is pivoted up, the second pretensioning member is tensioned more strongly than the first pretensioning member.

Preferably, the pretensioning members at least partially, preferably mostly, compensate for the torque generated by the weight of the covering bow, so that less force needs to be applied for the movement of the covering bow. Accordingly, the actuation rod connected to the lateral arm of the covering bow can be designed to be short, in any case shorter than the length of the lateral arm of the covering bow, without the load resulting from the transmission ratio and the difference in weight inhibiting the pulling up of the movable parts of the folding-top frame.

According to an aspect of the invention, a tarpaulin structure for an understructure, such as a truck, trailer, semi-trailer, railway car, dump truck or container, is created, comprising a folding-top frame and a tarpaulin made of weather-resistant material, wherein the folding-top frame has a plurality of struts which have, on the ends, in each case a carriage that is displaceable along a guide. Here, at least one bow is pivotally connected either to the pair of opposite carriages of the strut or to the strut itself, wherein the bow forms a part of a tarpaulin folding aid together with a pivotable bow of an adjacent strut or of a pair of opposite carriages or of a stationary part of the folding-top frame, wherein the tarpaulin folding aid can but does not have to contain a kinematic connecting rod assembly connecting the bows to one another. A covering bow is pivotally connected to the frontmost pair of carriages, wherein the covering bow comprises an extension which can be pivoted together with the covering bow around its articulation. Here it is provided moreover that the extension can be pivoted via a connecting rod transmission for the pivoting of the covering bow into one of its two end positions, that is to say a pivoted-down position or a pivoted-up position. Thereby, the covering bow can be pivoted completely from an end position into the other end position, wherein the connecting rod transmission can convert the relative movement of the folding-top frame along the guide into a pivoting movement of the covering bow. This simplifies the actuation of the folding-top frame, and, as a result, the covering bow can be designed simply, since only the frontmost carriage has to be moved along the guide. The axial shifting movement of the carriage is advantageously converted by the connecting rod transmission into a pivoting movement of the covering bow, so that it is simple to operate the folding-top frame from the support plane of the understructure. At the same time, the pivoting up movement of the covering bow is kinematically connected with the opening movement of the tarpaulin structure, and accordingly the pivoting up movement of the covering bow is kinematically connected with the closing movement of the tarpaulin structure, so that the tarpaulin structure can be operated easily by a user.

The arrangement of the covering bow on the frame section makes it possible to dispense with providing the covering bow itself with rollers that can be moved along the guide, so that malfunctioning cannot occur here when the covering bow has been deformed to some extent from outside by the operating person, by the load or due to damage. In addition, the covering bow is uncoupled from the guide and from the understructure and can be locked directly to the carriage or to a frame section of the carriage.

Advantageously, the connecting rod transmission comprises an actuation rod and an intermediate connecting rod which are coupled to one another and which contribute to the pivoting of the covering bow. It is possible to integrate additional connecting rods and levers in the connecting rod transmission, for example, when an articulation is replaced by an assembly having multiple articulations.

Advantageously, at least one of the articulations of the connecting rod transmission is additionally guided in an oblong hole-type sliding track, so that a deflection of the parts of the connecting rod transmission in lateral direction is prevented. For this purpose, the articulation area is designed in the manner of a support roller with lateral flanges that are braced against lateral drift in the sliding track which is preferably in the shape of an arc of a circle.

The intermediate connecting rod is here coupled in each case by articulation to the extension and to the actuation rod, so that a pivoting movement of the actuation rod results in a pivoting movement of the intermediate connecting rod, which in turn drives the covering bow via the extension.

Preferably, a articulation of the actuation rod is located in front of the articulation of the covering bow, i.e., farther from the strut of the frontmost carriage than the articulation of the covering bow. Thereby, an advantageous lever arm of the actuation rod can be achieved. In particular, in this way, a relatively small force in the case of a relatively long path for the pivoting of the actuation rod is achieved, so that the force required for the pivoting of the covering connecting rod is not likely to block the movement of the folding-top frame.

Advantageously, the actuation rod has a bent end section which, with a deflection member such as, for example, a roller, arranged on the guide or the understructure, brings about at least one of the pivoting up movement and the pivoting down movement of the covering bow. Here, a first roller can bring about the pivoting up movement of the covering bow, while a second roller, which works together with the shifted actuation rod, brings about the pivoting down movement of the covering bow. For this purpose, when the covering bow is open, the actuation rod is arranged approximately in the plane of a frame section extending the frontmost carriage, so that the end of the actuation rod which then faces forward can come in contact with the deflecting member. The convex side of the bent end section in the process preferably moves in the pivoting down direction, while the concave side of the bent end section moves in the pivoting up direction when the corresponding side engages with the deflection member.

Here, advantageously, the connecting rod transmission allows a partial pivoting up of the covering bow when the understructure is tipped, so that the understructure can be designed as a tipping trough from which the contained load can be discharged through a trough flap which can be pivoted up. However, at the same time the connecting rod transmission can limit the maximum angle that the covering bow can pivot away from the understructure, so that an angle of only approximately 30°, but not more, between understructure and covering bow is possible. However, for this purpose, a separate hook is preferably provided, which is arranged outside of the connecting rod transmission; on the other hand, the locking can also occur on mutually pivotable parts of the connecting rod transmission.

According to an advantageous design, it is provided that the covering bow includes in each case an extension on the two longitudinal sides of the folding-top frame or its articulation, said extension being pivotable together with the covering bow around its articulation, and that each of the extensions can be pivoted in each case via its own connecting rod transmission for the pivoting of the covering bow into one of its end positions. The two connecting rod transmissions are then advantageously in a mirror image arrangement with respect to a plane which bisects the tarpaulin structure longitudinally. Thereby it is advantageously achieved that the pivoting up movement of the covering bow occurs approximately evenly from the two arms articulated to the carriage, resulting in a symmetric loading of the covering bow and an even folding of the tarpaulin.

According to a preferred embodiment, it is provided that the connecting rod transmission is controlled on one side of the folding-top frame for the pivoting up of the covering bow and that the opposite connecting rod transmission is controlled on the other side of the folding-top frame for the pivoting down of the covering bow. Thereby, it is advantageously achieved that the connecting rods of the connecting rod transmission can run over a large pivoting angle without colliding in the process with the additional deflection member, since on each of the two sides in each case only one deflection member is provided for the deflection on one or on the other side. Advantageously, the deflection members are here spaced apart in longitudinal direction of the guide by a distance which is greater than the length of the actuation rod, so that a simultaneous engagement of the actuation rod with the two deflection members is prevented.

Advantageously, the guide moreover includes an abutment for the maximum movement forward of the frontmost carriage, that is to say in closing direction, whereby the carriage is prevented from moving past the end of the guide or past the position intended for it when the tarpaulin structure is closed.

The articulation of the covering bow very far forward advantageously makes it possible for the covering bow to have a very short distance between articulation and its base connected to the articulation via arms, so that the height necessary for pivoting the covering bow can be small.

According to an aspect of the invention, a tarpaulin structure for an understructure, such as a truck, trailer, semi-trailer, railway car, dump truck or container, is created, comprising a folding-top frame and a tarpaulin made of weather-resistant material, wherein the folding-top frame has a plurality of struts which have, on the ends, in each case a carriage that is movable along a guide, wherein at least one covering bow is pivotally connected to the frontmost pair of carriages. Here, the covering bow can be locked to the frontmost carriage via a pivotable hook. By means of the locking of the covering bow to the frontmost carriage, in particular to a frame section protruding from the frontmost carriage, which can be moved only in the longitudinal direction of the guide, a possibility of fastening the tarpaulin to the understructure is advantageously created, without at the same time having to lock the covering bow to the understructure. Thus, an advantageous uncoupling of the locking, on the one hand, of the carriage to the guide and thus to the understructure, and, on the other hand, of the covering bow to the carriage occurs.

The hook can selectively be pivotally connected via at least one articulation to the covering bow, or else the hook can be connected via at least one articulation to the frontmost carriage. In both cases, the hook then advantageously engages with a counter-bearing which is arranged on the respective other part, so that a positive locking of the two mentioned parts occurs. A particular advantage of the provision of a hook consists in that, when the understructure is pivoted, for example, in the case of a dump truck that has to be emptied, the hook can release the lock, whereby the covering bow can pivot upward to some extent. This is advantageous, since the articulation of a trough flap which is articulated in the upper area of the trough at the rear end, requires a free space for its pivoting, space which is covered by the covering bow in the closed state of the tarpaulin structure. As a result of the pivoting down of the covering bow, when the trough is tipped, the free space necessary for the movement of the trough flap is thereby cleared, in that the hook pivots out of engagement with the counter-bearing, without a part of the folding-top frame having to be axially shifted along the guide for this purpose. If the trough is again moved into the horizontal position, the hook again pivots into engagement with the counter-bearing, so that the hook pivots due to its own weight back into a locked position.

Advantageously, the hook has an abutment surface which makes it possible for the hook to be knocked free out of its locked position, so that the hook then too disengages the covering bow and frontmost carriage when the movable parts of the tarpaulin structure are moved for the opening of the tarpaulin structure. The abutment surface then advantageously strikes an abutment member provided on the understructure or on the guide or close to the guide, whereby the hook is pivoted around its at least one pivot axis and thus releases the covering bow from the frontmost carriage. For this purpose, the abutment member is positioned so that, when the tarpaulin structure is opened, the abutment surface can be moved against the abutment member. The abutment surface and the hook then slide during the opening over the abutment member and enable the covering bow, during the opening of the movable parts of the tarpaulin structure, to be pivoted from its pivoted-down position into a pivoted-up position. Advantageously, the axis of the at least one articulation of the hook is arranged parallel to the pivot axis of the covering bow, so that the parts can advantageously be coordinated functionally with one another.

Advantageously, the hook has a guide surface which enables a lifting of the hook from its lowered position, wherein the guide surface works together with the abutment member so that, when the tarpaulin structure is closed, due to the movement of the movable parts of the tarpaulin structure along the guide, the hook can run over the abutment member. Thereby, it is advantageously ensured that hook and abutment member do not block one another during the closing of the tarpaulin structure, and a particular intervention for the release is not necessary. During the closing of the tarpaulin structure as well, the hook pivots around its articulated linkage, wherein the pivot direction is preferably opposite from the direction in which the hook is pivoted when it is knocked free out of its locked position.

According to a preferred design, it is provided that the hook is pivotally connected to the frontmost carriage or to a frame section forming a single component with the frontmost carriage, said frame section being arranged above the guide in a horizontal plane, wherein it is possible to consider using a pivoting around a single articulation as well as around an arrangement with multiple articulations. Here, the center of gravity of the hook is preferably provided below its articulation, so that, when the understructure is pivoted, the center of gravity is made to perform a pivoting movement which pivots away from the counter-bearing and thus out of engagement. The hook itself or the engagement protrusions assuming the hook function is/are then arranged on the side opposite from the center of gravity with respect to the articulation.

According to an alternative design, it is provided that the hook is articulated to the covering bow and can be locked to the frame section which extends the frontmost carriage and is designed so as to form a single component with the frontmost carriage preferably above the guide in a horizontal plane. In this case, the center of gravity is preferably located on the side of the hook itself or of the engagement projection which engages with the counter-bearing, so that a pivoting is achieved when the understructure is tipped.

Preferably, the hook can be locked to a frame section which is arranged above the guide in a horizontal plane on the frontmost carriage. Moreover, it is advantageously provided that the hook can be pivoted into an unlocked position by pivoting the tarpaulin structure and/or the understructure. Furthermore, according to a preferred design, the hook has its center of gravity under its articulation on the covering bow or on the frontmost carriage or the frame section.

In an advantageous development, it is provided that the hook is pivotally connected to one of covering bow and foremost carriage via at least one articulation, wherein, in a further improvement, it is provided that, on the other one of cover bow and frontmost carriage, a counter-bearing designed in particular as a bolt section is arranged. Here, due to the hook and the counter-bearing which together advantageously form a positive-locking connection, the pivoted-down covering bow and the frontmost carriage are locked to one another. Advantageously, the counter-bearing designed as bolt section is arranged on an end of the frontmost carriage, so that the hook can be arranged in the same vertical plane on the covering bow. In order to grip the bolt section from behind, a recess is advantageously provided between the bolt section and the rest of the carriage.

A particularly preferred design results when the hook has several engagement projections, since in that case each of the engagement projections of the hook enables a locking to the counter-bearing. Thereby, a tolerance can be compensated when the covering bow is pivoted down, in that, in that case, several engagement projections arranged under each other can engage with the counter-bearing, and, accordingly a locking is achieved even when due to the load or mechanical deformations of the interacting parts, the parts can no longer be moved together completely.

Advantageously, the hook also has a guide section which ensures that when, due to its weight, the hook strikes the counter-bearing with an external side turned away from the engagement projection, the hook is pivoted past the counter-bearing in such a manner that the counter-bearing can subsequently engage with one of the engagement projections.

Preferably, the hook is kinematically coupled to a trough flap or to another movable part of the understructure, for example, via a tension rope which can also be deflected, a connecting rod or also a drive. Thereby, it is ensured that the pivoting movement of the movable part of the understructure is transmitted to the hook and accordingly the hook is disengaged.

According to a preferred design, it is provided that the front pair of carriages is connected together by a strut and by the covering bow, so that the mentioned parts form a portal which can be moved substantially without tilting along the guide. Thereby, the frontmost carriage can be used for the introduction of the shifting movement which is then transmitted to the additional carriages.

Advantageously, the covering bow is connected to the tarpaulin, so that the pivoting down movement of the covering bow entirely tensions the tarpaulin which is connected to the additional struts and bows and thus ensures that the carriages are arranged with the struts in the position intended for them. For this purpose, the tarpaulin is also connected to all the struts and if possible also to all the bows, wherein, in the area of the carriages or the connection to the struts and the bows, the tarpaulin is preferably reinforced in order to prevent damaging the tarpaulin. The belts connected to the tarpaulin prevent in particular damage to the tarpaulin due to the forces introduced by the connection of the carriages, bows and/or struts.

According to a preferred design it is provided that the tarpaulin guided over the covering bow includes a lateral hem in which a tension means with at least tensile rigidity and whose length can be adjusted, such as, for example, a wire, is guided, wherein the adjustment of the wire is possible via a screw threading or the like. This makes it possible that the wire is guided in the hem under a certain tension. When the covering bow is pivoted down, the wire is arranged under the horizontal plane of the articulation of the covering bow and thus holds the covering bow to some extent in position, since the wire first has to be stretched out during the pivoting up in order to overcome the dead point defined by the articulation axis of the covering bow. It is only when the wire has been guided over the articulation axis of the covering bow that the wire is untensioned again and can become somewhat shorter.

According to a preferred development, it is provided that the articulation of the covering bow to the frontmost carriage occurs more toward the front than where each of support rollers supporting the frontmost carriage is arranged. To that extent, the carriage is extended beyond the supporting rollers adjoining the guide, so that the lever arm of the covering bow is advantageously shortened.

In a more advantageous design, it is provided that in its opened state the covering bow is arranged entirely in front of the strut of the frontmost pair of carriages. As a result of this given minimum separation in each pivot position of the covering bow, an unfavorable tipping torque onto the support rollers which work together with a guide is advantageously prevented. Furthermore, it is ensured that the additional functions provided on the strut, such as the locking to the understructure and/or to the guide, and the pivoting movement of the covering bow are uncoupled.

According to an aspect of the invention, a tarpaulin structure for an understructure, such as a truck, trailer, semi-trailer, railway car, dump truck or container, is created, comprising a folding-top frame and a tarpaulin made of weather-resistant material, wherein the folding-top frame has a plurality of struts which have, on the ends, a carriage that is displaceable along a guide. Here, the tarpaulin structure distinguishes in that one of the struts includes a locking arrangement which can be unlocked on one side, which advantageously makes it possible to fasten the strut with the carriages connected thereto to the guide and/or the understructure and thus ensure a reliable stopping of the tarpaulin structure or of the movable parts of the tarpaulin structure.

The locking arrangement here comprises a first locking member and a second locking member, which are arranged on different longitudinal sides of the tarpaulin structure, so that the first locking member on one longitudinal side ensures a locking to the guide and/or the understructure, while the second locking member on the other longitudinal side of the tarpaulin structure brings about a locking to the understructure and/or the guide. Due to the locking on the two sides of the tarpaulin structure, a high degree of reliability of the locking is advantageously achieved. Nevertheless, the locking arrangement can be unlocked on one side without having to enter for that purpose the inner area of the understructure covered by the tarpaulin structure. Here, it is moreover provided that the first locking member can be moved for the unlocking in a first unlocking direction, and at the same time the second locking member can be moved with the unlocking movement of the first locking member in a second unlocking direction, wherein the first locking member and the second locking member together can be unlocked by pulling on the first locking member from outside the folding-top frame or the tarpaulin structure. Thus, it is not necessary to unlock the two locking members separately; instead, the strut which is advantageously of hollow design is used for connecting the two locking members to one another so that the movement of one locking member is transmitted to a movement of the other locking member, wherein the connection is protected so that it cannot interfere with the loaded goods.

The first unlocking direction is advantageously oriented opposite from the second unlocking direction, so that, when the first unlocking direction points downward, the second unlocking direction points upward, etc. Advantageously, this is achieved in that the first locking member is connected via a force transmission member which has at least tensile rigidity, such as a rope, a chain, a wire, a Bowden cable or the like, to the second locking member, wherein advantageously the force transmission member with tensile rigidity is guided in the strut connected to the frontmost pair of carriages. Thereby, it is possible to arrange the force transmission member between the two longitudinal sides of the tarpaulin structure, without the loading of the understructure or the load contained in the understructure being able to interfere with the force transmission member. Thereby, it is moreover ensured advantageously that a pulling movement on the first locking member is reliably transmitted to the second locking member. Here, the strut is preferably designed as a U-shaped strut with two vertical arms and/or a horizontal base connecting these struts, so that, by means of the locking members arranged on the strut or in the extension of the strut on the carriage, the opposite unlocking directions can be easily achieved. Alternatively, the strut can also be designed as a hoop connecting the two carriages in a common plane or can have any other configuration.

Here it should be noted that the locking arrangement is not limited to the upper openings of the understructure, but that instead a lateral opening of an understructure, for example, a lateral loading opening of a so-called curtainsider, can be locked by the locking arrangement. The strut or its base or the hoop then does not run in a horizontal plane, but rather runs in a vertical plane. In such a case, it is possible, for example, that the first unlocking direction and the second unlocking direction are the same unlocking directions.

According to a preferred design, it is provided that a spring arrangement which loads the first locking member against the first unlocking direction is associated with the first locking member, and that a second spring arrangement which loads the second locking member against the second locking direction is associated with the second locking member. Thereby, it is ensured that, for the case in which the spring member of a spring arrangement breaks, at least one of the two locking members is pretensioned in the locking direction and thus reliably locks the frontmost carriage to the guide and/or to the understructure. Alternatively, it is possible to implement the pretensioning of the two locking members by a single and thus common spring arrangement whose force is transmitted via the force transmission member to the other locking member.

According to an advantageous design, the first unlocking direction is directed vertically downward and the second unlocking direction is directed vertically upward, so that when the first locking member is pulled downward, the second locking member is pulled upward. Here, the spring arrangement loads the locking members in each case against the respective unlocking direction, so that the spring arrangement has to be tensioned in each case during the unlocking.

Advantageously, on each of the frontmost carriages or alternatively on the arms of the strut, a longitudinal guide is provided for each locking member, which ensures that the locking member can be moved only in the direction of the longitudinal guide. The longitudinal guide is here advantageously oriented in the respective unlocking direction and thus also ensures that, in the case of a pulling force acting on the locking member with a component in the unlocking direction, the locking member is first unlocked, and it is only subsequently that the carriage is moved along the guide.

Advantageously, the first spring arrangement or the second spring arrangement respectively is arranged in the area of the longitudinal guide for the first locking member and/or the second locking member, so that the spring arrangement can be supported on the longitudinal guide and/or on the part, carriage or strut, that includes the longitudinal guide. The respective other end of the spring arrangement is then supported, for example, against the respective spring member.

Preferably, the spring arrangement is designed as a compression spring or as a tension spring which loads the locking member against the respective unlocking direction. The design as a compression spring which can be easily placed on the locking member is particularly advantageous. If one does not want to increase the multiplicity of parts excessively, it is also possible to provide that one locking member is loaded by a compression spring, while the other locking member is loaded by a tension spring, whereby the same installation spaces can be used.

According to a particularly advantageous design, it is provided that the locking member in each case includes a guide section which can be stopped at a first height level in a locking catch and released by vertical movement from the locking catch. The guide section of the locking member is intended to come in contact with a locking section which moves the locking member and sets the height of the locking member and the guide section in the manner of a ramp or a wedge. Thereby, the locking member can be moved in another way besides by external actuation in the unlocking direction.

According to a preferred development, it is provided that the locking catches have a preferably central stop position, wherein, on one side or on both sides of the stop position, an entry slope is provided in each case, wherein the entry slope works together with the guide section in order to move the locking member into the stop position during the closing of the tarpaulin structure. For this purpose, the guide member is moved with its guide section along the entry slope, wherein the entry slope leads an axial movement of the locking member in the unlocking direction. If the entry slope is run over, the spring arrangement brings about the entry into the central stop position in which the movable parts of the tarpaulin structure are locked to the understructure and/or to the guide.

Advantageously, the locking catch encloses the locking member so that it prevents the movable parts of the folding-top frame from moving along the guide and/or the understructure, so that the locking member is caught in the locking catch.

The entry slope of the first locking catch descends advantageously toward the stop position of the first locking member, while the entry slope of the second locking catch ascends toward the stop position of the second locking member. Thus, the entry slopes are arranged or slanted so that they load the respective spring arrangement which is unloaded again when the locking member enters the stop position.

According to a preferred design, it is provided that at least one of the two locking members includes a bent section, wherein the guide section is arranged on the end of the bent section. Therefore, it is advantageously possible to orient this locking member like the other locking member, wherein the guide section on the end of the bent section works together with the entry slope.

Preferably, a pulling strap engages with the first locking member and protrudes between tarpaulin and folding-top frame over an external area of the tarpaulin structure, wherein the pulling strap can be gripped for the unlocking of the locking arrangement and for the movement of the movable parts of the folding-top frame along the guide. If the pulling strap is pulled by an operating person, in particular pulled downward, the first locking member is moved against the locking direction until it is moved out of the stop position and allows a movement of the associated carriage and/or strut along the guide. For this purpose, the pulling strap can be gripped for the unlocking of the locking arrangement and for the movement of the movable parts of the folding-top frame along the guide, so that not only the pulling of the carriages in the direction of the guide is brought about by the pulling strap, but also the unlocking of the carriage from the guide.

Advantageously, a locking catch is provided in each case not only in the closed position of the tarpaulin structure, but also in the open position of the tarpaulin structure. Thereby, it is ensured that, due to the weight and the pretensioning as a result of the properties of the tarpaulin, the movable parts of the tarpaulin structure are not moved again in the direction of the closed position, and thus the access to the understructure is reduced. The spring arrangement here ensures that the locking members engage in the stop position.

According to an aspect of the invention, a tarpaulin structure for an understructure, such as a truck, a trailer, a semi-trailer, railway car, dump truck or container, is created, comprising a folding-top frame and a tarpaulin made of weather resistant material, wherein the folding-top frame includes a plurality of struts; on the inside, each of the struts has a carriage that is movable along a guide. Here it is provided that one of the struts includes a locking arrangement which can be unlocked by a one-sided actuation, wherein the locking arrangement comprises a first locking member and a second locking member, which are arranged on different longitudinal sides of the tarpaulin structure. The first locking member can here be moved for the unlocking in a first unlocking direction; the second locking member can also be moved for the unlocking in the first unlocking direction, so that the unlocking direction for the first and the second locking member is the same. As a result, a kinematics is created, by means of which the two locking members can be actuated from one side in the same direction in order to be unlocked. For this purpose, it is possible to provide an actuation on the two longitudinal sides of the understructure; however, advantageously, an actuation is provided on only one longitudinal side.

Advantageously, a first spring arrangement is associated with the first locking member and loads the first locking member against the first unlocking direction, so that, without exposure to force from outside, the first locking member is inserted against the unlocking direction. At the same time, the first spring arrangement can also load the second locking member, although it is preferably provided that a second spring arrangement is associated with the second locking member and loads the second locking member against the first unlocking direction. Hereby, a total of two spring arrangements, namely a first and a second spring arrangement, are provided, which in each case and/or together load the first locking member and the second locking member. Due to the redundancy of the spring arrangements, a reliable operation is ensured even when one of the two spring arrangements fails due to a defect.

Preferably, it is provided that the locking member in each case includes a guide section which is preferably a distal end of the locking member formed as bolt, wherein the guide section can be stopped at a first lower height level in a locking catch and released from the locking catch by a vertical movement upward. The locking catch here blocks the locking member preferably so that it prevents the movable parts of the folding-top frame from moving in at least one direction along the guide and/or the understructure. The locking member and the locking catch together are thus intended for the stopping of the movable parts of the folding-top frame including the tarpaulin connected thereto.

Advantageously, the locking catch has a stop position in which the respective locking member is blocked or fixed by positive-locking connection in at least one direction. Furthermore, on one side or on both sides of the stop position, an entry slope of the locking catch is provided, wherein the entry slope works together with the guide section of the locking member in order to lift the locking member, when the tarpaulin structure is moved, for example, during the opening or the closing, and moves it into the stop position. Advantageously, this occurs as a result of the locking member being shifted by the entry slope in the unlocking direction, as a rule under tensioning of the spring arrangement associated with the locking member, wherein the locking member reaches the stop position after clearing the entry slope, stop position in which the associated spring arrangement shifts the locking member in front of the locking catch in such a manner that a positive-locking blocking occurs. It has to be understood that, when the movable parts of the folding-top frame are actuated, in the case in which the locking member is provided in the stop position, the spring arrangement cannot be tensioned, so that manual unlocking must take place. Furthermore, it has to be understood that more than one locking catch can be provided over the length of the guide, since a locking is advantageous not only in the case of a completely closed tarpaulin structure, but also in the case of a completely open tarpaulin structure.

Advantageously, the entry slope of the locking catch ascends toward the stop position of the locking member, so that the unlocking direction of the locking member in this case as well points vertically upward. The provision of the entry slope acts as a ramp, that is to say the force which a user introduces into the folding-top frame for moving the movable parts of the folding-top frame is deflected by the ramp of the entry slope in the unlocking direction.

According to a preferred design, it is provided that the first locking member and the second locking member in each case are guided vertically on the two frontmost carriages of the foremost strut. The vertical guide only allows a movement of the locking member in the unlocking direction or the unlocking direction and at the same time it ensures a slight play between the frontmost carriage to be stopped and the guide to which the locking catch is advantageously connected.

According to a preferred design, it is provided that a tilting lever is connected to the strut, which, at one end, is operatively connected with the first locking member and, at the other end, is coupled to a vertically movable first pulling lever which can be actuated vertically for lifting the first locking member. The tilting lever advantageously is used primarily for converting the usual unlocking direction, which results from vertical pulling on a pulling strap downward by an operating person, into a pulling movement in the unlocking direction, that is to say upward, of the first locking member. Here, the pulling strap is connected to the pulling lever, so that the two parts perform the same vertical movement as a result of their coupling. It is possible to also provide the tilting lever and the pulling lever in the area of the second locking member, when an unlocking is to be provided on this side. However, in that case, the first locking member and the second locking member or parts connected thereto have to be coupled in such a manner that both are lifted or lowered at the same time.

However, according to a particularly preferred design, it is provided that the unlocking occurs on the longitudinal side of the first locking member, so that the unlocking arrangement couples the second locking member advantageously to the first locking member and/or the second pulling lever in such a manner that the second locking member is lifted approximately synchronously and/or simultaneously with the first locking member. For this purpose, the first pulling lever is advantageously connected on an end side to a first triangular connecting rod designed in the manner of a rocker, while the second locking member is connected on an end side to a second triangular connecting rod designed in the manner of a rocker, wherein the first and the second triangular connecting rods are each fastened to the frontmost strut. The first triangular connecting rod and the second triangular connecting rod are then in each case connected to one another via at least one force transmission member with tensile rigidity, such as a rope or preferably a rod, wherein the force transmission member with at least tensile rigidity is guided on the strut connected to the frontmost pair of carriages by the two triangular connecting rods. When the first pulling lever is actuated, the force transmission member performs, due to the first triangular connecting rod, a movement downward in the direction of the longitudinal side of the first locking member, which is converted by the second triangular connecting rod into a vertical pulling movement of the second locking member. It has to be understood that, in order to achieve this kinematic coupling, other parts can also be used or provided, in particular other intermediate parts which can be connected between the mentioned parts. In order not to achieve over-defined kinematics, it is provided that, in the area of the triangular connecting rods which perform a pivoting movement and thus are only limitedly suitable for the transmission of a linear movement, oblong holes are provided which are capable of compensating for this tolerance. It is possible to guide the transmission member with at least tensile rigidity, in order to prevent buckling out or catching with the load, in a seam or in a sheath or in an eyelet attached in each case to the strut, as long as the axial movement of the transmission member with at least tensile rigidity is not prevented thereby.

According to an advantageous design, it is provided that the first spring arrangement is connected on one end to the strut and on the other end to the tilting lever, so that the first locking member is not acted upon directly by the first spring arrangement but indirectly via a tensile force on the lever arm of the tilting lever, which is turned away from the first locking member. Thereby, a tensioning of the first locking member in the locking direction is advantageously achieved.

According to an advantageous development, it is provided that the second spring arrangement is connected, on one end, to the carriage, and, on the other end, to the second locking member, so that the second locking member is tensioned in the locking direction. It has to be understood that the first spring arrangement can also be designed as described for the second spring arrangement. It is also possible that two springs act upon the first locking member, namely a spring like the first spring arrangement explained above and another spring like the second spring arrangement explained above.

Advantageously, the first spring arrangement and the second spring arrangement are both designed as tension springs, like a coil spring type, which are available commercially at low cost and whose functioning is easy to verify, and which can easily be mounted in the available installation space.

Advantageously, it is provided that a pulling strap is connected, for the movement of the movable parts of the folding-top frame along the guide, to a bow connected to the frontmost pair of carriages, bow which is turned toward an adjacent pair of carriages, so that, when the pulling strap is actuated, this pair of bows coupled to one another is loaded not only in the shifting direction but also downward. Thereby it is advantageously achieved that the pair of bows connected to one another and facing one another stands up at a very late point in time, and so that the frontmost pair of carriages and the adjacent pair of carriages are at a great distance from another during most of the shifting movement, which prevents a tilting of the struts by the unilaterally introduced pulling force.

According to an aspect of the invention, a tarpaulin structure for an understructure, such as a truck, a trailer, semi-trailer, railway car, dump truck or container, is created, comprising a folding-top frame and a tarpaulin made of weather resistant material, wherein the folding-top frame has a plurality of struts which have, on the ends, in each case a carriage that is displaceable along a guide. Here, at least one bow is pivotally connected either to a pair of opposite carriages of the strut or to the strut, wherein the bow forms a tarpaulin folding aid with a bow of an adjacent strut or of a pair of opposite carriages or of a stationary part of the folding frame. The tarpaulin structure distinguishes in that an endless drive device is provided, which is coupled to one of the two carriages of a frontmost pair of carriages, and in that the drive device comprises a toothed belt which is placed around two toothed rollers. Thereby, the drive device is formed by a closed circumferential toothed belt driven by one of the two toothed rollers. For this purpose, the driven toothed roller can sit either on a driven shaft or be engaged with the driven shaft by means of a transmission. The provision of a toothed belt is very advantageous due to the low slippage and the precise controllability. Furthermore, the provision of a toothed belt enables the transmission of very high forces to the carriages, which are necessary in order to move not only the frontmost carriage but also to pivot the parts such as covering bows or bows or auxiliary bows kinematically connected thereto.

Advantageously, the toothed belt is arranged entirely under the guide, so that it is not necessary to connect the toothed belt to further carriages of the folding-top frame or to pivotable parts of the folding-top frame, such as an actuation rod for a covering bow or the like.

According to a preferred design, it is provided that, on the two longitudinal sides, that is on both sides of the understructure, in each case an endless toothed belt is provided, which is coupled in each case to one of the two carriages of a frontmost pair of carriages, so that the two opposite carriages of the frontmost pair of carriages can be moved synchronously in opening or closing direction. Thereby, a tilting is advantageously prevented, and, in the case of blocking of one of the two frontmost carriages, damage to the folding-top frame is also prevented.

According to a preferred development, it is provided that the two toothed belts can be driven by a common driveshaft which ensures the synchronicity of the driving movement. In a first design, it is advantageously provided that the driveshaft can be driven by an electric motor which can be actuated, for example, by actuation of a push button in the driver's cab of a commercial vehicle. However, alternatively the driveshaft can also be driven by a manual crank, or other suitable drive possibilities are provided for this purpose.

A preferred development distinguishes in that at least one toothed roller, preferably the non-driven toothed roller, is coupled via a connecting plate to the guide, and that the at least one toothed roller can be adjusted by an elongate hole provided in the connecting plate or in the guide. Thereby, the tension of the endless toothed belt can be adjusted and weather- or wear-caused increases in length can be compensated. In particular, the toothed belt can also be oriented in this manner toward the position of the carriages of the frontmost pair of carriages.

Advantageously, a toothed roller, in the case of one driven toothed roller, the driven toothed roller, is connected to a plate adjoining the understructure in the opening direction. Thereby, the driveshaft can be arranged outside of the receiving opening itself of the understructure, so that said driveshaft does not come in contact with the transported goods.

According to a preferred design, it is provided that the toothed belt stops the frontmost carriage in a closed position without slippage, without the need for an additional locking. Thereby, a manually actuated locking can be dispensed with. In addition, the stopping of the frontmost carriages also brings about the positioning of the parts connected thereto, such as covering bows and the like.

It has to be understood that, in the case of the arrangement of the toothed belt under the guide, the pivoting movement of the bows is not affected by the movement of the carriages by the toothed belt, so that the pivoting movement of the bows occurs by the movement along the guide outside of the toothed belts. Thereby, it is advantageously possible that, as a result of the axial movement of the movable parts of the folding-top frame, pivoted parts do not collide with the drive device.

Advantageously, it is provided that the struts are designed as (inverted) U-shaped, and that a base of the U-shaped strut is arranged, in the closed state of the tarpaulin structure, at the same height as areas of the bows, which are turned away from the carriage. This results in a tarpaulin structure which, in the closed state, is essentially at one height when the tarpaulin is connected to the struts and the bases of the bows. Alternatively, it is possible that the strut is arranged at a lower height than the minimum height of the bows. Furthermore, the tarpaulin is advantageously also connected to the arms of the U-shaped struts, possibly also additionally in the area of the carriages. It is also possible to connect the tarpaulin to the arms of the U-shaped bows. Due to the overall low installation height of the tarpaulin structure, the latter can be used particularly effectively for covering containers to be transported by road or by rail. Due to the achievable separations between adjacent carriages, the tarpaulin structure also has a low weight.

Preferably, the carriage includes at least one upper support roller and at least one lower counter-roller, wherein the at least one upper support roller and the at least one lower counter-roller lie by means of a circumferential surface on the small side of a guide rail of rectangular cross section of the guide, wherein at least one of the at least one upper support roller and the at least one lower counter-roller, on both sides of the circumferential surface, in each case have an annular flange, and wherein the mutually facing end sides of the two annular flanges, which protrude over the diameter of the circumferential surface, partially enclose the broad side of the guide rail. The design of the support roller or of the counter-roller which ensures the connection of the carriage to the rectangular guide rail allows not only a movement of the carriage in the direction of the guide rail, but moreover also prevents the support roller or the counter-roller from sliding out of the guide rail, in that the annular flanges enclose the broad side of the guide rail, wherein the radial projection of the annular flange with respect to the circumferential surface is very small. Thereby, it is possible that, both on the support roller and also on the counter-roller, in each case annular flanges enclosing the guide rail are arranged, and the carriage cannot fall completely off the guide rail. Thereby the guide rail is also able to take up forces in Y-direction via the support rollers and/or the counter-rollers.

Advantageously, the carriage includes two support rollers which lie vertically from above on the small side of the guide rail. Advantageously, in the case of one counter-roller, the latter is arranged so that it defines with the two support rollers an equilateral triangle and thereby lies approximately centrally between the two support rollers on the lower small side. However, alternatively it is also possible that in each case two pairs consisting of support roller and counter-roller are provided in each case opposite one another on both sides of the guide rail.

The selection of the guide rail as a longitudinal rectangular profile part, preferably made of steel or anodized aluminum, can easily be procured and/or replaced, since such parts as standard tape measures are readily available on the market.

Advantageously, the guide rail is connected to an external lateral wall of the understructure via a connection means, wherein the connection means pass through the broad side of the guide rail. As connection means, one can consider using, for example, screws or rivets which are advantageously guided through a spacer sleeve in order to connect the guide rail to the extent possible at constant distance from the external wall of the understructure. It has to be understood that the external wall of the understructure should lie here to the extent possible in one plane. If the understructure has notches or projections or recesses, then the spacer sleeves have to be dimensioned accordingly, so that the guide rails connected to the understructure on both sides lie in parallel planes. Since the manufacturers know about the buckling of containers in the case of large weight or a hot load, the side walls already have a concave starting contour, which the guide rail then has to follow. Since the small side of the guide rail is directed upward, the guide rail can be moved tightly against the external side of the understructure, wherein the guide rail outside the spacer sleeves and connection means maintains a constant distance from the understructure, which makes it possible for support rollers and counter-rollers arranged on the carriage to grip around the broad sides of the guide rail. Advantageously, the connection means therefore pass through the broad side of the guide rail centrally in order not to be in the way of the support rollers and counter-rollers, as an obstacle.

Advantageously, between the guide rail and the external wall of the understructure, a gap is provided so that dirt particles falling between the guide rail and the external wall of the understructure can fall down, for example, between two connection means for the connection of the guide rail. In order to make it possible for parts that may come to lie on the small side of the guide rail to fall down through this gap, the distance between the guide rail and the external wall of the understructure is not smaller than the extent of the small side of the guide rail. Advantageously, the distance between the guide rail and the external wall of the understructure is the same as the extent of the small side of the guide rail, for example, in each case 8 mm.

Advantageously, the thickness of the support roller or the thickness of the counter-roller is smaller than twice the extent of the small side of the guide rail. Thereby, it is ensured that the support rollers and counter-rollers can roll past the external wall of the understructure, without getting caught on the external wall of the understructure. Since in fact only an annular flange of the support roller or of the counter-roller protrudes in the direction of the external wall of the understructure past the guide rail, the thickness of the corresponding roller is a rule clearly smaller than the distance between the facing broad sides of the guide rail, in the case of a guide rail having a width of 8 mm and a height of 40 mm, not greater than a 2-3 mm thickness of the annular flange.

According to a preferred design, it is provided that the height of the guide rail, that is to say its broad side, which is arranged vertically, is greater than the height of the support roller and/or of the counter-roller. The support roller and/or the counter-roller is/are each designed to be slightly smaller than the height of the guide rail.

According to a particularly preferred design, the guide rail is formed from several rail sections arranged one after the other, which in each case are connected to the external wall of the understructure. This has the advantage that, in the case of damage, the entire rail does not have to be separated from the understructure, repaired or exchanged and fastened again, but instead only the damaged area needs to be repaired. Furthermore, a guide rail formed in sections also adapts better to deformations of the understructure, for example, of the container, whose dimensions can change with the filling or the temperature of the filling. Finally, the design of the guide rail in the form of individual sub-segments also allows the exchange of a carriage, in that a segment on which the carriage is arranged, is detached and then pulled off the carriage, which can then be repaired or exchanged. It is no longer necessary to disassemble the entire tarpaulin structure, take the tarpaulin off the folding-top frame or dismantle multiple parts of the folding-top frame.

The material from which the guide rail is produced is advantageously selected from the group comprising steel and anodized aluminum. Many containers are made of aluminum, so that a guide rail made of aluminum is well adapted to the properties of the container. Steel is cost effective and can be processed easily. If the aluminum is anodized, it has the same surface hardness as steel, so that the rollers made of steel cannot damage the guide rail.

A particularly important requirement in the case of a tarpaulin structure consists in that the tarpaulin structure must not project substantially past the width of the understructure. Advantageously, it is provided that the external side of the guide rail is a distance of less than 25 mm, preferably less than 20 mm, and possibly of approximately 15 mm from the external side of the understructure.

Here, it is moreover advantageous if the distance from an external side of the carriage to the external side of the guide rail is less than the distance of the external side of the guide rail from an external side of the understructure. Hereby, a small-construction tarpaulin structure is advantageously produced, which is nevertheless guided in a stable manner on the guide rail.

On the frontmost pair of carriages—facing forward—a covering bow is advantageously pivotally connected, wherein, when the frontmost pair of carriages is moved, the covering bow can be pivoted between a pivoted-down position and a pivoted-up position.

Advantageously, it is possible that the bow connected to the pair of frontmost carriages and turned away from the covering bow is loaded, via the bow of the adjacent pair of carriages, which is connected directly to the former bow or via a kinematic connecting rod assembly or also by the tarpaulin, in a direction against the lifting of the tarpaulin, in order to ensure the longest possible introduction of force in the direction of the guide. In particular, this loading can occur in that the placement angle of the bows is smaller than in the case of the other pairs of bows, for example, in that a longer bow is used, or else in that the weight of the bow is increased, for example, by using a heavier material. The pretensioning of the arms of the bows with respect to one another in the pairs of bows can also be designed differently, so that, due to the different tensioning of the pairs of bows, the loading against the set-up direction of the tarpaulin is different. Finally, an expander or a spring can also provide such a force acting against the set-up direction.

Advantageously, the carriages are connected only via at least one upper support roller or at least one lower counter-roller to the guide, so that the uptake of forces both in the direction of the guide and also in the horizontal direction perpendicular thereto, that is to say transversely to the understructure, occurs through the support rollers. For the carriages with the support rollers to be able to follow the guide, even when the guide rails are not entirely parallel to one another, the struts and bows of U-shaped design can spread apart, whereby a tilting is advantageously prevented.

According to a preferred embodiment, it is provided that the movable parts of the folding-top frame fold up from the back to the front. According to another preferred design, it is provided that the movable parts of the folding-top frame fold up from the front to the back. Substantially the tarpaulin folding aids are to be considered as movable parts of the folding-top frame, while the struts with the carriages connected thereto move together. However, a particularly preferred design is one in which the connected bows between the frontmost pair of carriages and the immediately adjacent pair of carriages are lifted as a last tarpaulin folding aid during the movement in opening direction. The order in which the additional pairs of bows or tarpaulin folding aids are lifted is then of secondary importance, since as a result of the forward moving axis through the immediately adjacent pair of carriages, on the one hand, and through the covering bow, on the other hand, a very stable carriage design is achieved, which enables a long lasting and reliable actuation of the folding-top frame.

The tarpaulin is preferably connected to at least one of carriages and struts, advantageously both to the carriage and also to the struts, and in particular to the base of their springy U-shape. Since the tarpaulin not only covers the understructure, but also limits the folding-top frame laterally, advantageously a connection in the area of the arms of the U-shaped struts is also provided, wherein the connection can also occur in the area of the carriages.

The carriages are advantageously designed so that the carriage comprises a flat plate and that the support rollers protrude on the same side of the plate on which the bows are also pivotally connected. Thereby, movable parts, with the exception of the tarpaulin, are advantageously prevented from protruding laterally beyond the plane of the flat plate of the carriage, and accordingly a very compact design is achieved.

Advantageously, the struts are of U-shaped design, wherein, in the closed state of the tarpaulin structure, a base of the U-shaped strut is arranged at the same height as the areas of the bow turned away from the carriage. However, it is also possible that the struts connect the carriages without assuming a U-shape, for example, if the struts are implemented as hoop shaft or the like.

Advantageously, the guide is arranged at a distance from the understructure which is greater than a small side of the guide facing upward, so that dirt particles deposited on the small side are able to fall down on both sides without forming bridges and thus without limiting the functionality of the tarpaulin structure.

Advantageously, the folding-top frame is designed as yielding in a horizontal transverse direction relative to the shifting direction, in order to compensate for tolerances or deformations of the understructure. This is already achieved by the U-shaped design of the bows, but also of the covering bow, and the struts must be yielding accordingly, so that, in particular, areas in which the distance between the bilateral guide rails of the guide is not constant can be run through. This is based on the idea that, in contrast to other tarpaulin structures in which a longitudinal support made of aluminum follows the folding-top frame, that is to say adapts to its size by deformation, in the present case the folding-top frame should adapt to the deformations of the understructure.

The tarpaulin structure overall is characterized in that the force for opening or closing can be introduced on one side, wherein the force for opening or closing advantageously is introduced on only one of the two frontmost carriages. For this purpose, for example, a belt strap is connected to the frontmost carriage, which can be gripped by a tool or also by a part driven by a motor. Since the folding-top frame is set up over an understructure which also has a certain height, for example, in the case of a tipping trough mounted on a vehicle, the resistance of the folding-top frame against the opening force must be dimensioned small.

The folding-top frame is advantageously broader than the understructure, so that it can be connected to an external wall of the understructure. The parts of the folding-top frame are advantageously designed as steel parts, wherein, alternatively to a design as a steel part, the guide rail can also be designed as an anodized aluminum part which works well together with movable steel parts.

An advantageous use of the tarpaulin structure arises in the form of a cover in the case of a container, in the case of a truck, in the case of a railway car, in the case of a swimming pool, in the case of a carport, in the case of a structure as roof substitute, or in the case of a dump truck.

Additional properties, advantages and developments of the invention can be obtained from the following description of a preferred embodiment example and from the dependent claims.

The invention is explained in further detail below in reference to the appended drawings based on a preferred embodiment example.

FIG. 8A shows an enlarged section of the frontmost carriage on a longitudinal side of the tarpaulin structure with details of a locking arrangement.

FIG. 8B shows an enlarged section of the frontmost carriage on the other longitudinal side of the tarpaulin structure with details of a locking arrangement.

Figure 1:
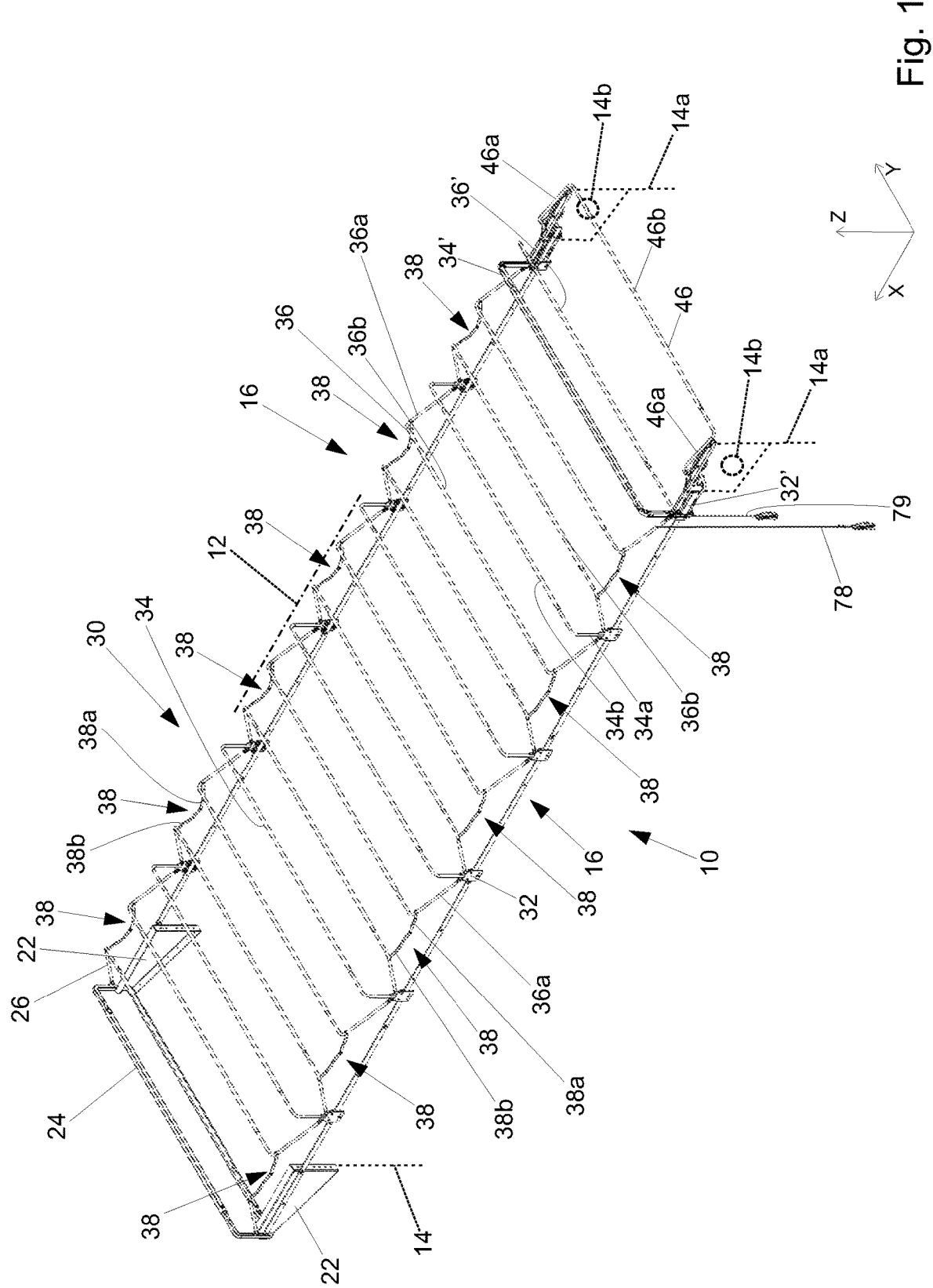
FIG. 1 shows a perspective view onto the folding-top frame of an inventive tarpaulin structure for a container in the closed state.
Figure 2:
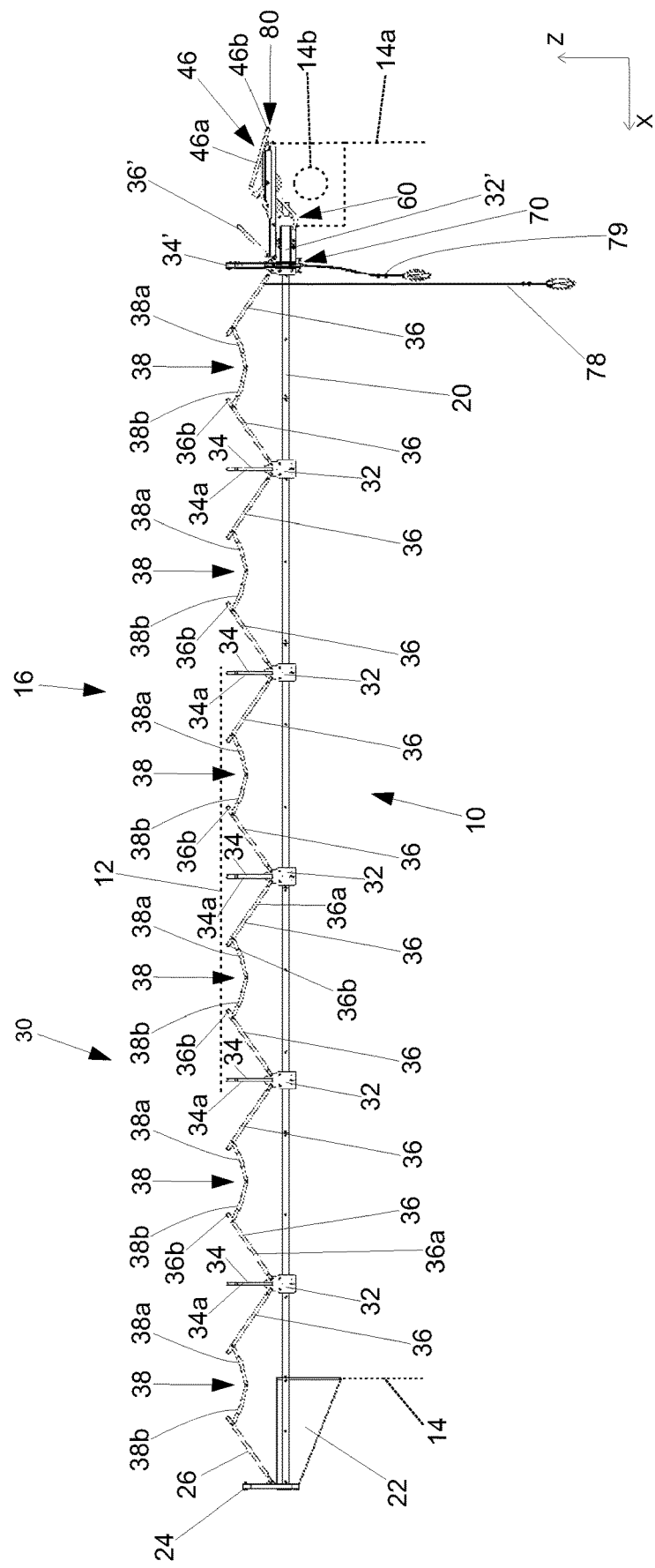
FIG. 2 shows a side view of the folding-top frame from FIG. 1 in a side view.

In FIGS. 1 and 2, a perspective view from the side or a side view of a tarpaulin structure 10 is represented, in which a tarpaulin 12 is indicated by a dot-and-dash line representation; to improve the representation, said tarpaulin is not represented in the additional figures. Furthermore, using dotted lines, the portion of a silhouette of a container 14 is indicated, over which the folding-top frame 16 is set up. The container 14 is designed, for example, as a tipping trough in which debris but also dust-generating materials can be accommodated, and therefore covering by the tarpaulin structure 10 is advantageously required under some circumstances even during transport on a truck. A front end wall 14a of the container 14 is designed as a trough flap which is connected via a pivot articulation 14b to the container 14 and which enables the emptying of the container by tipping.

On both sides of the container 14, on the external side wall thereof, the tarpaulin structure 10 has in each case a connected guide rail 20 which consists of a plurality of guide rail sections which are fastened at a distance from the external container wall to same, for example, by rivets, screws or other suitable fastening means which ensure a defined distance from the external wall of the container 14. Thereby, the guide rail 20 is formed as a continuous part composed of several subparts and having a rectangular profile, which, in the installed state, has upper and lower sides as small sides and the broad sides parallel to the container wall.

On the rear end of the folding-top frame 16 viewed in opening direction, which is represented on the left in FIG. 1, the folding-top frame 16 protrudes over the end of the container 14, wherein, in an extension of the external wall of the container 14, a substantially triangular panel or plate 22 is connected to the rear side of the container 14, on which the guide rail 20 also continues. The purpose of the protruding area is to be able to completely clear the entire filling opening of the container 14 in the open state, in that the movable parts of the folding-top frame 16, to be described later, can be shifted in that direction. In particular, no parts of the tarpaulin structure 16 should impede the filling of the container 14.

The triangular plate 22 reaches a higher point than the plane of the guide rail 20 and it extends the external side wall of the container 14 also at this height rearward. In practice, the sides of a container are frequently referred to in accordance with the direction in which the container is moved, wherein the indicated flap 14a is usually arranged on the rear of the vehicle, but in the present case the area in which the movable parts of the folding-top frame 16 are gathered when the tarpaulin structure 10 is open is referred to as rear end, and the front end is the end which is cleared first starting from a closed tarpaulin structure 10.

Moreover, an end abutment 24 spanning the container width is provided, which lies substantially in a plane perpendicular with respect to the guide rails 20 and has an upside-down U-shape, and which is connected by the ends of the U to the triangular plates 22 to the ends thereof.

Furthermore, the folding-top frame 16 includes a sliding covering arrangement 30 which is movable along the guide rails 20 and which can be opened for clearing the loading opening of the container 14 and also closed again for covering it.

The sliding covering arrangement 30 comprises a plurality of carriages 32 which can be displaced along the guide rail 20. Each carriage 32 lying opposite with respect to a longitudinal bisector, that is to say the plane arranged centrally between the side walls of the container 14 or the plane extending centrally and parallel to the guide rails 20, is connected to the other via a U-shaped strut 34, wherein the strut 34 includes two bent corner pieces 34a and selectively an elongate connecting piece 34b made of a round pipe, which are assembled to one another, whereby an advantageous standardization of the parts is achieved. All the struts 34 provided on the carriages 32 lie at the same height, which corresponds approximately to the height of the tarpaulin 12 when the tarpaulin structure 10 is closed. For this purpose, the tarpaulin 12 is connected via suitable connection means to the struts 34, for example, by straps or belts or attachments formed in the tarpaulin 12. The number of carriages 32 and thus of struts 34 can vary depending on the length of the tarpaulin structure 10.

Furthermore, on each carriage 32, on both sides of the strut 34, in each case a pivoting bow 36 is pivotally articulated via an articulation 37, which is also assembled via an angle piece 36a and an elongate connecting piece 36b in each case made of a cylindrical pipe. On the end abutment 24 as well, at the height of the carriage 32, a pivoting bow 26 is articulated, which, however, cannot be moved along the guide rails 20. Overall, it is also possible to arrange the pivoting bows 26, 36 further upward with respect to the carriage, that is to say on the arms of the struts 34 which are formed by the corner pieces 34a. In the case of tarpaulin structures which, for example, are set up over only one loading platform, it is sufficient to use bows connected at a medium height of the bows. The pivoting bows 26, 36 are at a flat angle of approximately 30° relative to the horizontal and enclose an angle of approximately 60° with the associated strut 34 or the end abutment 24. In each case, the pivoting bows 26, 36 can be pivoted upward into an angular position of approximately 90° relative to the horizontal, in which they extend practically parallel to the respective struts 34 or end abutment 24.

Figure 5:
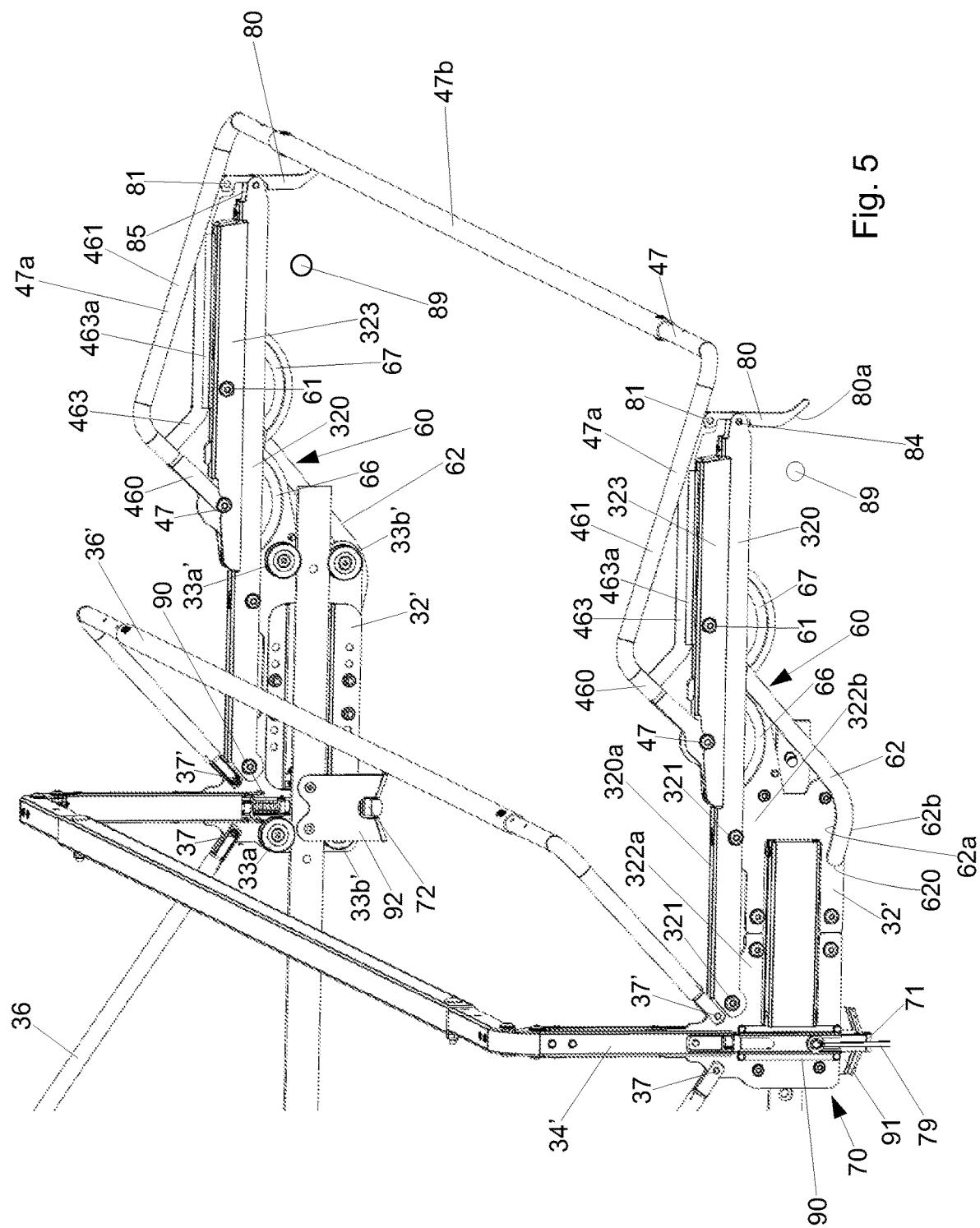
FIG. 5 shows an enlarged view of the frontmost strut from FIGS. 1 and 2 with pivoted-down covering bow.
Figure 6:
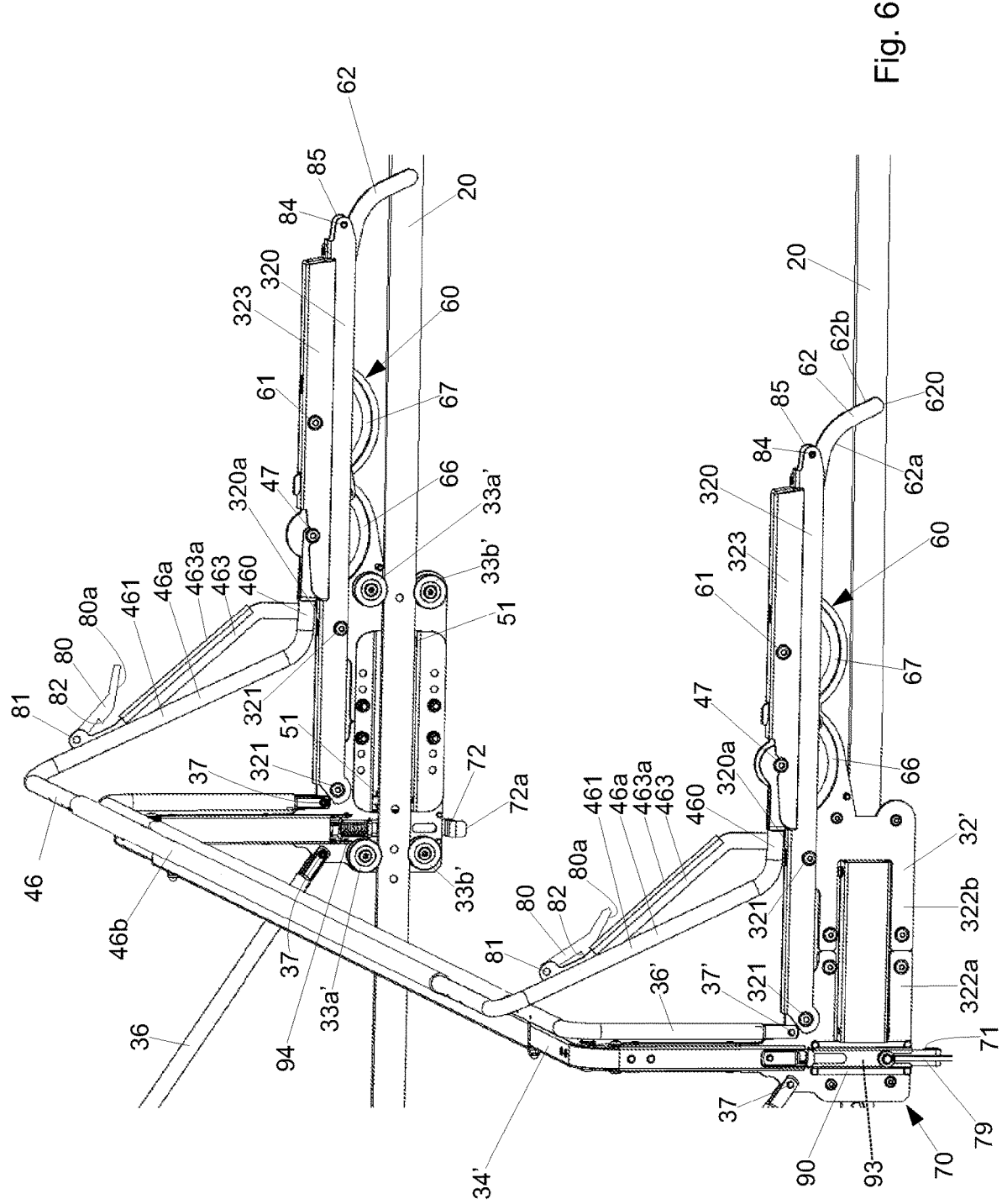
FIG. 6 shows an enlarged view of the frontmost strut from FIGS. 1 and 2 with pivoted-up covering bow.

On the frontmost pair of carriages 32' which are connected to one another by struts 34' which are more stable compared to the other struts 34, on the side facing away from the rest of the folding-top frame 16, a covering bow 46 is connected in an articulation 47, which can be pivoted between a substantially horizontal pivoted-down position represented in FIG. 5, that is to say at an approximately 0° inclination relative to the horizontal, and in a vertical position represented in FIG. 6, that is to say at an approximately 135° inclination relative to the horizontal. The pivoting movement of the covering bow 46 here tensions the tarpaulin 12. One can see that the covering bow 46 comprises again two (repeatedly) bent bow sections 46a and an elongate connecting piece 46b, which are connected at a distance from the strut 34' to a frame section 320 of the frontmost carriage 32'. Between the articulation 47 of the covering bow 46 and the strut 34', an auxiliary bow 36' is articulated in an articulation 37', which protrudes at an angle of approximately 45° relative to the horizontal.

A particularity of a tarpaulin structure 10 for a container 14 consists in that the container 14 is very rigid, so that the folding-top frame 16 must follow the changes in the shape of the container. These changes can be caused by thermal expansion, for example, by hot filling, or by deformation of the container, for example, by the weight of the filling or by mechanical damage. Therefore, a feature of the folding-top frame is that the U-shaped struts 34, pivoting bows 36 and covering bows 46 allow a certain resilient deformation in Y-direction, that is to say the horizontal axis transverse to the movement direction (X-axis). Thus, the folding-top frame 16 can compensate for tolerances up to 50 mm, without a disadvantageous impeding of the movement of the carriage occurring. Since, during the handling of the container 14, damage to the guide rail 20 can indeed occur, the guide rail advantageously consists of subparts which, if necessary, can in each case be detached and exchanged or straightened. The above-indicated angles also refer to the angle of the plane in which the bow lies relative to the horizontal—the pivoting axis of the articulations 37 in each case lies in Y-direction.

Figure 4:
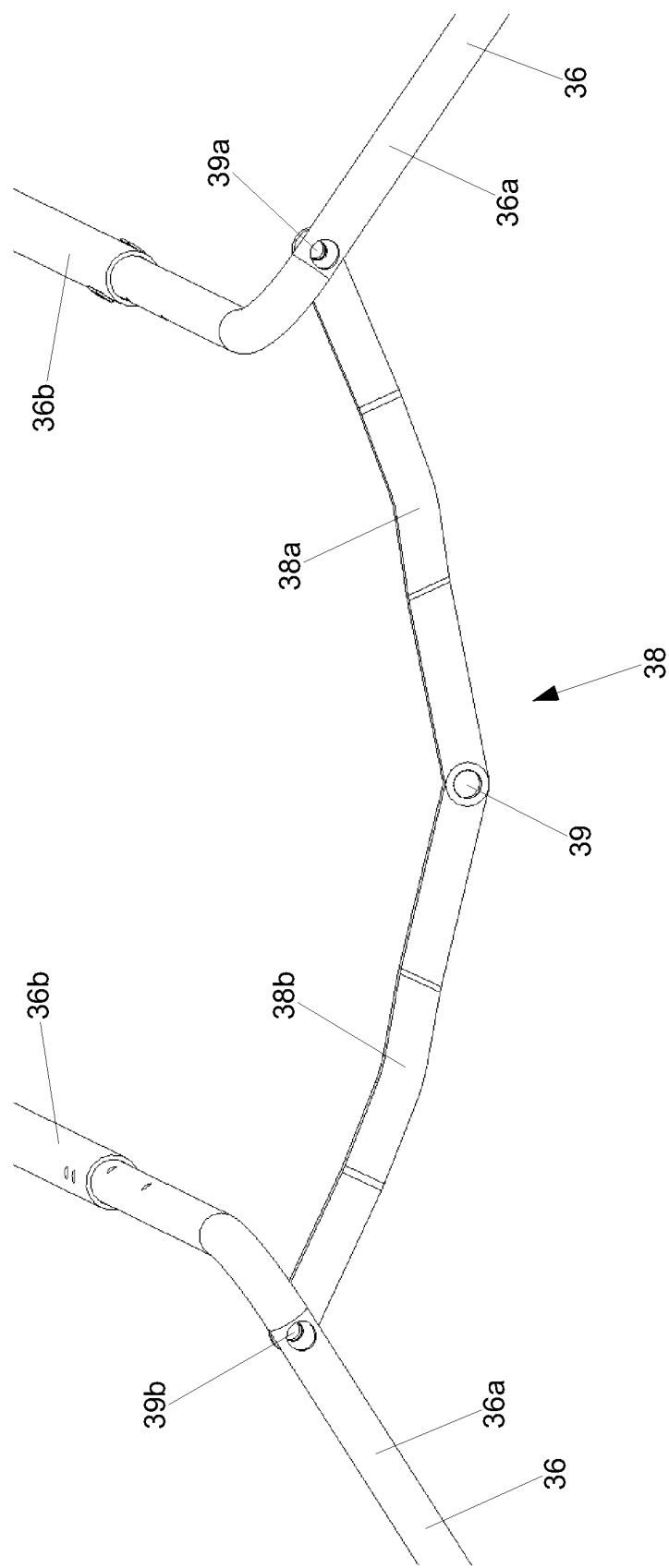
FIG. 4 shows an enlarged view of a connecting rod transmission from FIGS. 1 and 2.

Mutually facing bows 36 of adjacent carriages 32 are connected to one another in the area of the angle pieces 36a via two kinematic connecting rod assemblies 38, of which one 38 is represented enlarged in particular in FIG. 4. The kinematic connecting rod assembly is designed as a toggle link in the present case, with a first connecting rod 38a and a second connecting rod 38b, which are pivotally connected to one another in a common articulation 39. The first connecting rod 38a is connected on a rearward facing arm of the angle piece 36a of the bow 36, which is articulated to the respective carriage 32, via an articulation 39a, while the second connecting rod 38b is connected to a forward facing arm of the angle piece 36a of the bow 36, which is articulated to the respective carriage 32, via an articulation 39b. Due to the type of articulated connection, the kinematic connecting rod assembly 38 in each case moves in a vertical plane which lies entirely outside of the upper opening of the understructure 34 and therefore cannot come in contact with the loaded goods, wherein the bend formed by the articulation 39 gives way downward when the two articulations 39a, 39b are moved toward one another when the carriages 32, 32' are shifted toward one another. Thereby, when the connecting rods 38a, 38b are folded up, the bend folds in an unproblematic area and, importantly, the space enclosed by the tarpaulin 12 is not perforated. However, additionally or alternatively, it is also possible to couple or connect mutually facing bows 36 to one another in the area of their connecting pieces 36b via the kinematic connecting rod assembly 38, which are then collapsed in a horizontal plane. It is possible that the connecting rods 38a, 38b are designed or arranged so that the bend can indeed be moved mainly vertically downward, but at the same time also slightly outward, in order to push the tarpaulin 12 a little outward when the carriages 32 are moved together.

In the closed state of the tarpaulin structure 10, the connecting rods 38a, 38b are arranged in a quite extended state and in each case enclose an angle of approximately 20° relative to the horizontal, resulting in an opening angle of approximately 40°. When the associated struts are shifted together, the connecting rods 38a, 38b assume an angle of almost 86° relative to the horizontal, resulting in an opening angle of the connecting rods 38a, 38b of less than 10°.

Two kinematic connecting rod assemblies 38 are also provided between the bow 26 articulated to the end abutment 24 and the rearmost of the bows 36, so that the movable part of the folding-top frame 18, which is supported by the carriage 32, 32', is coupled to the non-movable part to which the end abutment 24 belongs. Thereby, the tarpaulin structure 10 is also advantageously reinforced in this area. It is also possible to provide a kinematic connecting rod assembly 38 only in this area and to couple the bows 36 otherwise in another manner to one another. However, preferably, all the mutually facing bows 36 are provided with a kinematic connecting rod assembly 38 and as a rule with two kinematic connecting rod assemblies 38, forming a tarpaulin folding aid for the tarpaulin 12 along with the two bows 36. However, it is particularly preferable that at least the bow 26 is connected to the bow 36 turned toward it via a kinematic connecting rod assembly 38 which for the first time allows a flexible connection of the movable parts of the folding-top frame 16, that is to say the sliding covering arrangement 30, and of a stationary portion, that is to say the end abutment 24.

One can see in particular in FIG. 2, that in the closed state of the tarpaulin structure 10, the area which is at a distance from the carriages 32 of the rigid struts 34 on the one hand, and of the pivoting bows 36 on the other hand, lie at a height so that the tarpaulin 12 lies substantially in a horizontal plane.

Figure 3:
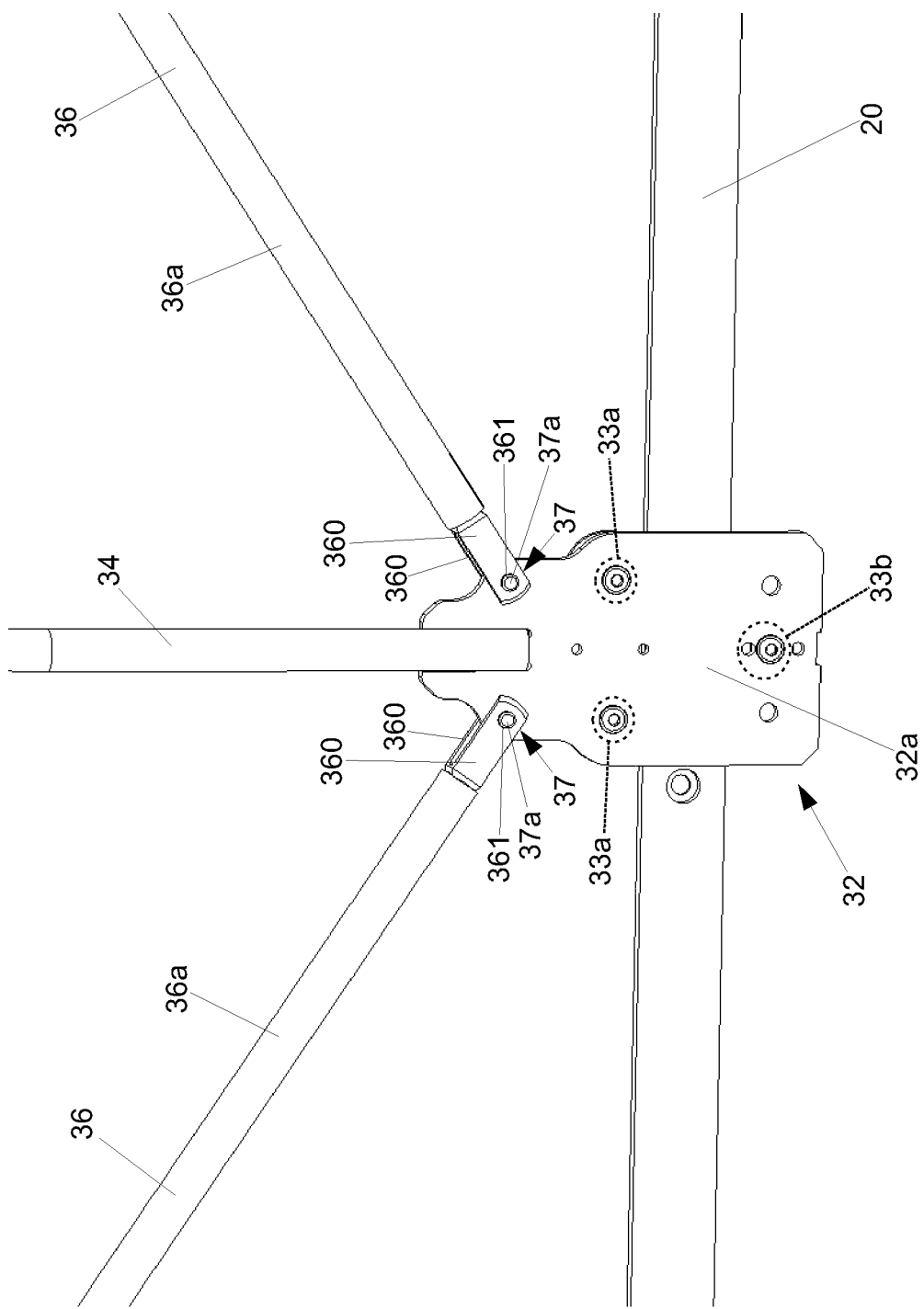
FIG. 3 shows an enlarged view of a carriage from FIGS. 1 and 2.

In FIG. 3, details of the connection of the struts 34 and pivoting bows 36 to a carriage 32 are shown individually. The carriage 32 comprises a carriage plate 32a, on which two upper support rollers 33a and a lower counter-roller 33b are articulated, which rotate around an axis in Y-direction and which are represented with dotted lines since they are connected on the inner side of the carriage plate 32a. The bent end piece 34a of the bow 34 is arranged in the form of a tubular section bent 90° in a vertical plane in Y-direction and is connected to an upper end of the carriage plate 32a. The two angle pieces 36a of the two pivoting bows 36 are pivotally connected via articulation pins 37a to bores forming articulations 37 in the carriage plate 32a. One can see that the ends of the angle pieces 36a include two projections 360 each having an articulation eye 361, and are therefore designed as double-shear articulation bearings, so that the carriage plate 32a with its bores goes in between the two projections 360. Thereby, a particularly bend-resistant guiding of the bow 36 on the carriage 32 can be achieved. Furthermore, one can see that there is no pivoting limitation for the articulations 37.

Figure 7:
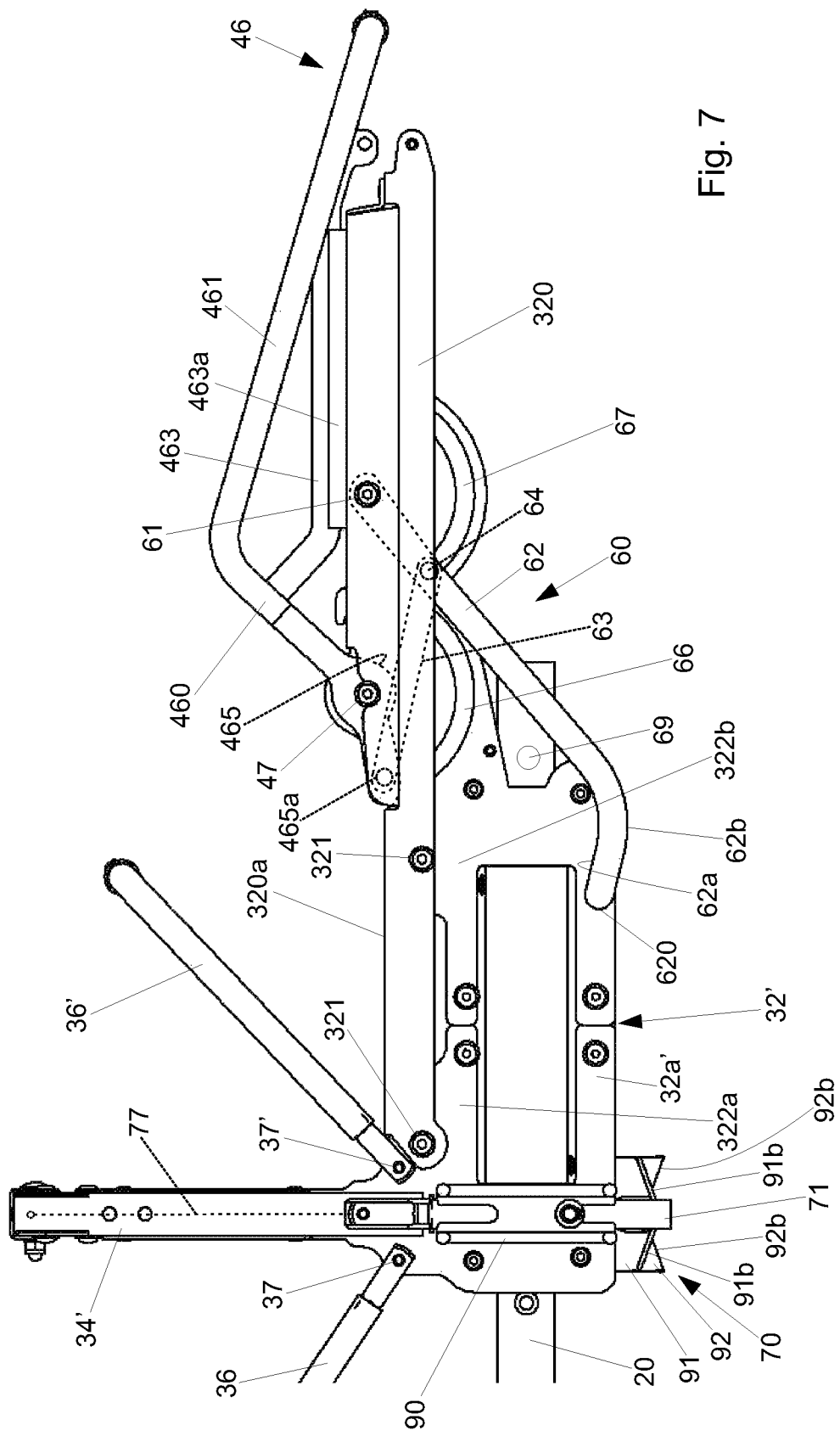
FIG. 7 shows a side view of the frontmost strut from FIGS. 1 and 2 with pivoted-down covering bow.

In FIGS. 5 to 7, details of the connection of strut 34', pivoting bow 36, auxiliary bow 36' and covering bow 46 on a frontmost pair of carriages 32' are shown.

FIGS. 5 and 6 show in greater detail the frontmost carriage 32' with reinforced strut 34' articulated thereto, from which in opening direction a bow 36 articulated to the articulations 37 starts. On the side opposite the articulation 37 with regard to the strut 34', an auxiliary bow 36' is articulated on an articulation 37', which turns out to be less high than the bow 36 and which is also designed in the shape of an upside-down U. As can be seen clearly in FIG. 2, the auxiliary bow 36' forms an alignment with the covering bow 46, to the effect that the tarpaulin 12, starting from the tubular connecting piece of the strut 34' and via the auxiliary bow 37', also reaches the front connecting piece 46b of the covering bow 46, thus making possible a tarpaulin guide which falls more or less at a slant, converging with the end of the understructure 14 and thus reliably covering said understructure.

The carriage 32' includes a very broad carriage plate 32a' which is guided in each case on two support rollers 33a' and a counter-roller 33b' arranged opposite each support roller 33a' with regard to the guide 20. In order to improve the support with respect to the understructure and/or the guide 20, the carriage 32 further includes two guide rollers 51 (FIG. 6) which are rotatable around a vertical axis and supported against the broad side of the guide rail 20, wherein it is also possible that the guide rollers 51 roll against the side wall of the understructure 14. The carriage 32' can also provide four guide rollers 51.

The frontmost carriage 32' in each case has a frame section 320 which extends above the guide 20 in a horizontal plane coinciding approximately with the articulations 37, 37' and which protrudes forward, that is to say in closing direction of the tarpaulin structure 10, over the frontmost support roller 33a'. The frame section 320 is here designed as a bent, U-shaped metal plate part which is fastened to the base plate 32a' of the frontmost carriage 32' by means of bolts 321 or else alternatively by means of screws. The frame section 320 is here designed to be open downward and thus connects two plate halves 322a, 322b of the base plate 32a' of the frontmost carriage 32' which are additionally connected to one another via other connecting means.

On the upward facing base of the frame section 320, a fitting or section 323 connected to the frame section 320 is provided, in which the pivot bearing for the articulation 47 of the covering bow 46 is provided; furthermore, an additional pivot bearing 61 for an additional connecting rod transmission 60 to be described in greater detail below is provided for pivoting the covering bow 46. The upward-facing surface of the section 323 forms a support for the covering bow 46 in its pivoted-down position, whereby the covering bow 46 is coupled to the carriage 32' and lies on said carriage via the frame section 320, so that a direct support on the understructure 14 is avoided. This moreover has the advantage that the frontmost carriage 32', after unlocking of a locking arrangement 70 to be explained in greater detail below, can also be moved with pivoted-down covering bow 46 along the guide 20, so that the process of the unlocking of the locking arrangement 70, of the moving of the frontmost strut 34' and the pivoting up of the covering bow 46 cannot occur simultaneously but occur instead in brief succession. Moreover, the frame section 320 also forms a support area 320a on its upward facing base for the arm 46a of the covering bow 46 when said covering bow is in its pivoted-up position.

As can be seen in greater detail in FIGS. 5 and 6, the pivoting bow 46 is composed of several pipe sections, namely each of two bent sections 46a defining a side arm, which can be pivoted in each case in the articulation 47, and of a tubular connecting piece 46b which connects the two bent sections 46a to one another.

Here, the bent section 46a is bent more than once, so that an angular arm is formed, which then has an angle which is extended by the tubular connecting piece 46b. The angular arm 46a has a short arm section 460 and a long arm section 461, which are angled with respect to one another by an arm angle of approximately 120°, wherein the end of the short arm section 460, which is turned away from the arm angle, is articulated to the articulation 47 of the frontmost carriage 32', and the end of the long arm section 461, which is turned away from the arm angle, is bent at the end in the direction of the tubular section 46b.

The short arm section 460 and the long arm section 461 are connected to one another by a brace 463 which itself in turn is angled and lies with the short arm perpendicular to the short arm section 460, while its long arm joins the long arm section 461 at an acute angle. The brace 463 reinforces the arm 46a in a vertical plane, in that a kind of triangle is constructed.

The side of the connecting brace 463 facing away from the long arm section 461 forms a support area 463a which forms a support surface that rests fully on the support 323 when the covering bow 46 is pivoted down. Thereby, the covering bow 46 in the pivoted-down state rests on the support 363 and can be moved readily, in particular without noise generation, with the carriage 32' along the guide 20, without being guided itself on the guide rail 20.

On the connecting brace 463, at its end connected to the long arm section 461, a hook 80 is pivotally connected via an articulation 81 (FIG. 5). The hook 80 has an engagement recess 82 which can be coupled with a bolt 85 inserted in an eye 84 on the end of the frame section 320, which is turned away from the strut 34', by the force of gravity of the hook 80 so that the engagement projection 82 slides behind the bolt 85 and thus prevents a pivoting up of the covering bow 46 when the tarpaulin structure 10 is arranged horizontally.

It is possible that the hook 80 includes several engagement sections 82 which are arranged more or less one beneath the other when the hook 80 is pivoted down and thus have the appearance of a sawtooth profile, so that, when the covering bow 46 is not pivoted down completely, for example, due to deformations, soiling or a protruding load, a locking of the hook 80 with the bolt 85 occurs nevertheless.

Furthermore, it is possible to arrange the hook 80 on the frame section 320 and to arrange the bolt section forming a counter-bearing on the covering bow 46, wherein it must then be ensured that the center of gravity of the hook articulated on the frame section 320 lies below its articulation, so that the engagement section is reliably engaged to form a positive locking with the counter-bearing.

A particular advantage of the hook 80 consists in that, in the case in which the understructure 14 is pivoted, for example, to bring about a tipping of a load from the understructure 14 by pivoting the flap 14a up around the articulation 14b, the hook 80 is also is disengaged from the bolt 85. In this case, the pivoting movement of the flap 14a around the articulation 14b requires that a portion of the flap 14a is pivoted into the area in which the closed covering bow 46 with the tarpaulin 12 connected thereto is located. However, the pivoting movement of the understructure 14 results in the hook 80 also pivoting due to the force of gravity, so that the hook 80 is freed from the counter-bearing 85 and enables the covering bow 46 to perform a pivoting movement. Thereby, the flap 14a of the understructure 14 is advantageously prevented from deforming the covering bow 46 in spite of its being locked on the frame section 320 of the carriage 32'.

Furthermore, the hook 80 has an abutment surface 80a which enables the hook 80a to be knocked free from its position in which it is locked with the bolt 85. For this purpose, an abutment member 89 on the guide 20 is provided, which protrudes in the manner of a bolt from the broad side of the guide rail 20 and against which the abutment surface 80a is moved when the tarpaulin structure 10 is opened. Due to the slanted or rounded shape of the abutment surface 80a, the hook 80 is pivoted around the articulation 81 and is thus disengaged from the bolt 85 on the frame section 320. Thereby, it is advantageously made possible that the carriage 32' with the covering bow 46 connected thereto can also be moved along the guide 20, and the locking of the covering bow 46 on the frontmost carriage 32' is released, without the hook 80 having to be actuated separately for this purpose. Thereby, the abutment surface 80a makes it possible that, when the carriage 32' is moved axially, the hook 80 is disengaged from the bolt 85 and thus the locked covering bow 46 and the carriage 32' are uncoupled. The hook 80 therefore has two unlocking possibilities, namely, on the one hand, by pivoting the understructure 14, and, on the other hand, by axial movements of the movable parts of the folding-top frame 16 along the guide 20.

Advantageously, the hook 80 can have a guide surface, in particular when it is connected to the frame section 320, which enables a pivoting of the hook when the hook again runs over the abutment member 89 when the frontmost carriage 32' is moved in the closing direction, so that the hook 80 does not lock with the abutment member 89. In the present embodiment example, in which the hook 80 is connected to the covering bow 46, the abutment surface 80a also assumes the function of the guide surface.

Furthermore, in FIGS. 5 and 7 one can see that the elongate connecting piece 46b of the covering bow 46 in the pivoted-down state descends to the level of the frame section 320, so that the tarpaulin 12 practically reaches the upper edge of the understructure 14.

In FIG. 7 in particular, one sees that the connecting rod 46 includes in the area of its articulation 47, that is to say in extension of the arm 46a or of the short arm section 460, an extension 465 which is received in an upwardly open area of the part 323 of the frame section 320 and is therefore only partially visible.

On the end of the extension 465, which is turned away from the articulation 47, a bearing point 465a is formed, which enables an introduction of force for the pivoting of the covering bow 46. It is possible to connect a longitudinally movable drive to the bearing point 465a, which is supported, for example, against the carriage 32' and thus in a motor-driven manner brings about the pivoting of the covering flap 46. However, in the present embodiment example, a connecting rod transmission 60 is provided for this purpose, which converts a shifting movement of the carriage 32' along the guide 20 into a pivoting movement of the covering bow 46.

The connecting rod transmission 60 includes an actuation rod 62 which is mounted by articulation in the bearing point 61, and an intermediate connecting rod 63 which, on one end, is mounted by articulation in the bearing point 465a, and, on the other end, is mounted on the actuation rod 62 via an articulation 64 which is provided at a distance from the bearing point 61. The articulation pins in the bearing points 465a, 64 are in each case implemented as sliding blocks which can each be moved in circular sliding tracks 66, 67 around the articulation 47 or the articulation 61, wherein the sliding tracks 66, 67 are intended to prevent a sideward buckling out of the connecting rods 62, 63 of the connecting rod transmission 60. The sliding tracks 66, 67 formed in the carriage 32' can also be omitted, without affecting the basic function of the connecting rod transmission 60. A lateral guiding of the parts of the connecting rod transmission 60 in the frame section 320 is also possible.

One can see that the articulation 61 of the actuation rod 62 is located in front of the articulation 47 of the covering bow 46, wherein the two articulations 47, 61 are arranged in the same horizontal plane. However, the distance of the articulation from the respective sliding track 66, 67 is different, so that a transmission ratio between the two sliding blocks 465a, 64 is advantageously achieved. It is also possible to provide the articulations 47, 61 in different planes, or, on the other hand, instead of the connecting rod 63, several connecting rods can be provided, as, for example, in a four-joint transmission, which couple the extension 465 to the actuation rod 62.

The actuation rod 62 works together with a deflection member 69 attached to the guide rail 20, which deflection member can be a roller or a pin or the like. When the carriage 32' is moved, the actuation connecting rod 62 by its inner side 62a, which faces the deflection member 69, of a bent end section turned away from the articulation 61 engages with the deflection member 69, and the deflection member 69 causes the actuation rod 62 to perform a pivoting movement around the articulation 61. Thereby, via the intermediate connecting rod 63, the extension 465 is forced to perform a pivoting movement, whereby the covering bow 46 is pivoted upward. The sliding guides 66, 67 are here formed so that they can limit the pivot angle of the covering bow 46.

If the carriage 32' is moved along the guide 20, the inner side 62a of the actuation rod 62 comes in contact with the deflection member 69, so that, when the carriage 32' is moved further along the guide 20, the covering bow 46 is pivoted up. Due to the curved or bent shape of the end section of the actuation rod 62, the actuation rod 62 is pivoted into a position in which the end 620 of the actuation rod 62 lies in a plane above the deflection member 69, so that the carriage 32' can slide with the connecting rod transmission 60 and the actuation lever 62, which is then arranged in extension of the frame section 320, over the deflection member 69. Here, the sliding track 67 can include a projection such that the actuation rod 62 is lifted only just above the deflection member 69, but then falls somewhat back again, so that, when the frontmost pair of carriages 32' is moved backward, the external side 62b of the actuation rod 62 comes in contact on its external side 62b with the deflecting member 69 and is moved in the opposite direction, so that the covering bow 46 is again pivoted into its pivoted-down position. Here, due to the symmetry, it is provided that the covering bow 46 in each case includes on each of its two arms 46a an extension 465 and that on both sides a connecting rod transmission 60 is provided on the extension 465 in each case for pivoting the covering bow 46, wherein, on one side of the folding-top frame 16, a deflection member 69 for controlling the pivoting up movement of the covering bow 46 is provided, when a deflection member 69 for controlling the pivoting down movement of the covering bow 46 is provided on the other side of the folding-top frame 16.

It has to be understood that the deflection member 69 is provided at a distance from the carriage 32' or the connecting rod transmission 60 articulated thereto such that, when the carriage 32' is moved axially in X-direction, the hook 80 is first knocked free and it is only thereafter that the covering bow 46 is pivoted up. It is possible to connect the connecting rod transmission 60 to the hook 80, so that instead of the hook 80 being knocked upward, it is moved by the connecting rod transmission 60, wherein then, under the force of gravity, the connecting rod transmission 60 also must be designed so it is designed as pivotally movable, in order to disengage the hook 80 from the counter-bearing 85, which in the present case, however, is readily obtained. The connecting rod transmission 60 allows a partial pivoting up of the covering bow 46 during tipping of the understructure 14.

In FIGS. 8A and 8B, in each case enlarged, a portion of the frontmost carriage 32' of one longitudinal side (FIG. 8A) and of the other longitudinal side (FIG. 8B) of the tarpaulin structure 10 is shown, to which the locking arrangement 70 is connected. The locking arrangement 70 has a first locking member 71 shown in FIG. 8A, wherein the first locking member 71 is implemented as a flat material cut from a strip-shaped band. The locking member 71 has a first section 71a which is arranged as axially movable in a longitudinal guide 90 provided on the frontmost carriage 32'.

The first locking member 71 includes an end section bent twice in the shape of a U, turned away from the first section 71a, end section which contains a fold directed in the direction of the longitudinal bisector and an additional fold perpendicular thereto, wherein the additional fold includes an upwardly directed end which forms a guide section 71b of the locking member 71. On the opposite longitudinal side, a second locking member 72 is guided longitudinally slidably in a corresponding longitudinal guide 90 by means of a first section 72a, wherein the second locking member 72 protruding from the longitudinal guide 90 includes a section which is bent twice in the shape of a Z and turned away from the guide section 72a in the longitudinal guide 90, wherein said section includes a first folding area in the direction of the longitudinal bisector and lying in the horizontal plane, and an additional folding section protruding vertically downward therefrom, with an end that forms a guide section 72b of the second locking member 72.

A first locking catch 91 is associated with the first locking member 71 in the area of the guide rail 20 on the understructure 14, and, on the opposite side, a second locking catch 92 is associated with the second locking member 72 and screwed to the inner side of the longitudinal guide 20 in such a manner that the support rollers 33a' and counter-rollers 33b' can run along the rail 20 past the locking catch 92. The locking catch 91 of the first locking member 71 and the locking catch 92 of the second locking member 72 each have a central recess 91a, 92a which is limited on both sides of the locking catch in such a manner that, when the locking member 71, 72 is in the inserted position, said locking member cannot be moved in the direction of the guide line 20, so that the carriage 32' is stopped in each case on the rail 20.

Figure 9:
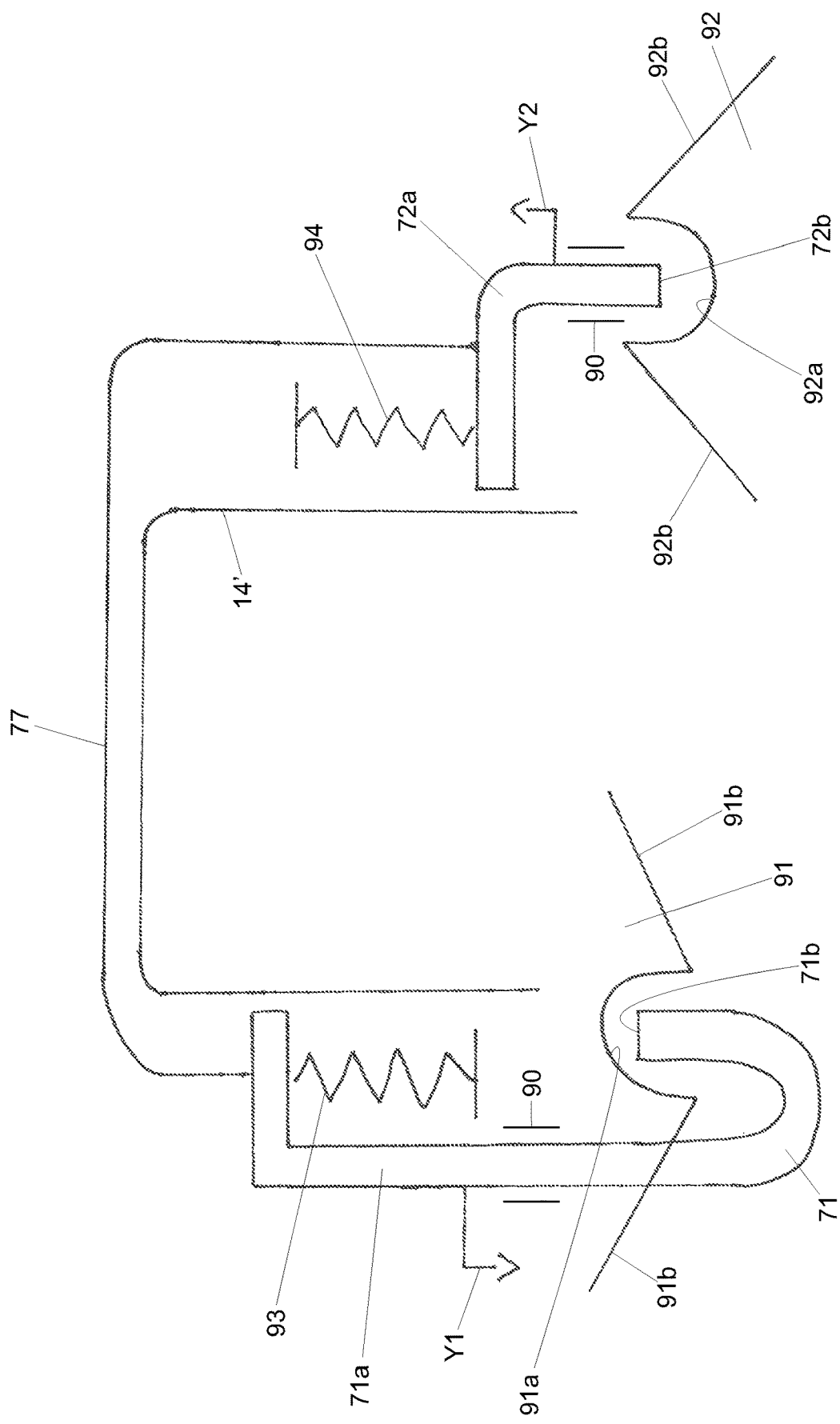
FIG. 9 shows a diagrammatic representation for an explanation of the locking arrangement from FIG. 8.

The first locking member 71 is movable in a first unlocking direction Y1 (FIG. 9), which points vertically downward, so that the guide section 71b reaches under the locking catch 91 and can thus be moved past the locking catch 91. For the unlocking, the second locking member 72 can be moved in a second locking direction Y2 (FIG. 9) which is opposite from the first locking direction Y1 and thus points vertically upward, whereby the guide section 72b of the second locking member 72 is released from the locking catch 92.

Here, the first locking member 71 is connected to the second locking member 72 by means of a force transmission member with at least tensile rigidity designed as rope 77 and guided in the front strut 34' from one longitudinal side to the other longitudinal side, wherein the rope 77 is connected to the two locking members 71, 72. If the first locking member 71 is pulled downward via a pulling strap 79 which is connected via an articulation 79a to the first locking member 71, the rope 77 brings about an upward pulling of the second locking member 72. Instead of the rope 77, a rod assembly, a chain or another force transmission member with at least tensile rigidity can be provided.

The locking catch 91, 92 has a central recess 91a, 92a which forms a stop position of sufficient width so that the locking members 71, 72 can be inserted therein. On both sides of the stop position 91a, 92a, an entry slope 91b, 92b is formed in each case, which protrudes folded away from a base area connected to the guide rail 20, so that it engages at least with the downward facing end of the guide member 71, 72. The entry slope is in each case run over in X-direction and has a ramp-like inclination in Y-direction.

The first locking member 71 and the second locking member 72 are each pretensioned by a compression spring 93, 94 designed as a coil spring in the direction of the recess 91a, 91b of the locking catch 91, 92, so that the first locking member 71 is pushed upward and the second locking member 72 is pushed downward. The first spring arrangement containing the first compression spring 93 and/or the second spring arrangement containing the second compression spring 94 is in each case arranged in the area of the longitudinal guide 90, wherein an area laterally protruding from the locking member 71, 72 forms a counter-bearing for the compression spring 93, 94, and a projection provided on the longitudinal guide 90 forms the second counter-bearing for the respective compression spring 93, 94, which is represented diagrammatically in FIG. 9.

In FIG. 8A one can see that the entry slope 91b of the first locking catch 91 is slanted in the direction of the stop position 91a away from the longitudinal guide 90, that is to say downward, while the entry slope 92b of the second locking catch 92 (FIG. 8B) is slanted upward in the direction of the stop position 92a, that is to say in the direction of the guide 90. Here, the guide section 71b of the first locking member 71 is tensioned in the direction of the lower surface of the entry slope 91b by the spring 93, while the guide section 72b of the second locking member 71 is tensioned in the direction of the upper surface of the entry slope 92b by the spring 94.

If, during the movement, the respective guide section 71b, 72b runs on the entry slope 91b, 92b, when the entry slope 91b, 92b designed in the manner of a wedge ramp is run over, the horizontal movement in X-direction moves the locking member 71, 72 in unlocking direction Y1, Y2, until the guide section 71b, 72b is led past the entry slope 91b, 92b. Then, the spring 93, 94 in relaxing moves the locking members 71, 72 against the unlocking direction Y1, Y2, so that the locking members 71, 72 or their guide sections 71b, 72b are held in the stop position 91a, 92a, thus locking the frontmost carriage 32' on the guide 20.

It has to be understood that, in the end position, in which the frontmost carriage 32' is held, one entry slope 91b, 92b is in principle sufficient; however, in the present case the locking catch 91, 92 is designed on both sides with entry slopes 91b, 92b, so that the same component can also be provided at the other end of the guide 20, in order to be able to stop the shifted-together, opened folding-top frame 16 in the maximum open position.

A pulling strap 79 engages with the first locking member 71, which is represented partially in FIG. 8a, by means of which the first locking member 71 can be moved downward, and, via the rope 77, the second locking member 72 can at the same time be moved upward. For this, it is sufficient that a sufficiently large force component engages downward with the pulling strap 79, so that the locking arrangement 70 consisting of the first locking member 71 and the second locking member 72 is released with respect to the locking catches 91 and 92, and the horizontal force component is introduced as movement force into the frontmost carriage 32'. After the unlocking and movement of the carriage 32' away from the stop position, it is possible to actuate not the pulling strap 79, but rather an additional pulling device 78 (FIG. 1) which engages with the bow 36. Thereby, the force in X-direction is introduced more evenly into the two frontmost carriages 32' which are connected by the pivoting bow 36.

In the drawings, one sees that the rollers 33a, 33b in each case have a grooved circumferential surface, wherein the groove width is identical to or slightly greater than the small side of the rectangular guide rail 20. Thereby, the carriages 32, 32' are centered automatically on the small side of the guide rails 20, and the possibility of the rollers sliding off the rail 20 is advantageously avoided.

Each additional carriage 32 includes, as shown in FIG. 3, two upper support rollers 33a and one or two counter-rollers 33b, the circumferential surface of which is in contact in the grooved area with an upper small side and with a lower small side of the guide rail 20. On both sides of the circumferential surface, the rollers 33a, 33b have a flange, also referred to as annular flange, which borders the broad side of the guide rail 20, which lies in a vertical plane, over a small height corresponding to the projection of the annular flange over the circumferential surface. The projection measures a few millimeters approximately, so that a sufficient height of the guide rail 20 of approximately 40 mm remains, in order to set screws approximately centrally for the connection to the container 14 by the broad side. The height of the rollers 33a, 33b in the same way is 38 mm including the annular flange and thus smaller than the height of the guide rail 20. The distance of the guide rail 20 from the external wall is the same as its width, namely 8 mm (or 7.5 mm). The distance of the external side of the carriages 32, 32' from the external side of the guide rail 20 is approximately 10 mm, so that the projection of the folding-top frame 16 over the understructure 14 in Y-direction on each side is less than 30 mm, preferably about 25 mm.

The folding-top frame 16 of the tarpaulin structure can compensate for tolerance variations in the distance between the two guide rails 20 of up to +/−50 mm, in that the bows 26, 36, 36', 46 and the struts 34 with their arms are spread apart from one another or bent toward one another. The elasticity of the bows 26, 36, 36', 46 and struts 34 makes this play available at the level of the carriages 32, 32'.

In order to distribute the carriages 32, 32' in the closed state of the tarpaulin structure exactly along the guide rail 20, a pulling band formed as a wire is connected in each case to the carriages 20 and to the end abutment 24 on both longitudinal sides of the tarpaulin structure 10. The pulling band prevents the carriages 32, 32' from assuming a greater distance from one another than is desirable for the closed position, and since the pulling band is less expandable than the tarpaulin connected to the struts 34, 34' and bows 36, the pulling band also unloads the tarpaulin 12. The pulling band is here connected firmly to the support plates of the carriages and guided in a hem of the tarpaulin 12 so that it cannot hang down and at the same time tensions the hem against the understructure 14. In order to better take up forces introduced by the carriages, the tarpaulin 12 can include a reinforcement, such as in an incorporated belt, in the area of the carriages.

The invention then functions as follows:

In the closed position of the tarpaulin structure 10, which is shown in FIGS. 1 and 2, the covering bow 46 is locked in each case by one of the hooks 80 against one of the frontmost carriages 32' in each case. The frontmost carriages 32' in turn are fastened by the locking arrangement 70 to the guide 20. By means of the lowered covering bow 46, the tarpaulin 12 is tensioned, wherein the tarpaulin 12 is fastened to at least one of the struts 34 and of the pivoting bows 36. In addition, the tarpaulin 12 is advantageously connected to them in the area of the carriages 32, 32', in order to also ensure as much as possible that the space to be covered by the tarpaulin structure 10 is hidden laterally from view and tamper-proof. For this purpose, it is possible that the tarpaulin 12 includes wires or the like in the area of its hem, which tension the hem when the tarpaulin structure 10 is closed, but which, when the tarpaulin structure 10 is open, are capable of following the lifting of the tarpaulin 12 brought about by the lifting of the tarpaulin folding aid formed by two pivoting bows 36 and kinematic connecting rod assemblies 38 arranged in between.

Starting from this closed position, the covering bow 46 or the front carriage 32' is unlocked, and the operation of the folding-top frame 16 can occur from just one side.

In order to open the tarpaulin structure 10, in a first step, the pulling strap 79 is pulled with a downward directed component. The locking arrangement 70 then unlocks the locking members 71, 72 from the locking catches 91, 92, and as soon as the frontmost carriage 32' has moved to some extent in X-direction, the locking members 71, 72 can no longer be pushed back by the springs 93, 94 into the locking catch 91, 92.

To further open the tarpaulin structure 10, in a second step, the hook 80 with its abutment surface 80a strikes the abutment member 89, so that the hook 80 is pivoted around its articulation 81 and thus releases the covering bow 46 from the frontmost carriage 32'.

For the further opening of the tarpaulin structure 10, in a third step, the actuation rod 62 strikes the deflection member 69, so that the movement for the shifting of the frontmost carriage 32' is converted into an upward pivoting movement of the covering bow 46, until said covering bow rests with its short arm section 460 on the area 320a of the frame section 320.

It has to be understood that the above three steps can also be carried out with temporal overlap or in a different order.

During the further continuation of the shifting movement along the guide 20, the tarpaulin folding aids piles up, until all the carriages are arranged in a shifted together packet in the rear area of the guide 20 on the plates 22. There, the locking arrangement 70 locks the packet to an additional locking catch 91, 92.

The closing movement occurs in reverse order compared to the opening movement, wherein here too the force introduction occurs on one side on the frontmost carriage 32', for example, via a strap connected thereto. However, it is also possible to connect a pulling means driven by motor to one of the frontmost carriages 32', in order to automatically open and close the tarpaulin 12. During the pulling of the frontmost carriage 32' along the guide rail 20, the tarpaulin 12 and the tarpaulin folding aid made of the pivoting bow pairs 36 unfold again.

First the rear locking arrangement is unlocked, then the tarpaulin folding aids 36, 38 are unfolded, and finally the covering bow 46 is pivoted down via the connecting rod transmission 60, after which the hook 80 engages with the counter-bearing 85, before the locking members 71, 72 are again transferred into the front locking catches 91, 92 via the entry slopes 91b, 92b and brought into the stop position there when the springs 93, 94 are unloaded.

In FIGS. 10 to 20, an additional embodiment example of a folding-top frame 1010 for a tarpaulin structure is shown, wherein the same reference numerals as in the preceding embodiment example designate the same or structurally equivalent parts, and modified parts, which will be discussed substantially in the following explanations, are incremented up by 1000.

Figure 10:
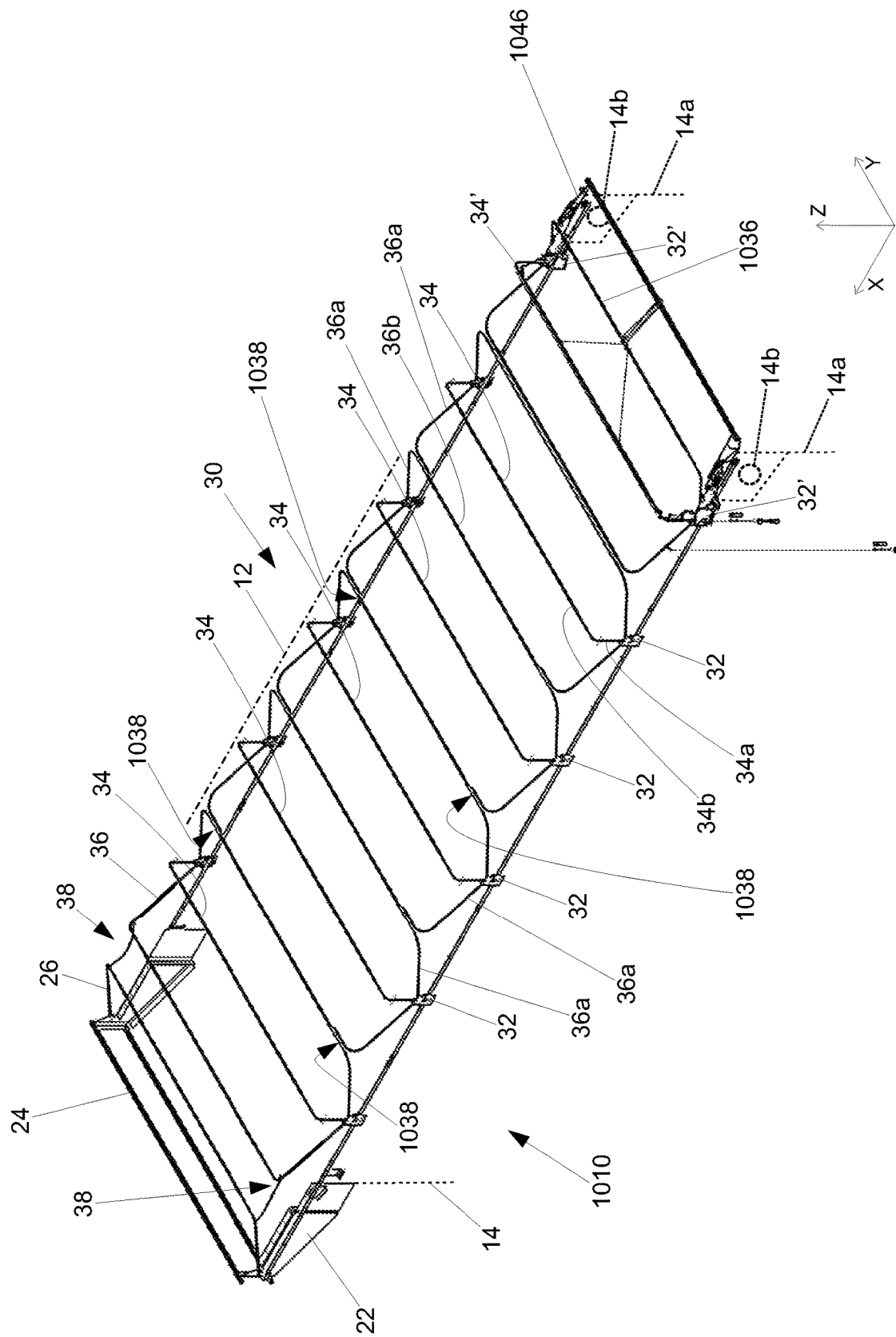
FIG. 10 shows a perspective view onto the folding-top frame of a further preferred embodiment example of atarpaulin structure according to the invention for a container in the closed state.
Figure 11:
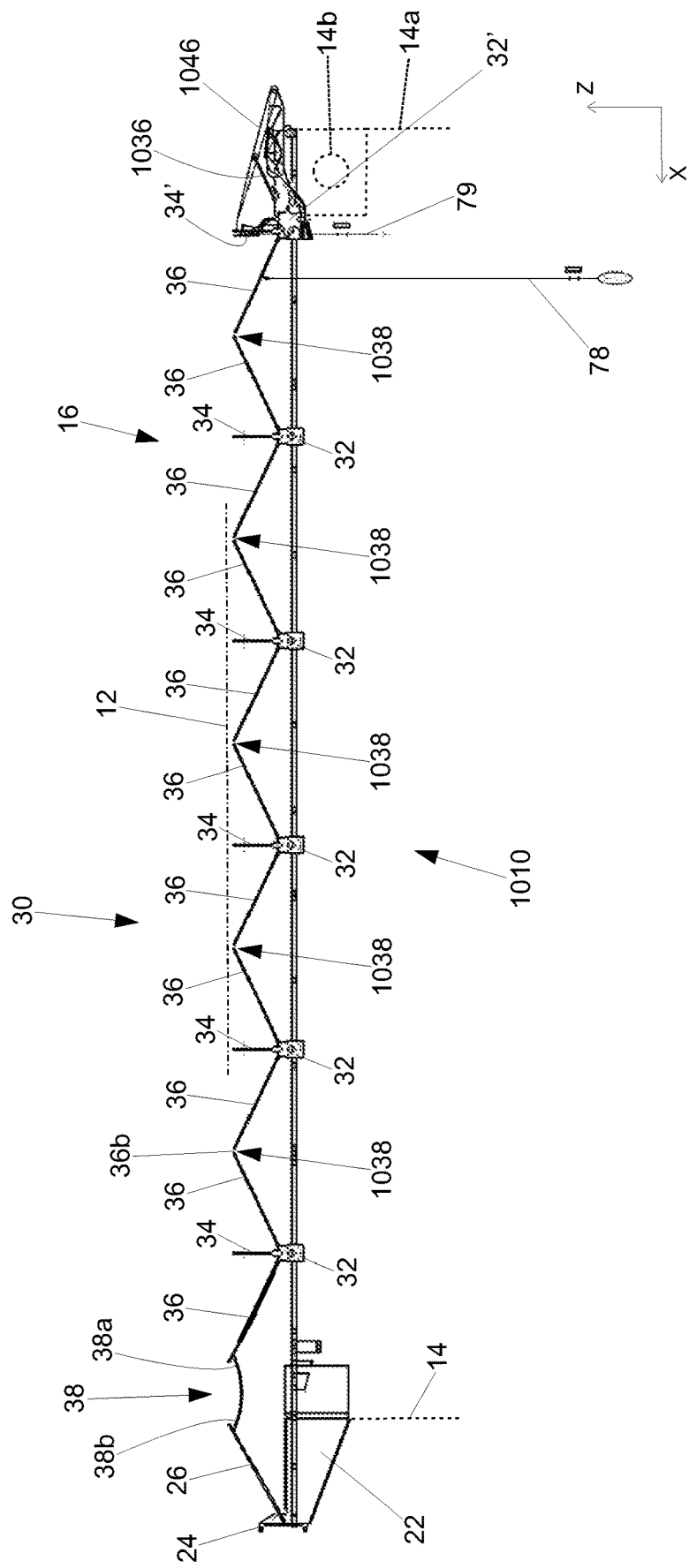
FIG. 11 shows a side view of the folding-top frame from FIG. 10.
Figure 13:
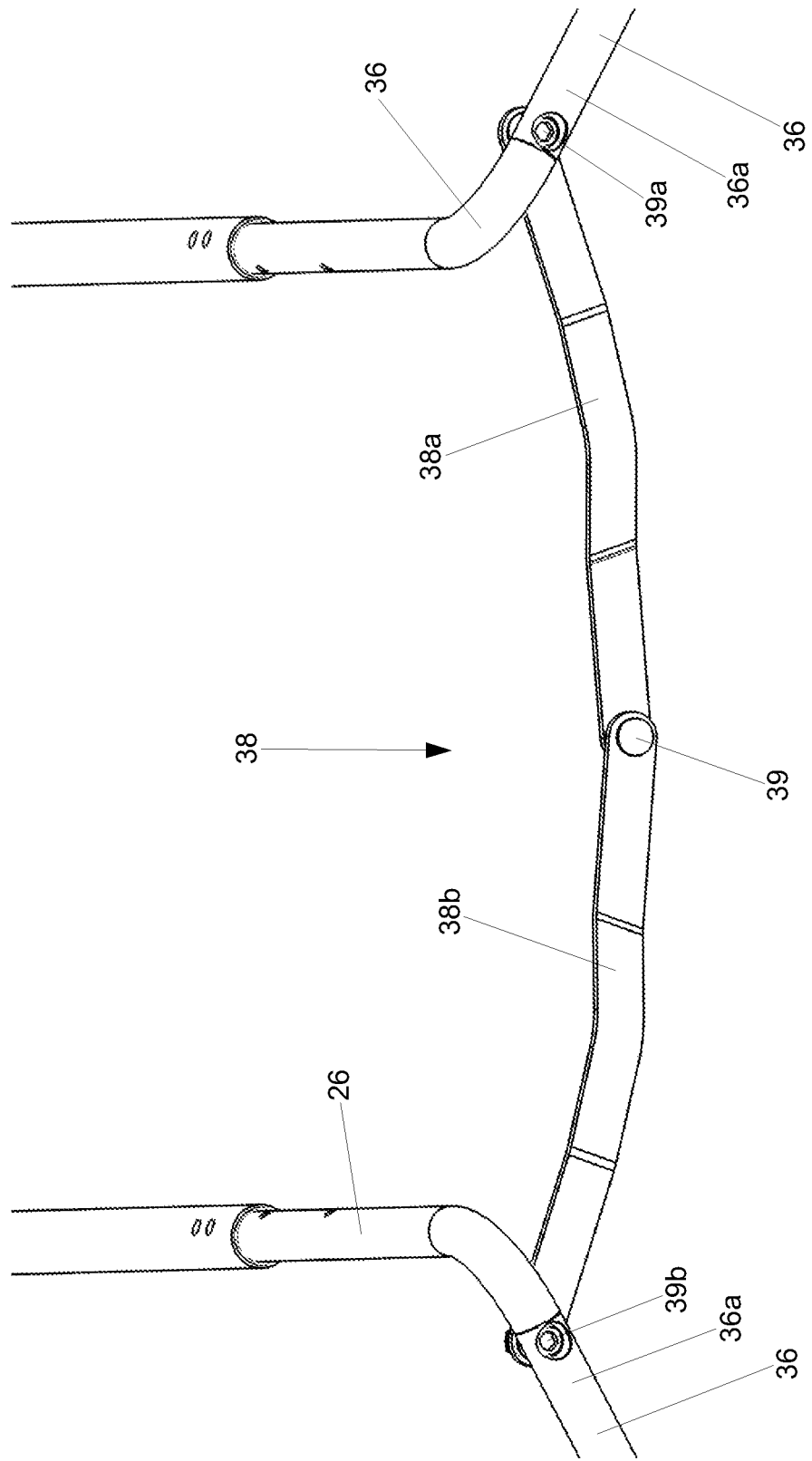
FIG. 13 shows an enlarged view of the rear connecting rod transmission from FIG. 10 and FIG. 11.

First, one can see in FIGS. 10 and 11 and in FIG. 13, that a kinematic connecting rod assembly 38 is provided only between the pivoting bow 26 linked to the end abutment 24 and the rearmost pivoting bow 36 of the sliding covering arrangement 30. The additional bows 36 of the sliding covering arrangement 30, on the other hand, are coupled to one another on their connecting pieces 36b, wherein a pivot angle limiter 1038 prevents the bows 36 from being shifted over one another.

Figure 12:
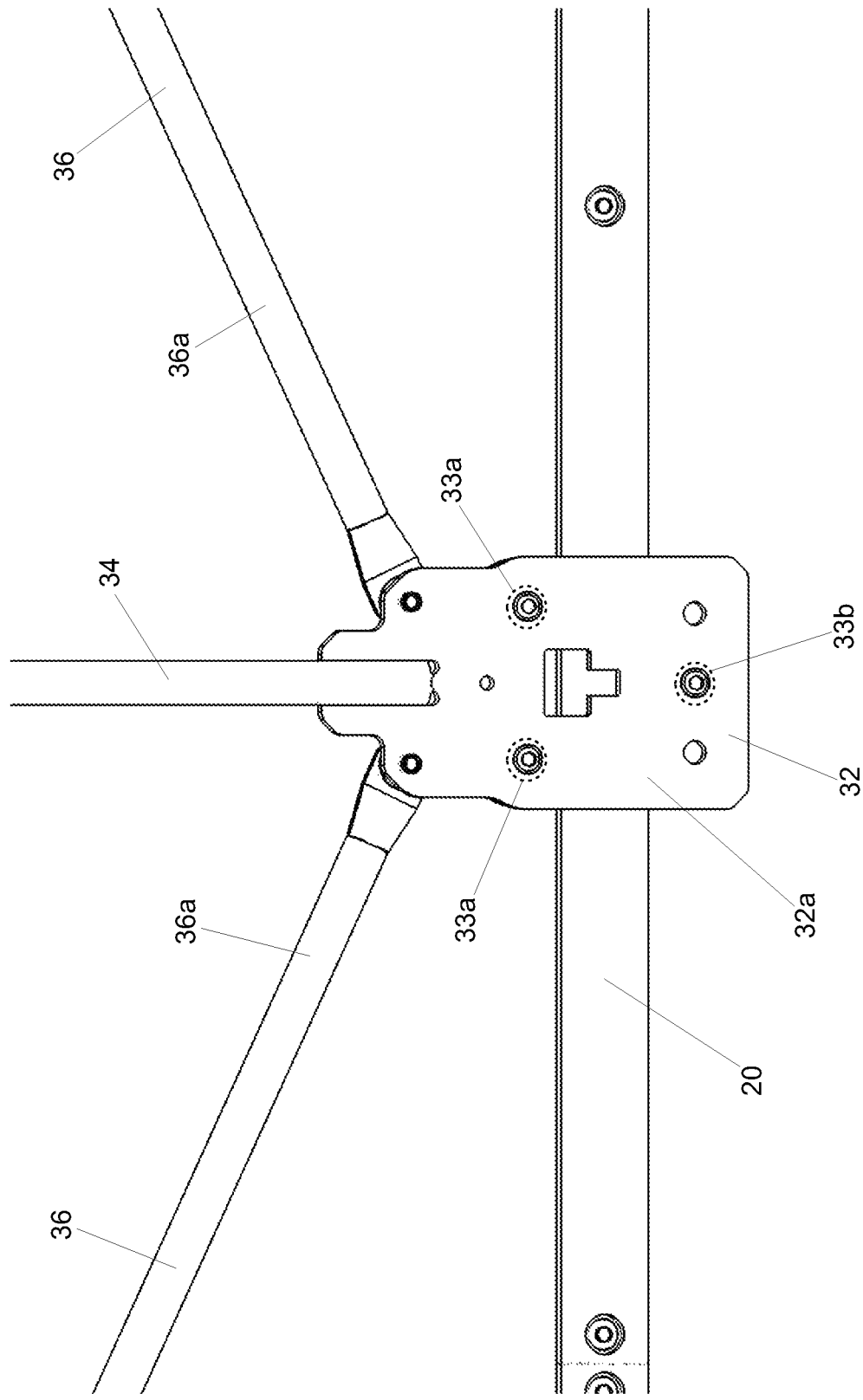
FIG. 12 shows an enlarged view of a carriage from FIGS. 10 and 11.

In FIG. 12 one sees that the bows 36 or their corner pieces 36a are connected only on one side to the base plate 32a of the carriage 32; the carriage is connected by the support rollers 33a and the counter-rollers 33b in such a manner that it can be moved along the guide 20. The strut 34 is here connected firmly to the base plate 32a of the carriage 32.

Figure 14:
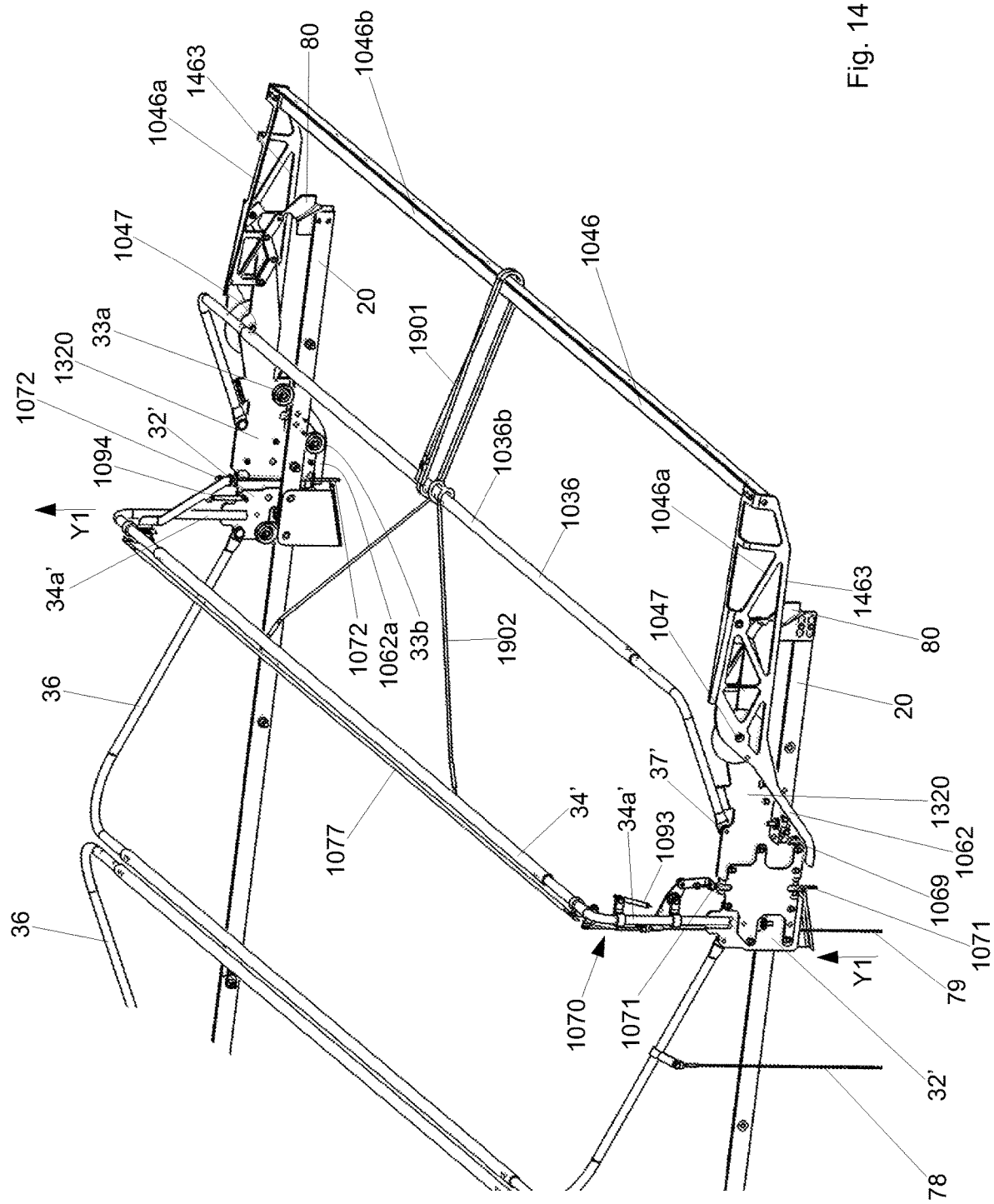
FIG. 14 shows an enlarged view of the frontmost strut from FIG. 10 and FIG. 11 with pivoted-down covering bow.
Figure 15:
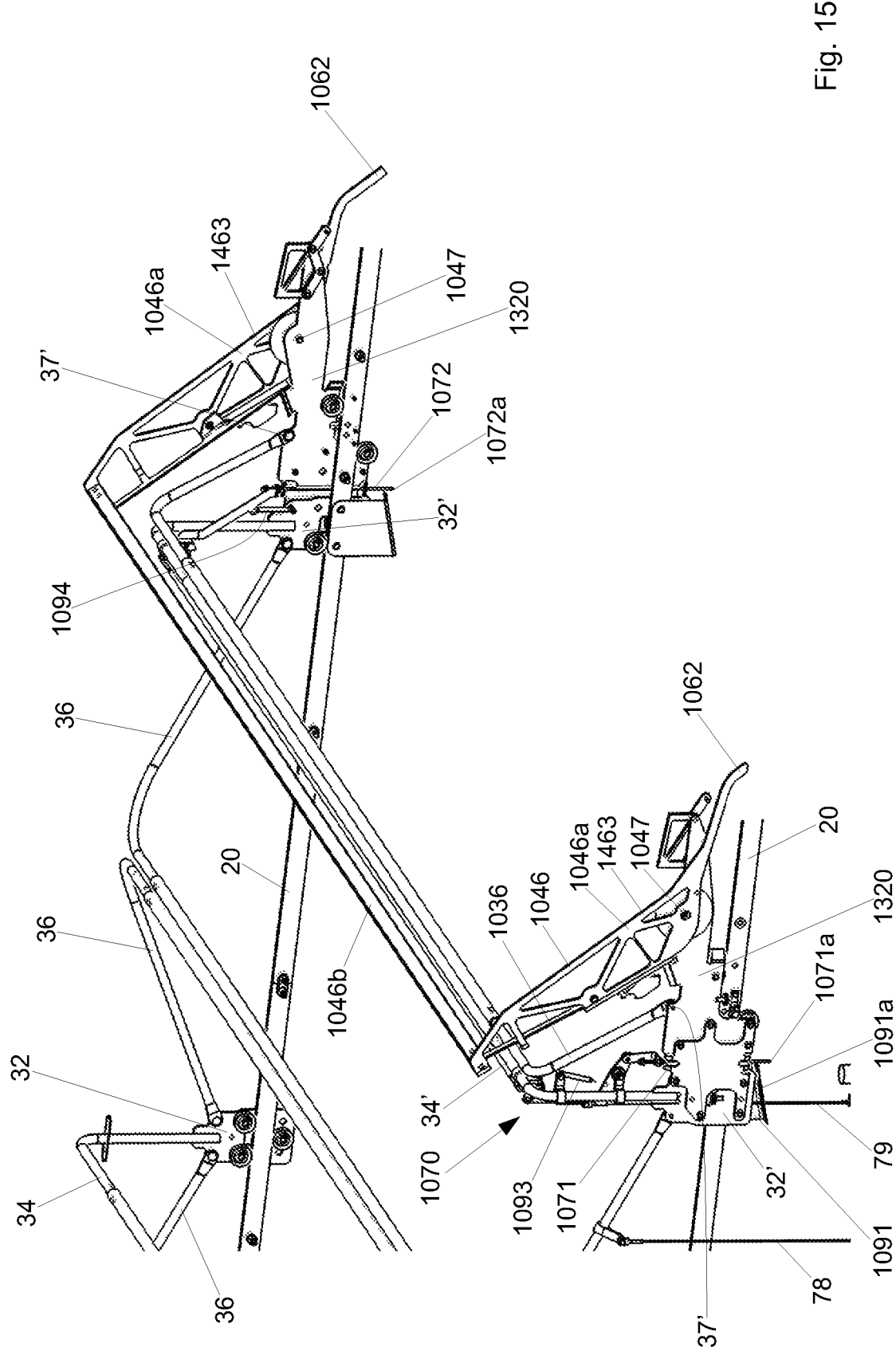
FIG. 15 shows an enlarged view of the frontmost strut from FIG. 10 and FIG. 11 with pivoted-up covering bow.
Figure 16:
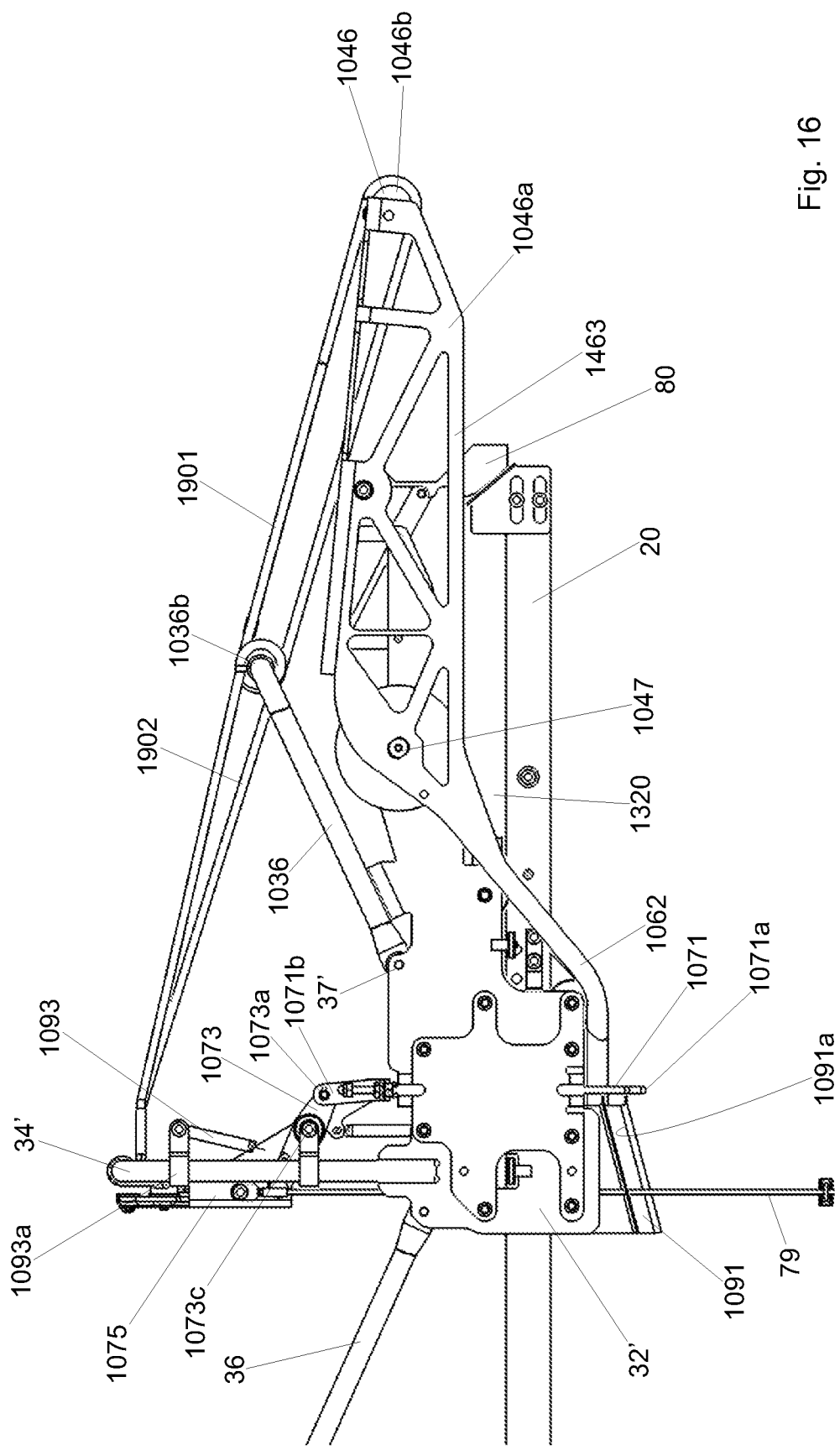
FIG. 16 shows a side view of the folding-top frame from FIGS. 10 and 11 with pivoted-down covering bow.
Figure 17:
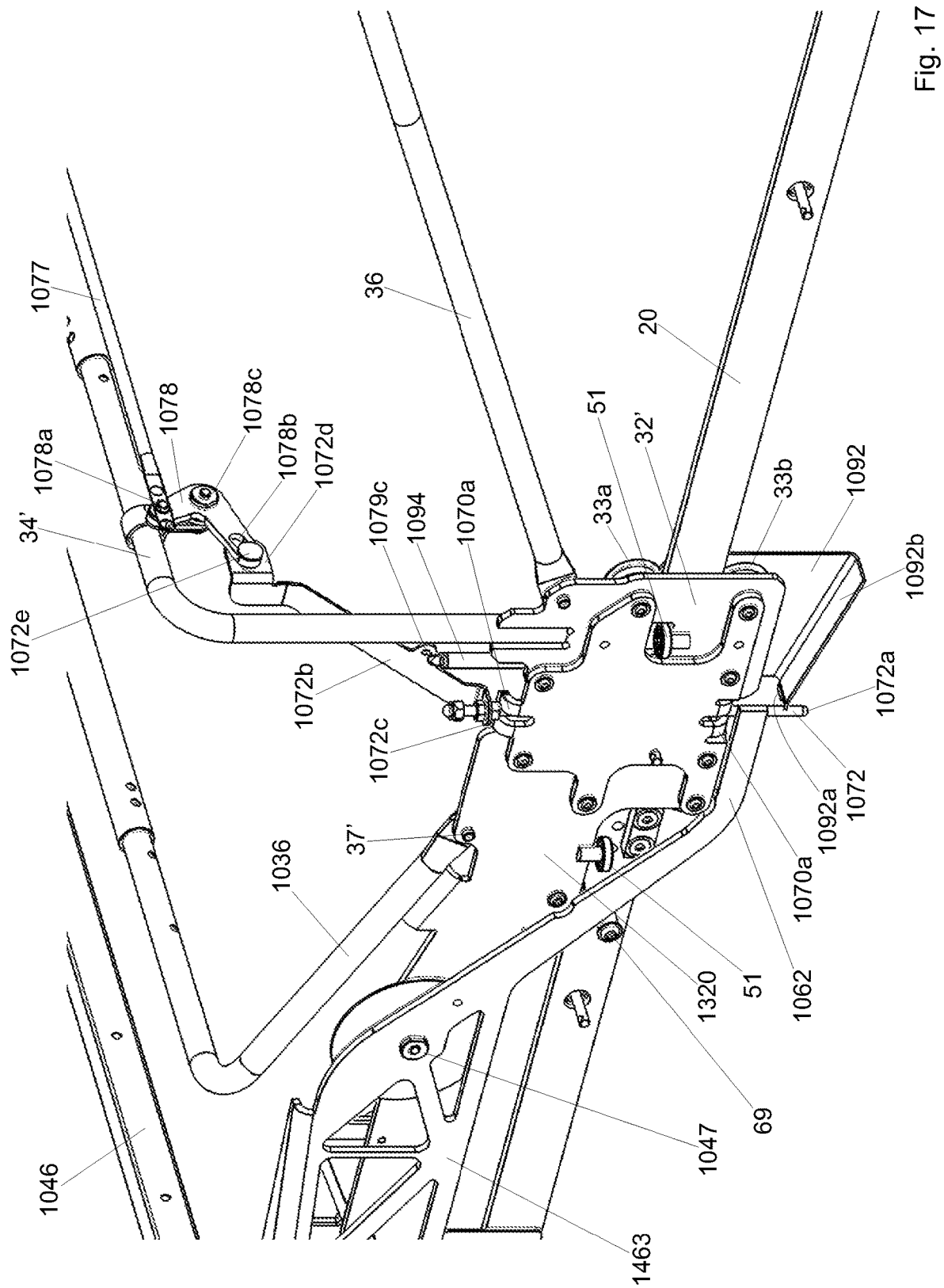
FIG. 17 shows an enlarged perspective view from outside with details of a locking of the folding-top frame from FIGS. 10 and 11.
Figure 18:
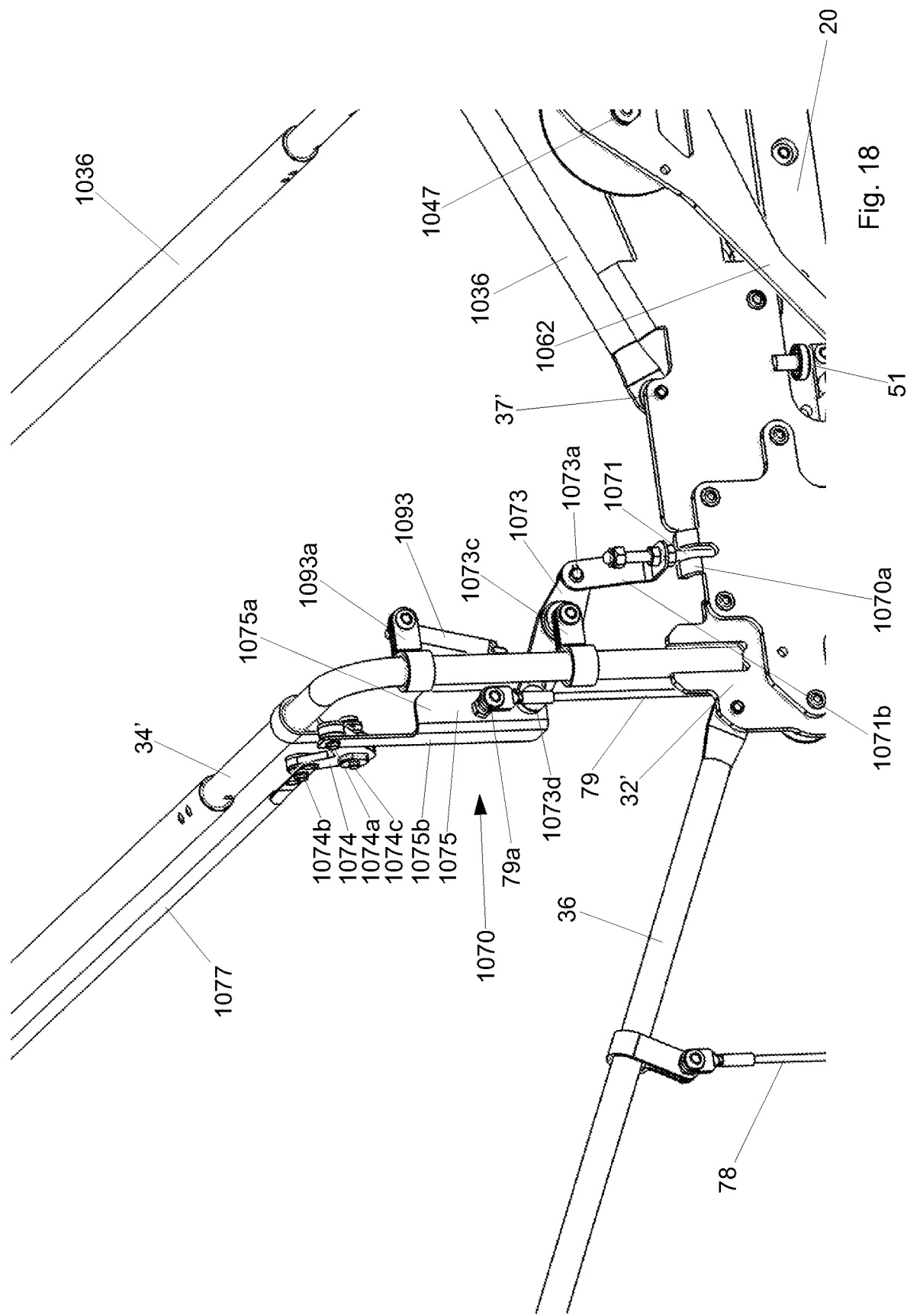
FIG. 18 shows an additional enlarged perspective view from outside with details of a locking of the folding-top frame from FIGS. 10 and 11.
Figure 19:
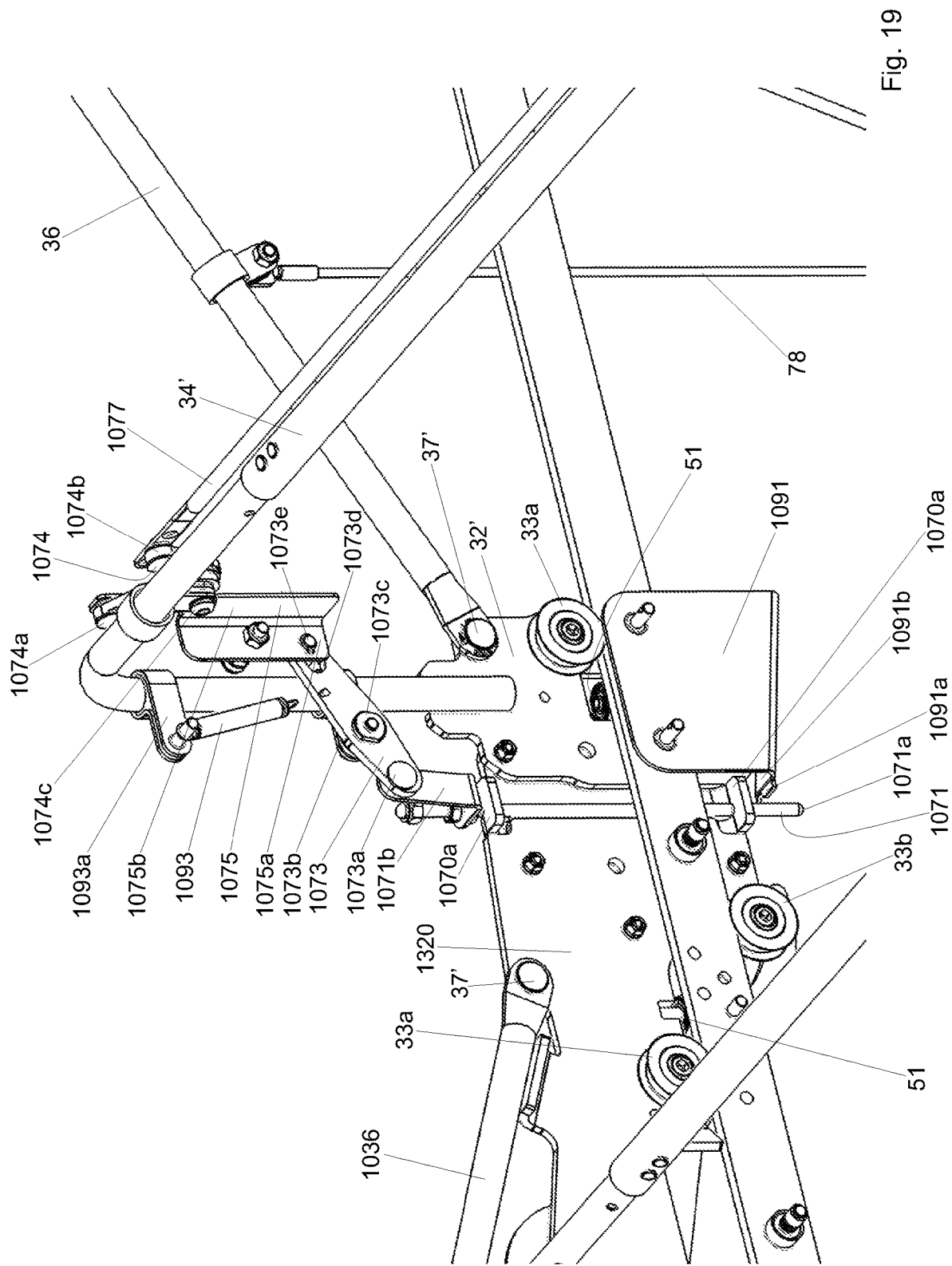
FIG. 19 shows an enlarged perspective view from inside the folding-top frame according to FIGS. 10 and 11.
Figure 20:
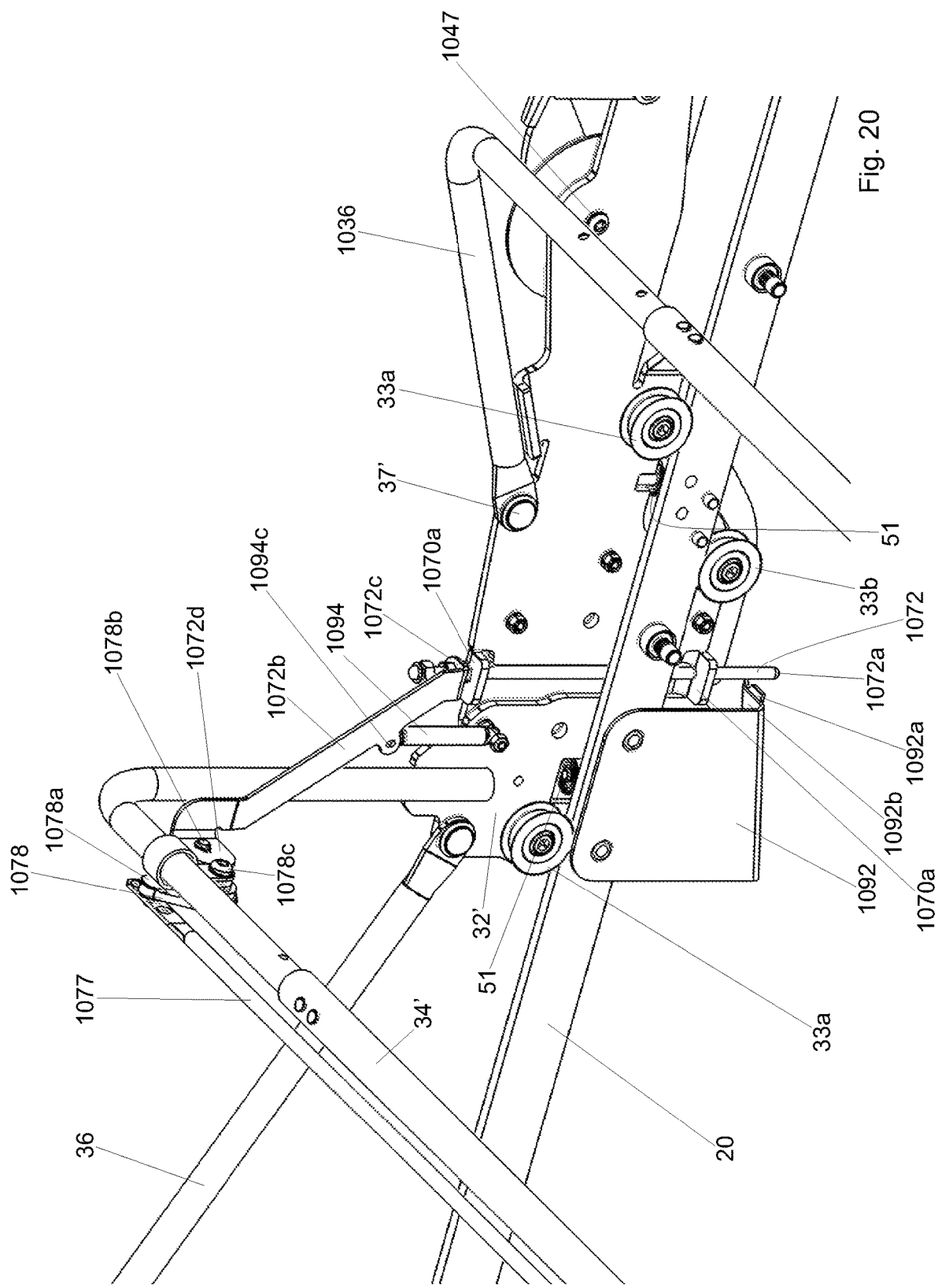
FIG. 20 shows an additional enlarged perspective view from inside the folding-top frame according to FIGS. 10 and 11.

As can be seen in further details in FIGS. 14 to 16, on the frontmost pair of carriages 32' which are connected to one another by the frontmost strut 34', a frame section 1320 is connected, which supports both a support roller 33a and a counter-roller 33b, which are arranged on both sides of the guide 20, wherein, moreover, on the frame section 1320 of the frontmost carriages 32', an auxiliary bow 1036 is articulated. The auxiliary bow 1036 is here at a sufficient distance from the frontmost strut 34' so that it can be turned over and lean against the bow 34'. Moreover, on the frame section 1320, a cover bow 1046 is articulated, which can be pivoted around an articulation 1047. In the closed position (FIG. 14), the cover bow 1046 rests on the frame section 1320, in particular by a lower section 1463, designed as a leg, of its truss-like arm 1046a. Here, in the closed state (FIG. 14), the covering bow 1046 extends over the frame section 1320, wherein approximately in the center of the arm 1046a, an articulation is provided, which holds a hook, not represented, which creates a connection with the frame section 1320. Due to the locking of the covering bow 1046 on the frame section 1320 closer to the rotation point 1047 of the covering bow 1046, the guide 20 can be designed to be shorter overall, since the hook 80 is knocked out of its locking there.

Moreover, the covering bow 1046 includes an actuation rod 1062 which starts from the arm 1046a and which can be turned by a deflection member attached to the guide rail 20, in such a manner that the covering bow 1046 is moved into its lifted position. The deflecting member is here designed as a folding with a slant which provides sufficient resistance for the lifting of the covering bow 1046, but which can be run over in the case of backward movement of the possibly lowered covering bow.

In FIGS. 14 and 16, one sees that a first pretensioning member 1901 connects the covering bow 1046 to the auxiliary bow 1036 in the area of their connecting pieces 1046b, 1036b. The pretensioning member 1901 is here designed as a belt which, in the lowered configuration of the covering bow 1046 as represented in FIG. 14, is tensioned, but which is largely untensioned when the covering bow is lifted as represented in FIG. 15. Thus, the first pretensioning member 1901 serves essentially for lifting the covering bow 1046 when the locking between the covering bow 1046 and the frame section 1320 is released. Thereby, the force to be introduced into the actuation rod 1062 is lower than that predetermined by the weight and the dimensions of the covering bow 1046.

Moreover, the connecting piece 1036b of the auxiliary bow 1036 is coupled by a second pretensioning member 1902, which is designed as an elastic belt, to the connection section of the frontmost strut 34'. The two ends of the second pretensioning member 1902 are here connected to the bow 34' in the area of the connecting piece thereof, while a central area is placed twice around the connecting piece 1036b of the auxiliary bow 1036. Thereby, it is advantageously achieved that the second pretensioning member 1902 is not completely untensioned even if the auxiliary bow 1036 is pulled in contact against the frontmost strut 34', wherein the tension acting on the auxiliary bow 1036 is also transmitted via the first pretensioning member 1901 to the covering bow 1046. By the described measures, it is achieved in particular that, even if the pulling movement occurs on the movable parts of the sliding covering arrangement 30, the covering bow 1046 remains substantially in the actuated position, largely independently of its opening position, and does not fall back onto the frame section 1320 due to its weight.

One can see that the length of the actuation rod 1062 is at approximately two-thirds of the distance of the connecting piece 1046b from the rotation point 1047, so that a sufficiently advantageous transmission results, enabling an operating person to pivot the covering bow 1046 up by pulling on the pulling device 78. Irrespective of this, the covering bow 1046 also pivots when the understructure 14, for example, a tipping trough, is tipped, as explained for the preceding embodiment example.

Moreover, in FIGS. 14 to 20, a locking arrangement 1070 which has been modified in comparison to the preceding embodiment examples can be seen, and which enables an unlocking of the sliding covering arrangement 30 from locking positions provided on the guide 20, by actuating a pulling strap 79. If the locking device 1070 is released from the locking position, the sliding covering arrangement 30 can be moved along the guide 20 by pulling on the pulling device 78, wherein the covering bow 1046 is pivoted up, and the locking member which fastens the covering bow 1046 to the frame section 1320 is released. At the same time, the provision of the pulling device 78 on one of the bows 36 ensures that the force necessary in particular for pivoting the covering bow 1046 does not primarily lead to a setting up of the bow 36, since the pulling motion also pulls said bow down.

The locking arrangement 1070 includes a first locking member 1071 and a second locking member 1072, which are each arranged on different longitudinal sides of the tarpaulin structure 1010 and which, in the area of the frontmost carriage 32', in each case have to be moved in an unlocking direction Y1, that is to say lifted, in order to unlock the sliding cover 30. The first locking member 1071 and the second locking member 1072 here comprise in each case a long pin which is axially movable in a corresponding vertical guide 1070a of the carriage 32', wherein an area of the locking members 1071, 1072 protruding over the area of the base plate 32a of the frontmost carriage 32' protrudes respectively upward and downward over the base plate 32a.

The first locking member 1071 comprises an L-shaped projection 1071b which is provided on the upper end of the locking member 1071, by means of which it is possible to adjust the penetration depth of a distal guide section 71a of the locking member 1071, implemented as tip of said guide section, in relation to a first locking catch 1091. In contrast to the preceding embodiment example, the locking catch 1091 is formed by a substantially L-shaped metal plate which has an entry slope 1091b which rises in closing direction, that is to say when the sliding covering arrangement 30 is moved from the open position into the closed position. The entry slope 1091b thus lifts the locking member 1071 until it is lowered under the load of a spring arrangement 1093, to be explained in greater detail below, into its stop position 1091a. In order to move the locking member 1071 from the locked position past the entry slope 1091b, the locking member 1071 has to be lifted, which occurs by actuation of the pulling strap 79. In the same way, on the opposite longitudinal side with respect to a longitudinal bisector of the understructure 14, the second locking member 1072 is provided with a guide section 1072a formed as a tip and with an L-shaped projection 1072b as well as with a locking catch 1092 with entry slope 1092b and stop position 1092*a*. However, on its end turned away from the guide section 1072*a*, the guide section 1072*b* of the second locking member has an additional fold 1072*d* parallel to the plane of the strut 34.

The upper end of the L-shaped projection 1071*b* of the locking member 1071 is articulated at the end in an articulation 1073*a* to a tilting lever 1073 which in turn is articulated via a clip 1073*b* and a central articulation 1073*c* to the strut 34'. On the side of the tilting lever 1073 opposite the locking member 1071, a pulling lever 1075 with a bolt 1073*e* is articulated in an oblong hole 1073*d* which extends substantially parallel to the arm 34*a*' of the strut 34'.

The pulling lever 1075 is folded in the shape of an L from a steel plate part, so that the two arms 1075*a*, 1075*b* enclose a right angle of approximately 90 degrees. On the arm 1075*a*, a pin 1073*e* is provided, which couples the pulling lever 1075 to the oblong hole 1073*d* of the tilting lever 1073. Moreover, a connection 79*a* of the pulling strap 79 is connected to the arm 1075*a* of the pulling lever 1075, so that, when the pulling strap 79 is pulled, the lever arm of the tilting lever 1073, which is connected to the locking member 1071, is pulled downward around its central rotation axis 1073*c* and thereby the locking member 1071 is pulled upward. Engaging moreover with the arm of the tilting lever 1073, which is turned away from the locking member 1071, is a first spring arrangement 1093 which is connected via clip 1093*a* to the strut 34'. The first spring arrangement 1093 pretensions the tilting lever 1073 in such a manner that the locking member 1071 is pretensioned into its lower position. The pretensioning of the first spring arrangement 1093 therefore must be overcome when the pulling strap 79 is pulled, in order to disengage the first locking member 1071 from the locking catch 1091.

Due to the L shape of the pulling lever 1075, the vertical movement in the plane of the tilting lever 1073 is converted into a substantially horizontal movement in the plane of the second arm 1075*b* of the pulling lever 1075. A free end of the arm 1075*b* of the pulling lever 1075 is coupled here to a first triangular connecting rod 1074 designed in the form of a rocker at an articulation point 1074*a*, said triangular connecting rod being articulated on an opposite end at an articulation point 1074*b* to a force transmission member 1077 designed as a pulling rod. In an articulation 1074*c*, the triangular connecting rod 1074 is coupled to a base 34*b* of the U-shaped strut 34', so that, when the pulling lever 1075 is moved downward, the connecting rod 1077 is pulled by the pivoting of the triangular connecting rod 1074 to the longitudinal side, on which the pulling strap 79 is provided. Thereby, the pulling force on the pulling strap 79 is also transmitted to the opposite side represented in FIG. 17, as explained in further detail below.

It has to be understood that, instead of a connecting rod 1077, a rope or a chain could also be provided, since what matters is essentially the transmission of pulling forces, and a force transmission member with tensile rigidity is sufficient for this purpose. However, since the parts connected to the frontmost carriage 32' or to the frontmost strut 34' can twist somewhat, and since certain tolerances therefore occur, the use of a pulling rod 1077 which is with compression rigidity as well is preferable. Furthermore, this ensures that, in the case of the failure of one of the two spring arrangements 1091, 1092, the pretensioning of the remaining spring arrangement is sufficient to reliably lock the two sides of the folding-top frame 1010.

The end of the connecting rod 1077, which is turned away from the pulling strap 79, is coupled via a bearing point 1078*a* of a second triangular connecting rod 1078 designed as a rocker, which has an oblong hole 1078*b*, on the opposite end with respect to a articulation 1078*c*, for fastening to a strap of the strut 34'. The triangular connecting rod 1078 is thus positioned so that, when the connecting rod 1077 is moved in the direction of the pulling strap 79, the arm of the triangular connecting rod with the oblong hole 1078*b* is lifted.

In the oblong hole 1078*b*, a bolt 1072*e* provided on the fold 1072*d* is received, which brings about the connection of the second locking member 1072 with the second triangular connecting rod 1078. If the connecting rod 1077 is pulled in the direction of the longitudinal side of the first locking member, the second triangular linking rod 1078 pulls the second locking member upward against the locking direction and the pretensioning of the second spring arrangement 1094.

The second spring arrangement 1094 also engages on the projection 1072*b* in an eye 1094*c* designed for this purpose, wherein the other end of the second spring arrangement 1094 is received on the carriage 32'. The second spring arrangement 1094 here has the effect that the second locking member 1072 is in each case tensioned downward in the vertical direction, so that the second spring arrangement 1094 designed as tension spring also has to be overcome when the pulling strap 79 is actuated. By the provision of a first spring arrangement 1093 which is associated with the first locking member 1071 and of a second spring arrangement 1094 which is associated with the second locking member 1072, it is ensured that the two spring members 1093, 1094 are pretensioned in each case in closing direction. Although a common spring arrangement for the two locking members would be sufficient for this purpose, due to the redundant design by the provision of two spring arrangements 1093, 1094, the reliability of the locking is increased additionally.

An additional measure consists in that the guide section 1072*a* of the second locking member 1072 is designed to be slightly shorter or is adjusted slightly higher than the guide section 1071*a* of the first locking member 1071. Thereby, it is ensured in any case that, when the first locking member 1071 is disengaged from the associated locking catch 1091, the second locking member 1072 is also released from the second locking catch 1092, since it is released first. Thereby, the sliding covering arrangement 30 is prevented from being already pulled in opening direction when the second locking member 1072 is still engaged with the second locking catch 1092.

One can see that the engagement depth of the locking members 1071, 1072 can in each case be adjusted, so that disturbances in the synchronization which occur as a result of play, tolerances and deformations of the folding-top frame during the unlocking of the locking members 1071, 1072 can be compensated. The adjustment occurs by adjusting the bolts having the tips 1071*a*, 1072*a* on the associated L-shaped projection 1071*b*, 1072*b*, wherein the bolt can be provided for this purpose with an external thread in order to be fixed by means of screwing in terms of its height on the respective projection 1071*b*, 1072*b*. The projection 1071*b*, 1072*b* and the bolts as well as the additional connection means then form the locking member 1071, 1072, wherein the projection can also be shaped differently than shown in the present example.

Furthermore, one sees that in the carriage 32' in each case a guide 1070*a* for one of the locking members 1071, 1072, respectively, is provided, which makes it possible that the locking members 1071, 1072 are moved vertically in each case and can also not avoid the locking catch 1091, 1092.

Figure 21:
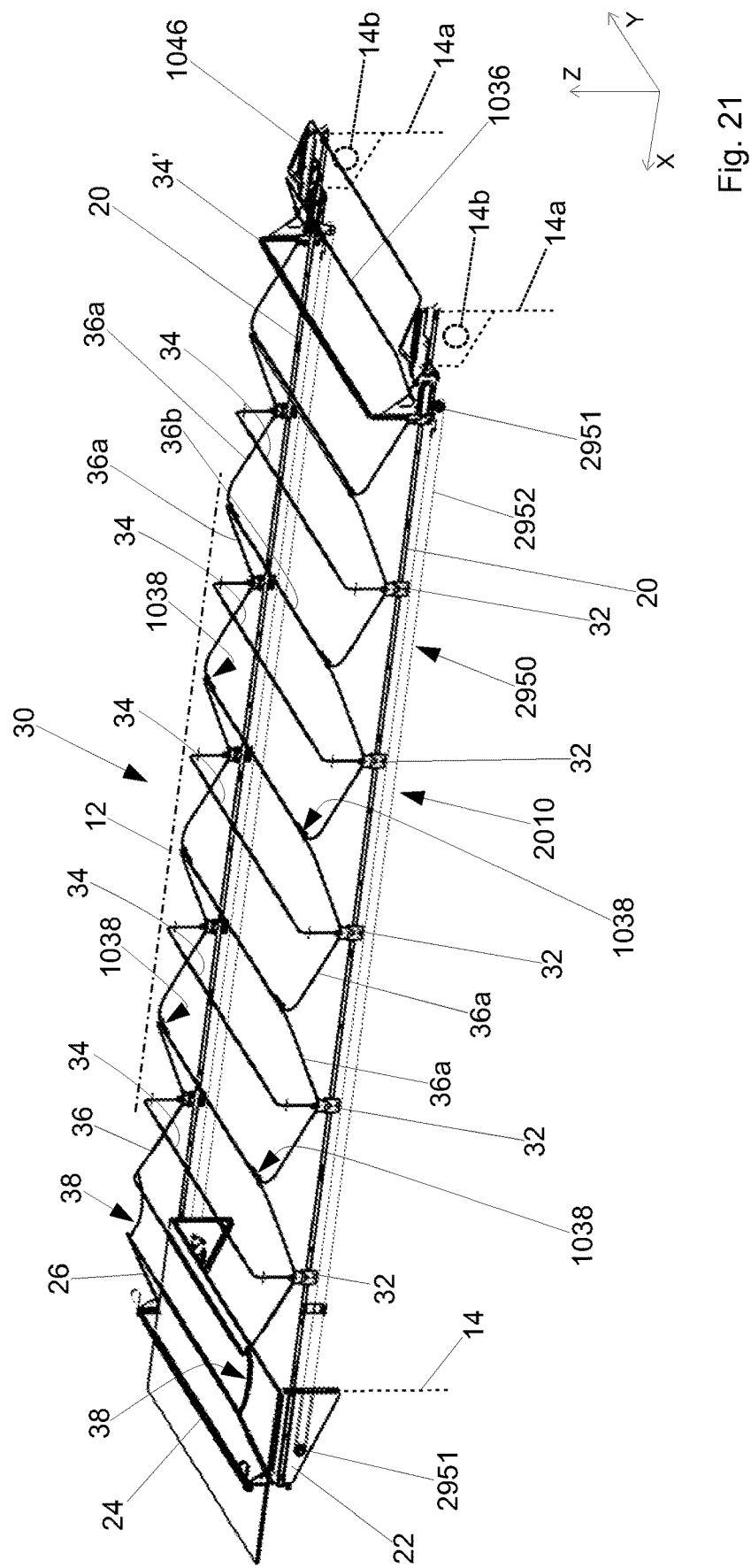
FIG. 21 shows a perspective view onto the folding-top frame of an additional preferred embodiment example of an inventive tarpaulin structure for a container in the closed state.
Figure 22:
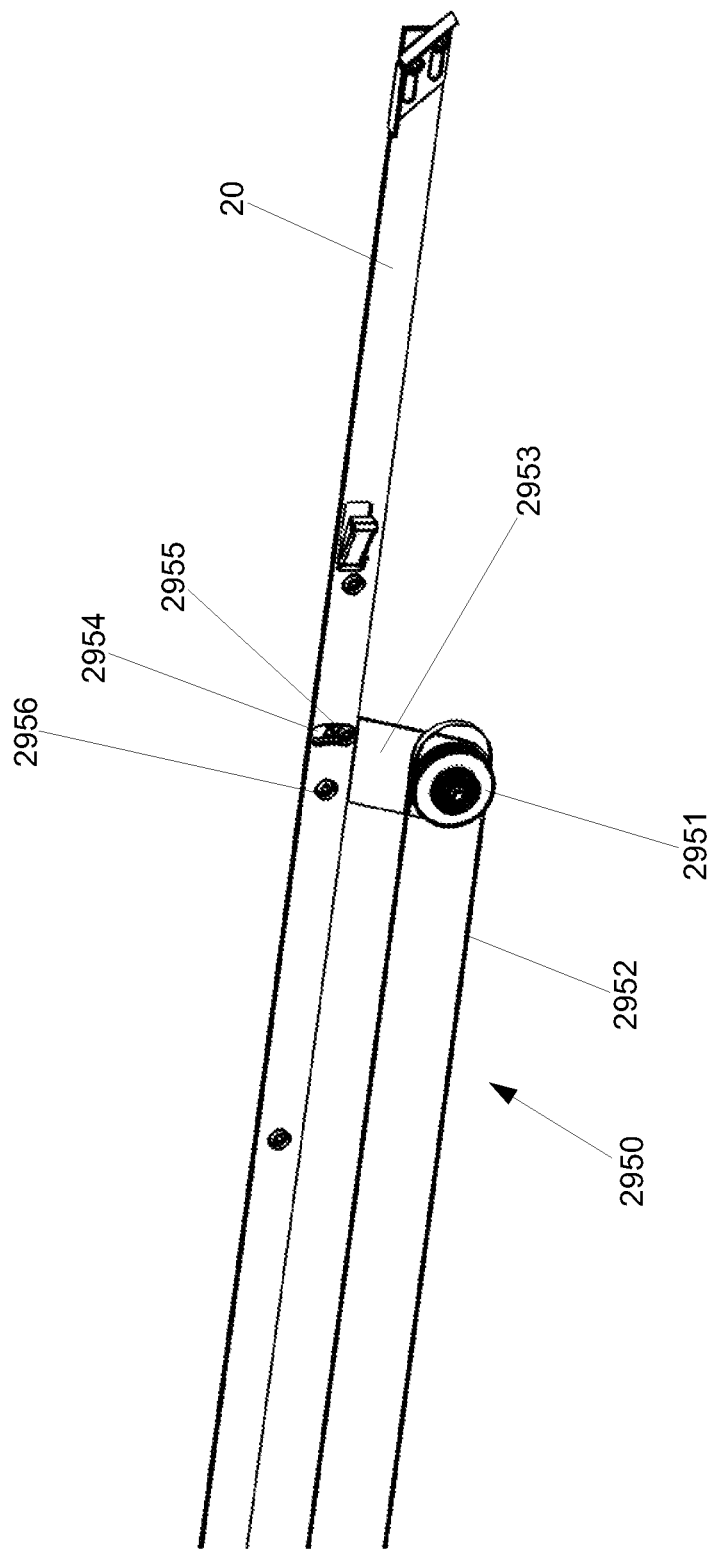
FIG. 22 shows enlarged details of the guide and of the drive of the folding-top frame from FIG. 21.

FIGS. 21 and 22 show an additional embodiment example of a folding-top frame 2010 for a tarpaulin structure, which is basically constructed like the preceding embodiment example, so that the differences in comparison to the preceding embodiment example of the folding-top frame 1010 are incremented up by an additional 1000.

The folding-top frame 2010 distinguishes by an endless drive device 2950 which is provided on each of the two longitudinal sides under the guide 20 and which in each case is coupled to one of the two carriages 32' of a frontmost pair of carriages. The drive device is here designed as a toothed belt 2952 which is placed around two toothed rollers 2951. Thereby, a particularly reliable and slippage-free drive on two longitudinal sides of the tarpaulin structure 2010 can be achieved.

In FIG. 22 one can see that the drive device 2950 designed as toothed belt 2952 is placed around two toothed rollers 2951 connected on opposite ends of the longitudinal side of the understructure 14, wherein the roller 2951 provided in the area of the frontmost carriage 32' when the tarpaulin structure is closed is provided on a fitting 2953, which enables an adjustment. For this purpose, the fitting 2953 is coupled via a connection to the guide 20, which allows a pivoting movement, wherein, in the fitting 2953, an oblong hole 2954 is provided, which enables an adjustment with respect to a pin 2955. Accordingly, the toothed belt 2952 can be tensioned or untensioned.

The two toothed belts 2952 enable a precise movement of the frontmost carriage, so that a common drive shaft for the two toothed belts 2952 is provided. The toothed belts have practically no slippage and do not shift, so that no tilting of the pulled frontmost carriage 32' of the two longitudinal sides occurs, even in the case of repeated opening and closing movements.

It has to be understood that a locking 70, 1070 by the precise positioning of the belt drive 2950 is no longer necessary, since the belt drive 2950 then holds the frontmost carriage 32' of the frontmost pair of carriages in position, even when the frontmost pair of carriages is in its completely closed position.

Furthermore, it should be noted that the pivoting up movement of the covering bow 1046 and the release of the lock 80 occur due to the axial movement of the sliding covering arrangement 30 along the guide 20, so that the drive device 2950 is not directly connected to the pivoting parts.

In addition, the features of the above embodiment examples can be readily combined with one another.

The invention has been explained above in reference to an embodiment example in which the tarpaulin structure 10 covers a container 14. It has to be understood that the tarpaulin structure 10 can also be used for covering other drivable or transportable or stationary substantially cuboid understructures or understructures that at least have a rectangular opening, for example, for the roof of a truck, a truck trailer, a bus, a dump truck or a semi-trailer, for the roof of a railway car, for a standing structure such as a carport or a swimming pool. Lateral openings can also be covered, wherein the described arrangement is then used accordingly lying on its side at 90°—optionally with small modifications.

The invention has been explained above in reference to an embodiment example in which the struts 34 contain angled corner pieces 34a. It has to be understood that the struts 34 can also consist only of an elongate connecting part such as the connecting piece 34b wherein the flexibility for the tolerance compensation in Y-direction can be obtained, for example, by a telescopic section.

The invention has been explained above in reference to an embodiment example in which, in the closed state of the tarpaulin structure 10, the upper edges of the struts 34 and the upper edges of the pivoting bow 36 are arranged at the same height, whereby a large distance between adjacent struts 34 is possible, since the tarpaulin 12 is connected both to the pivoting bows 36 and also to the struts 34. Thereby it is achieved in particular that the tarpaulin structure is set up over the container 14 in Z-direction, that is to say in the vertical direction, with a certain minimum separation at least in the closed state, so that parts protruding slightly over the filling height of the container 14 do not block the functionality of the tarpaulin structure 10, in particular the opening and closing. It has to be understood that it is also possible to arrange the height of the struts 34 and of the pivoting bow 36 at different heights when the tarpaulin structure is closed.

The invention has been explained above in reference to an embodiment example in which the length of the pivoting bows 26, 36 between two struts 34, 34', connected to one another by in each case two connecting rod transmissions 38, is mutually identical. It has to be understood that the length of the pivoting bows 36 also can be of different sizes, whereby their weight is influenced, and the order in which the tarpaulin 12 is lifted can also be influenced advantageously.

The invention has been explained above in reference to an embodiment example in which the tolerance compensation has been achieved over the width in Y-direction by resilient bent struts 34 or bows 36 implemented as tubular sections. It has to be understood that the struts and pivoting bows can also be designed with other cross sections.

The invention has been explained above in reference to an embodiment example in which the struts 34 and the pivoting bows 36 as well as the covering bow 46 are formed in the shape of a U with rounded corners, wherein the arms of the struts and bows in each case are arranged substantially perpendicularly to the bases of the struts 34 and bows 36, 46. Thereby, it is advantageously achieved that the parts of the struts 34 and bows 36, 46 branching off from the carriages 32, 32', that is to say their arms are arranged substantially still outside of the loading opening of the container 14. It has to be understood that it is possible to provide the angle between base and arm of the struts and bows also with a smaller or larger angle, so that the appearance of the struts and bows are then substantially trapezoidal.

The invention has been explained above in reference to an embodiment example in which the length of the arms of the pivoting bows 36 is the same for all the pivoting bow pairs. It has to be understood that the length of the arms can also be adjusted to be different, for example, two different lengths of a pairing or different lengths of different pairings, whereby the setting up behavior of the tarpaulin folding aids can be controlled.

The invention has been explained above in reference to an embodiment example in which the guide rail 20 consists of several guide rail sections which are each screwed individually on the external side of the container 14. It has to be understood that a continuous guide rail can also be used.

The invention has been explained above in reference to an embodiment example in which the guide rails 20 extend substantially in a straight line. It has to be understood that the guide rails can also execute a trajectory, namely curved both in the direction of the longitudinal bisector of the tarpaulin structure and also curved in vertical direction as well as combinations thereof.

The invention has been explained above in reference to an embodiment example in which the kinematic connecting rod assembly 38 is provided between all the pairs of mutually facing bows 26, 36. It has to be understood that it is also possible that just one pair of mutually facing bows 26, 36 can be coupled to one another by at least one and preferably two kinematic connecting rod assemblies. Furthermore, it is possible that more than two kinematic connecting rod assemblies can couple the adjacent bows to one another. Moreover, it is possible that the kinematic connecting rod assemblies are connected not in the area of the lateral vertical plane of the bows, but rather in the area of a horizontal plane.

The invention has been explained above in reference to an embodiment example in which the kinematic connecting rod assembly 38 consists of a first connecting rod 38a and a second connecting rod 38b, which are connected to one another. It has to be understood that the kinematic connecting rod assembly can also contain additional connecting rods, and that, in addition to the connecting rods, additional parts can also be provided in the area of the articulations or of the connecting rods, which influence or promote the pivoting behavior of the kinematic connecting rod assembly.

The invention has been explained above in reference to an embodiment example in which the kinematic connecting rod assembly includes two connecting rods which have their lowest point in the area of the common connection when it descends. It has to be understood that it is also possible that the two connecting rods can be connected in each case to each of the two bows, and can be guided there in a sliding track in order to enable the mutually facing bows to approach one another.

The invention has been explained above in reference to an embodiment example in which the covering bow 46 can be pivoted between a pivoted-down state, in which it lies on a support 323 of a frame section 320, and a pivoted-up state, in which it lies on an additional section 320a of the frame section 320. It has to be understood that it is possible to provide additional stable or metastable positions for the covering bow 46, and that the support of at least one of the states of the covering bow 46 can also be provided on another portion of the frontmost carriage. Furthermore, it is possible that the covering bow 46 is also supported in its pivoted-up state against the frontmost strut or the auxiliary bow.

The invention has been explained above in reference to an embodiment example in which the auxiliary bow 36' is articulated close to the frontmost strut 34'. It has to be understood that the auxiliary bow can also be articulated to the frontmost carriage 32' at a distance from the frontmost strut 34', for example, approximately centrally between the articulation 47 of the covering bow 46 and the frontmost strut 34'.

The invention has been explained above in reference to an embodiment example in which the tarpaulin 12 connects to one another struts, bows and covering bows arranged next to one another. It has to be understood that moreover elastic belts, springs and other tensioning means can connect the parts to one another in order to introduce a tension into the folding-top frame. Thus, for example, it can be provided that the bows 36 are pretensioned by a suitable spring means in the direction of the associated strut, so that they fold up substantially automatically when the locking arrangement 70 is released. A pretensioning can also be provided in the reverse direction, so that the movable parts of the folding-top frame unfold automatically after unlocking of the rear locking arrangement.

The invention has been explained above in reference to an embodiment example in which the covering bow 46 includes an extension 465 which is actuated by the intermediate connecting rod 63. It has to be understood that the intermediate connecting rod 63 can also be connected directly to the arm 46a of the covering bow or that the extension 465 itself is designed as an actuation rod which works together with the deflection member 69.

The invention has been explained above in reference to an embodiment example in which the covering bow 46 can be locked to the frontmost carriage 32' via a pivotable hook 80, wherein the hook 80 is pivotally connected to the covering bow 46. It has to be understood that the hook can also be connected to the frontmost carriage or that on the two parts in each case a hook can also be connected, hooks which alternately engage with a counter-bearing.

The invention has been explained above in reference to an embodiment example in which the locking arrangement 70 is provided in the frontmost strut 34'. It has to be understood that the locking arrangement can also be provided on one of the other struts, for example, when the folding-top frame can be opened from both sides.

The invention has been explained above in reference to an embodiment example in which the locking members 71, 72 can be moved in opposite unlocking directions Y1, Y2. It has to be understood that by kinematic reversal the unlocking directions can also be oriented in the same direction.

The invention has been explained above in reference to an embodiment example in which the connecting rods 38a, 38b of the kinematic connecting rod assembly 38 are very elongate and enclose an angle of approximately 40°. It has to be understood that this angle can be varied for the adaptation of the folding-top frame 16 to an understructure 14, without the angle of the bow 36 having to be changed. Thereby, the tarpaulin structure can be adjusted very flexibly to different lengths of understructures, in that the angle between the connecting rods 38a, 38b is varied by arrangement of at least the carriages 32 that is at least more approximately equidistant or even absolutely equidistant, so that a homogeneous roof partitioning is achieved. It is also possible to select the angles between the connecting rods 38a, 38b of the kinematic connecting rod assembly within a tarpaulin structure 10 to be different.

The invention claimed is:

1. A tarpaulin structure for an understructure, such as a truck, a trailer, a semi-trailer, a railway car, a dump truck, a container, comprising:
   a folding-top frame, and
   a tarpaulin made of weather-resistant material,
   wherein the folding-top frame comprises a plurality of struts,
   wherein each end of the strut comprises a carriage which is displaceable along a guide rail arrangement,
   wherein a U-shaped covering bow is pivotally connected on the frontmost pair of carriages around an articulation to pivot between a first end position and a second end position,
   wherein the covering bow comprises a first extension and a second extension,
   wherein each of the extensions can be pivoted together with the covering bow around its articulation for pivoting the covering bow into one of its end positions,
   wherein the covering bow is controllable by the first extension on a first side of the folding-top frame for pivoting the covering bow toward the first end position, wherein the covering bow is controllable by the second extension on a second side of the folding-top frame for pivoting the covering bow toward the second end position, wherein the extensions are an actuation rod with a bent end section cooperating with a deflection member arranged on one of the guide rails and the understructure, wherein the bent end section comprises a concave side and a convex side, and wherein the concave side of the bent end section moves the covering bow up in a first end position and the convex side of the bent end section moves the covering bow down in a second end position.

2. The tarpaulin structure according to claim 1, wherein the covering bow is loaded by at least one pretensioning member in opening direction in such a manner that in nearly every position of the covering bow, the at least one pretensioning member at least largely compensates for the weight of the covering bow.

3. The tarpaulin structure according to claim 1, wherein the covering bow has an end position in which the covering bow rests on a frame section of the frontmost carriages such that the covering bow is kept out of contact with the guide, and wherein the covering bow can be locked to the foremost carriage via a pivotable hook.

4. The tarpaulin structure according to claim 1, wherein the extension can be pivoted via a connecting rod transmission for pivoting the covering bow into one of its end positions, wherein the connecting rod transmission comprises an actuation connecting rod and an intermediate connecting rod, and wherein the intermediate connecting rod is in each case coupled by articulation to the extension and to the actuation connecting rod.

5. A tarpaulin structure for an understructure, such as a truck, a trailer, a semi-trailer, railway car, dump truck, container, comprising
a folding top-frame, and
a tarpaulin made of weather-resistant material,
wherein the folding-top frame comprises a plurality of struts,
wherein the struts have ends to which a carriage is attached,
wherein the carriage is displaceable along a guide,
wherein at least one bow is pivotally connected to one of the strut and of a pair of opposite carriages of the strut,
wherein the bow forms a tarpaulin folding aid along with a bow of one of an adjacent strut and of a pair of opposite carriages and of a stationary part of the folding-top frame,
wherein a covering bow is pivotally connected on the frontmost pair of carriages,
wherein an auxiliary bow is articulated on the frontmost carriage between the covering bow and the strut connected to the frontmost carriage, and
wherein the covering bow has an extension which can be pivoted together with the covering bow around its articulation.

6. The tarpaulin structure according to claim 5, wherein the extension is an actuation rod with a bent end section cooperating with a deflection member arranged on one of the guide and the understructure.

7. The tarpaulin structure according to claim 5, wherein a first pretensioning member which pretensions the covering bow against its closing direction is arranged between the auxiliary bow and the covering bow.

8. The tarpaulin structure according to claim 7, wherein the first pretensioning member is selected from the group comprising a tension spring, a pulling strap, an elastic belt, an elastic web, an elastic tarpaulin and combination thereof.

9. The tarpaulin structure according to claim 7, wherein, a second pretensioning member which pretensions the auxiliary bow against its closing direction is arranged between the strut and the auxiliary bow.

10. The tarpaulin structure according to claim 9, wherein the second pretensioning member is selected from the group comprising a tension spring, a pulling strap, an elastic belt, an elastic web, an elastic tarpaulin and combinations thereof.

11. The tarpaulin structure according to claim 9, wherein the second pretensioning member is connected at both ends to the foremost strut, and wherein a central area of the second pretensioning member is placed around the auxiliary bow.

12. The tarpaulin structure according to claim 9, wherein, when the auxiliary bow is pivoted upward, the second pretensioning member is tensioned more strongly than the first pretensioning member.

13. The tarpaulin structure according to claim 5, wherein, between an articulation of the auxiliary bow and the strut, a distance is provided such that, when the folding-top frame is at least partially opened, the auxiliary bow can be transferred to an overturned position toward the strut of the frontmost pair of carriages.

14. The tarpaulin structure according to claim 5, wherein an articulation of the auxiliary bow is provided on a frame section connected to the frontmost carriage.

15. The tarpaulin structure according to claim 5, wherein an endless drive device is connected to a carriage of the frontmost pair of carriages for displacing the struts, and wherein the axial movement of the struts is coupled to a rotational movement about the articulation of the covering bow by the extension being displaced along a deflection member arranged distant from the articulation such that the linear motion is transformed in a rotational movement of the covering bow.

16. The tarpaulin structure according to claim 5, wherein the two adjacent bows are arranged spaced apart from one another, wherein the adjacent bows are coupled to each other by means of a kinematic connecting rod assembly that folds up when the folding-top frame is moved together, wherein the kinematic connecting rod assembly comprises a first connecting rod and a second connecting rod, wherein first connecting rod is articulated to one of the adjacent bows, wherein the second connecting rod is articulated to the other of the adjacent bows, and wherein the first connecting rod and the second connecting rod are connected to one another via an articulation.

17. A tarpaulin structure for an understructure, such as a truck, a trailer, a semi-trailer, a railway car, a dump truck, a container, comprising:
a folding-top frame, and
a tarpaulin made of weather-resistant material,
wherein the folding-top frame has a plurality of struts,
wherein each strut comprises a pair of carriages which are displaceable along a guide,
wherein a first arm and a second arm of a covering bow are pivotally articulated on the frontmost pair of carriages,
wherein the covering bow is pivotable between a closed end position and an open end position,
wherein the covering bow comprises an extension protruding beyond the articulation and cooperating with a deflection member arranged on one of the guide and the understructure for pivoting the covering bow into at least one of said closed end position and said opened end position, wherein the strut assigned to the frontmost pair of carriages comprises a locking arrangement which can be unlocked by one-sided actuation, wherein the locking arrangement comprises a first locking member and a second locking member which are arranged on different longitudinal sides of the tarpaulin structure, wherein the first locking member and the second locking member can be axially moved at the same time for an unlocking, and wherein the first locking member and the second locking member together can be unlocked by pulling on the first locking member from outside of the folding-top frame.

18. The tarpaulin structure according to claim 5, wherein the frontmost carriage comprises a frame section which is arranged above the guide in a substantially horizontal plane, wherein the covering bow comprises a lower support area arranged outside of its articulation on the carriage, wherein the frame section forms a support for the support area of the covering bow in said closed end position, wherein the frame section comprises an abutment surface delimiting the pivotal movement of the covering bow, and wherein the covering bow comprises an upper support area contacting the abutment surface in said opened end position.

* * * * *